(12) United States Patent
Yeh

(10) Patent No.: US 10,088,715 B2
(45) Date of Patent: Oct. 2, 2018

(54) IN-CELL TOUCH DISPLAY PANEL

(71) Applicants: HannStar Display (Nanjing) Corporation, Nanjing (CN); HannStar Display Corporation, Taipei (TW)

(72) Inventor: Cheng-Yen Yeh, Taichung (TW)

(73) Assignees: HannStar Display (Nanjing) Corporation, Nanjing (CN); HannStar Display Corporation, Taipei (TW)

( * ) Notice: Subject to any disclaimer, the term of this patent is extended or adjusted under 35 U.S.C. 154(b) by 0 days.

(21) Appl. No.: 15/836,934

(22) Filed: Dec. 11, 2017

(65) Prior Publication Data

US 2018/0188614 A1    Jul. 5, 2018

(30) Foreign Application Priority Data

Dec. 29, 2016    (CN) .......................... 2016 1 1244106

(51) Int. Cl.
| | |
|---|---|
| *G02F 1/1333* | (2006.01) |
| *G02F 1/1343* | (2006.01) |
| *G02F 1/1362* | (2006.01) |
| *G02F 1/1368* | (2006.01) |
| *G06F 3/041* | (2006.01) |
| *G06F 3/044* | (2006.01) |

(52) U.S. Cl.
CPC ...... *G02F 1/134309* (2013.01); *G02F 1/1368* (2013.01); *G02F 1/13338* (2013.01); *G02F 1/13439* (2013.01); *G02F 1/133345* (2013.01); *G02F 1/136227* (2013.01); *G02F 1/136286* (2013.01); *G06F 3/044* (2013.01); *G06F 3/0412* (2013.01); *G02F 2201/121* (2013.01); *G02F 2201/123* (2013.01)

(58) Field of Classification Search
CPC .......................................... G02F 2001/134372
See application file for complete search history.

(56) References Cited

U.S. PATENT DOCUMENTS

2017/0278868 A1\* 9/2017 Tian .................. G02F 1/136286
2017/0322464 A1\* 11/2017 Chang ............... G02F 1/134309

\* cited by examiner

*Primary Examiner* — Phu Vu
(74) *Attorney, Agent, or Firm* — CKC & Partners Co., Ltd.

(57) ABSTRACT

The in-cell touch display panel includes the following units. Multiple pixel regions are disposed in areas of the display area enclosed by gate lines that are intersected the data lines, in which each pixel region includes a pixel structure, and each pixel structure includes a pixel electrode. A common electrode includes multiple touch electrodes, in which each touch electrode corresponds to more than one pixel electrodes. A sub-common electrode is a portion of the touch electrode. The data lines and the sub-common electrodes are disposed on the same insulation layer. A metal connection structures is electrically connected to two adjacent ones of the sub-common electrodes along the second direction. The metal connection structure and the data lines are formed by different metal layers.

20 Claims, 37 Drawing Sheets

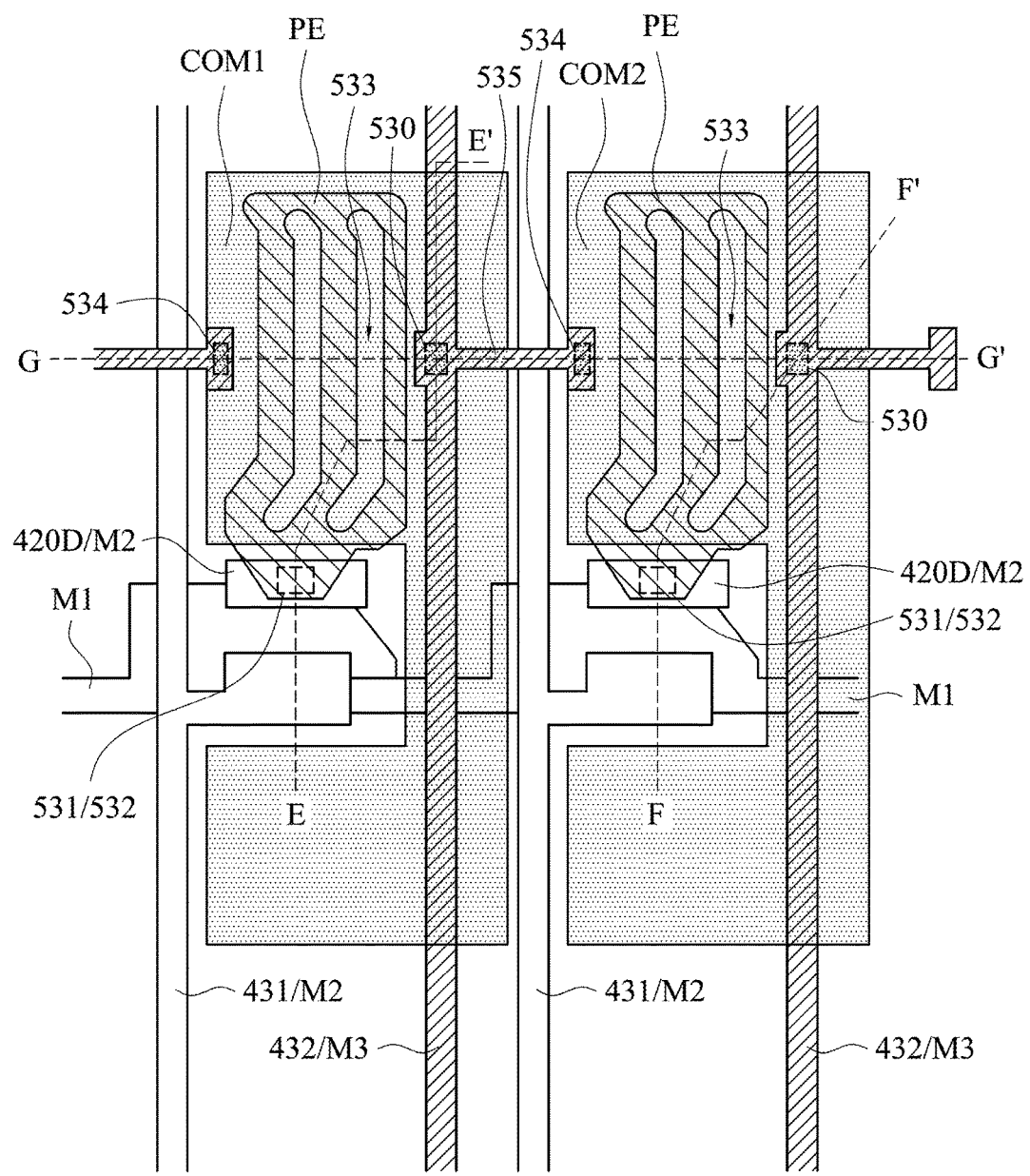
FIG. 5B_1

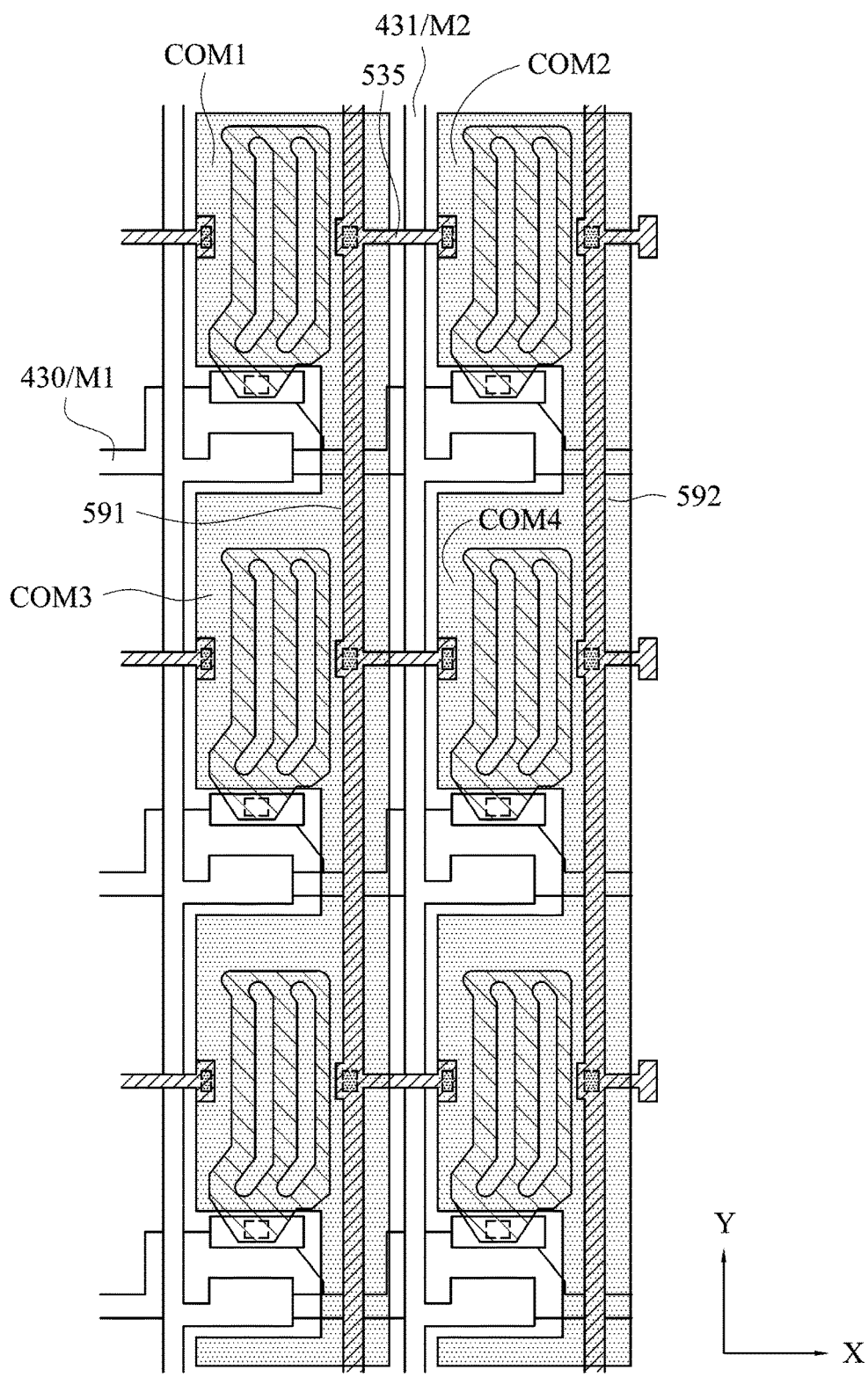
FIG. 5B_2

IN-CELL TOUCH DISPLAY PANEL

RELATED APPLICATIONS

This application claims priority to China Application Serial Number 201611244106.1 filed Dec. 29, 2016, which is herein incorporated by reference.

BACKGROUND

Field of Invention

The present invention relates to a touch display panel. More particularly, the present invention relates to an in-cell touch display panel.

Description of Related Art

A TDDI (Touch with Display Driver Integration) single chip is configured to connect all of data lines and touch sensing lines which are connected to touch electrodes, thereby enabling the single chip to control both functions of touch and display. However, the data lines and the touch sensing lines would concentrate toward a chip area in a non-display area, and thus are overlapped with each other. The signals transmitted on the data lines and the touch sensing lines may be interfered by each other, and therefore the functions of display and touch are both affected. It is an issue in the art regarding how to solve the problems of overlapped trace routes and the interference between the data lines and the touch sensing lines in the non-display area.

SUMMARY

An objective of the invention is to provide an in-cell touch display panel, in which sub-common electrodes in two adjacent pixel structures are electrically connected to each other.

Embodiments of the invention provide an in-cell touch display panel having a display area and a non-display area. The in-cell touch display panel includes the following units. Multiple data lines are disposed on a first substrate along a first direction. Multiple gate lines are disposed along a second direction, in which an angle is included between the first direction and the second direction. Multiple touch sensing lines are disposed on the first substrate, in which an insulation layer is disposed between the data lines and the gate lines. Multiple pixel regions are disposed in areas of the display area enclosed by the gate lines that are intersected with the data lines, in which each of the pixel regions includes a pixel structure, and each of the pixel structures includes a pixel electrode. A common electrode is disposed in the display area and includes multiple touch electrodes, in which each of the touch electrodes corresponds to more than one of the pixel electrodes, each of the pixel electrodes corresponds to a sub-common electrode, and the sub-common electrode is a portion of the touch electrode. A thin film transistor is disposed in the pixel structure, in which the thin film transistor includes a gate, a source, a drain and a semiconductor layer. A liquid crystal layer is disposed between the first substrate and a second substrate. Multiple display pads and multiple touch pads are disposed in the non-display area. The data lines and the sub-common electrodes are disposed on the insulation layer, and the pixel electrodes are disposed above the sub-common electrodes and are spatially insulated from the sub-common electrodes. A metal connection structures is electrically connected to two adjacent ones of the sub-common electrodes along the second direction, and the metal connection structure and the data lines are formed by different metal layers.

In some embodiments, in each of the touch electrodes, the two adjacent ones of the sub-common electrodes along the first direction are directly connected to each other through an extending portion of the touch electrode, the extending portion crosses over one of the gate lines, and a width of the extending portion along the second direction is smaller than a width of the sub-common electrode along the second direction.

In some embodiments, the two adjacent ones of the sub-common electrodes include a first sub-common electrode and a second sub-common electrode. The in-cell touch display panel includes: a first metal layer disposed on the first substrate and including a gate; a first insulation layer disposed on the first metal layer; a semiconductor layer disposed on the first insulation layer; a second metal layer disposed on the first insulation layer, in which the second metal layer includes a source and a drain; and the data lines are formed by the second metal layer in the display area; a first transparent conductive layer disposed on the first insulation layer, in which the first transparent conductive layer includes a first sub-common electrode and a second sub-common electrodes; a second insulation layer disposed on the second metal layer and on the first transparent conductive layer, in which the second insulation layer includes a first contact hole, a second contact hole and a third contact hole, in which the first contact hole exposes the drain, the second contact hole exposes the first sub-common electrode, the third contact hole exposes the second sub-common electrodes; a third metal layer disposed on the second insulation layer, in which the third metal layer includes the touch sensing lines and the metal connection structures, one of the touch sensing lines is electrically connected to the first sub-common electrode through the second contact hole, one of the metal connection structures extends from the second contact hole to the third contact hole and is electrically connected to the second sub-common electrode through the third contact hole; a third insulation layer disposed on the third metal layer, in which the third insulation layer has fourth contact hole corresponding to the first contact hole; a second transparent conductive layer disposed on the third insulation layer, in which the second transparent conductive layer includes the pixel electrodes, one of the pixel electrodes is electrically connected to the drain through the first contact hole and the fourth contact hole.

In some embodiments, the two adjacent ones of the sub-common electrodes include a first sub-common electrode and a second sub-common electrode. The in-cell touch display panel includes: a first metal layer, disposed on the first substrate, in which the first metal layer includes the metal connection structures and a gate; a first insulation layer, disposed on the first metal layer, in which the first insulation layer includes a first contact hole and a second contact hole, and the first contact hole and the second contact hole expose one of the metal connection structures; a semiconductor layer, disposed on the first insulation layer; a second metal layer, disposed on the first insulation layer, in which the second metal layer includes a source and a drain, and the data lines are formed by the second metal layer in the display area; a first transparent conductive layer, disposed on the second metal layer, in which the first transparent conductive layer includes a first sub-common electrode and a second sub-common electrode, the first sub-common electrode and the second sub-common electrode are electrically connected to the one of the metal connection structures through the first contact hole and the second contact hole respectively; a second insulation layer, disposed on the second metal layer and the first transparent conductive layer, in which the second insulation layer includes a third contact hole and a fourth contact hole, the third contact hole exposes the drain, and the fourth contact hole exposes the first sub-common electrode; a third metal layer, disposed on the second insulation layer, in which the third metal layer includes the touch sensing lines, one of the touch sensing lines is electrically connected to the first sub-common electrode through the fourth contact hole; a third insulation layer, disposed on the third metal layer, in which the third insulation layer has a fifth contact hole corresponding to the third contact hole; and a second transparent conductive layer, disposed on the third insulation layer, in which the second transparent conductive layer includes the pixel electrodes, one of the pixel electrodes is electrically connected to the drain through the third contact hole and the fifth contact hole.

In some embodiments, the two adjacent ones of the sub-common electrodes include a first sub-common electrode and a second sub-common electrode. The in-cell touch display panel includes: a semiconductor layer, disposed on the first substrate, in which the semiconductor layer includes a source, a first lightly doped region, a channel region of a thin film transistor, a second lightly doped region, and a drain, in which the channel region is disposed between the first lightly doped region and the second lightly doped region; a first insulation layer, disposed on the semiconductor layer, in which the first insulation layer has a first contact hole exposing the source and has a second contact hole exposing the drain; a first metal layer, disposed on the first insulation layer and including the gate; a second insulation layer, disposed on the first metal layer, in which the second insulation layer has a third contact hole corresponding to the first contact hole and a fourth contact hole corresponding to the second contact hole; a first transparent conductive layer, disposed on the second insulation layer, in which the first transparent conductive layer includes a first sub-common electrode and a second sub-common electrode; a second metal layer, disposed on the second insulation layer, in which the data lines are formed by the second metal layer in the display area, one of the data lines is electrically connected to the source through the first contact hole and the third contact hole, the second metal layer includes a filling structure which is electrically connected to the drain through the second contact hole and the fourth contact hole; a third insulation layer, disposed on the second metal layer, in which the third insulation layer includes a fifth contact hole exposing the first sub-common electrode, a sixth contact hole exposing the second sub-common electrode, and a seventh contact hole exposing the filling structure; a third metal layer, disposed on the third insulation layer, in which the third metal layer includes the touch sensing lines and the metal connection structures, one of the touch sensing lines is electrically connected to the first sub-common electrode through the fifth contact hole, one of the metal connection structure extends from the fifth contact hole to the sixth contact hole and is electrically connected to the second sub-common electrode through the sixth contact hole; a fourth insulation layer, disposed on the third metal layer, the fourth insulation layer has an eighth contact hole corresponding to the seventh contact hole; a second transparent conductive layer, disposed on the fourth insulation layer, in which the second transparent conductive layer includes the pixel electrodes, and one of the pixel electrodes is electrically connected to the filling structure through the seventh contact hole and the eighth contact hole.

In some embodiments, the two adjacent ones of the sub-common electrodes include a first sub-common electrode and a second sub-common electrode. The in-cell touch display panel includes: a semiconductor layer, disposed on the first substrate, in which the semiconductor layer includes a source, a first lightly doped region, a channel region of a thin film transistor, a second lightly doped region, and a drain, in which the channel region is disposed between the first lightly doped region and the second lightly doped region; a first insulation layer, disposed on the semiconductor layer, in which the first insulation layer has a first contact hole exposing the source, and a second contact hole exposing the drain; a first metal layer, disposed on the first insulation layer, in which the first metal layer includes a gate and the metal connection structures; a second insulation layer, disposed on the first metal layer, in which the second insulation layer has a third contact hole corresponding to first contact hole, a fourth contact hole corresponding to the second contact hole, a fifth contact hole and a sixth contact hole, in which the fifth contact hole and the sixth contact hole expose one of the metal connection structures; a first transparent conductive layer, disposed on the second insulation layer, in which the first transparent conductive layer includes a first sub-common electrode and a second sub-common electrode, the first sub-common electrode and the second sub-common electrode are electrically connected to the one of the metal connection structures through the fifth contact hole and the sixth contact hole respectively; a second metal layer, disposed on the second insulation layer, in which the data lines are formed by the second metal layer in the display area, one of the data lines is electrically connected to the source through the first contact hole and the third contact hole, in which the second metal layer includes a filling structure which is electrically connected to the drain through the second contact hole and the fourth contact hole; a third insulation layer, disposed on the second metal layer, in which the third insulation layer has a seventh contact hole exposing the first sub-common electrode, and an eighth contact hole exposing the filling structure; a third metal layer, disposed on the third insulation layer, in which the third metal layer includes the touch sensing lines, one of the touch sensing lines is electrically connected to the first sub-common electrode through the seventh contact hole; a fourth insulation layer, disposed on the third metal layer, in which the fourth insulation layer has a ninth contact hole corresponding to the eighth contact hole; and a second transparent conductive layer, disposed on the fourth insulation layer, in which the second transparent conductive layer includes the pixel electrodes, and one of the pixel electrodes is electrically connected to the filling structure through the eighth contact hole and the ninth contact hole.

In some embodiments, the two adjacent ones of the sub-common electrodes include a first sub-common electrode and a second sub-common electrode. The in-cell touch display panel includes: a first metal layer, disposed on the first substrate, in which the first metal layer includes a gate; a first insulation layer, disposed on the first metal layer; a semiconductor layer, disposed on the first insulation layer, in which the semiconductor layer is a metal oxide including indium, gallium, and zinc; a second insulation layer, disposed on the semiconductor layer, in which the second insulation layer has a first contact hole and a second contact hole exposing the semiconductor layer; a second metal layer, disposed on the second insulation layer, in which the second metal layer includes a source and a drain, and the data lines, the source and the drain are electrically connected through the first contact hole and second contact hole respectively; a first transparent conductive layer, disposed on the second insulation layer, in which the first transparent conductive layer includes a first sub-common electrode and a second sub-common electrode; a third insulation layer, disposed on the first transparent conductive layer and on the second metal layer, in which the third insulation layer has a third contact hole exposing the first sub-common electrode, a fourth contact hole exposing the second sub-common electrode, and a fifth contact hole exposing the drain; a third metal layer, disposed on the third insulation layer, in which the third metal layer includes the touch sensing lines and the metal connection structures, one of the touch sensing lines is electrically connected to the first sub-common electrode through the third contact hole, one of the metal connection structures extends from the third contact hole to the fourth contact hole and is electrically connected to the second sub-common electrode; a fourth insulation layer, disposed on the third insulation layer and on the third metal layer, in which the fourth insulation layer has a sixth contact hole corresponding to the fifth contact hole and exposing the drain; and a second transparent conductive layer, disposed on the fourth insulation layer, in which the second transparent conductive layer includes the pixel electrodes, and one of the pixel electrodes is electrically connected to the drain through the fifth contact hole and the sixth contact hole.

In some embodiments, the two adjacent ones of the sub-common electrodes include a first sub-common electrode and a second sub-common electrode. The in-cell touch display panel includes: a first metal layer, disposed on the first substrate, in which the first metal layer includes a gate and the metal connection structure; a first insulation layer, disposed on the first metal layer, in which the first insulation layer has a first contact hole and a second contact hole exposing the first metal connection structure; a semiconductor layer, disposed on the first insulation layer, in which the semiconductor layer is a metal oxide including indium, gallium, and zinc; a second insulation layer, disposed on the semiconductor layer, the second insulation layer has a third contact hole corresponding to the first contact hole and has a fourth contact hole corresponding to the second contact hole exposing the first metal layer, and the second insulation layer has a fifth contact hole and a sixth contact hole exposing the semiconductor layer; a second metal layer, disposed on the second insulation layer, in which the second metal layer includes a source and a drain, and the data lines, the source and the drain are electrically connected through the fifth contact hole and the sixth contact hole respectively; a first transparent conductive layer, disposed on the second insulation layer, in which the first transparent conductive layer includes a first sub-common electrode and a second sub-common electrode, in which the first sub-common electrode is electrically connected to the one of the metal connection structure through the first contact hole and the third contact hole, and the second sub-common electrode is electrically connected to the first metal connection structure through the second contact hole and the fourth contact hole; a third insulation layer, disposed on the first transparent conductive layer and on the second metal layer, in which the third insulation layer has a seventh contact hole exposing the first sub-common electrode and has an eighth contact hole exposing the drain; a third metal layer, disposed on the third insulation layer, in which the touch sensing lines are formed by the third metal layer in the display area, one of the touch sensing lines is electrically connected to the first sub-common electrode through the seventh contact hole; a fourth insulation layer, disposed on the third insulation layer and on the third metal layer, in which the fourth insulation layer has a ninth contact hole corresponding to the eighth contact hole and exposing the drain; and a second transparent conductive layer, disposed on the fourth insulation layer, in which the second transparent conductive layer includes the pixel electrodes, and one of the pixel electrodes is electrically connected to the drain through the eighth contact hole and the ninth contact hole.

In some embodiments, the data lines are parallel with the touch sensing lines in the display area, and the data lines are not overlapped with the touch sensing lines in the non-display area.

In some embodiments, the data lines are parallel with the touch sensing lines in the display area, and the data lines and the touch sensing lines are formed by a same metal layer in the display area.

In some embodiments, the data lines are partially overlapped with the touch sensing lines in the display area along a normal vector of the in-cell touch display panel, and the data lines and the touch sensing lines are formed by different metal layers in the display area.

In some embodiments, each of the touch sensing lines is electrically connected to one of the touch pads, and each of the data lines is electrically connected to one of the display pads. The in-cell touch display panel further includes a driving circuit disposed in the non-display area and electrically connected to the display pads and the touch pads. The non-display area includes a signal transferring area and a fan-out area, the signal transferring area is located between the display area and the fan-out area, and the touch pads and the display pads are disposed in the fan-out area. One of the display pads is disposed between two of the touch pads, and one of the touch pads is disposed between two of the display pads.

In some embodiments, at least two of the sensing lines are electrically connected to each other and are electrically connected to one of the touch pads through a conducting line in the fan-out area.

In some embodiments, the display pads are disposed between the touch pads and the display area.

In some embodiments, the touch pads are disposed between the display pads and the display area.

In some embodiments, the number of the touch pads is less than the number of the display pads, and the display pads and the touch pads are arranged as multiple rows, and one of the rows consists of a portion of the touch pads.

In some embodiments, the number of the touch pads is less than the number of the display pads, and the display pads and the touch pads are arranged as multiple rows, and a first row of the rows consists of a portion of the display pads, and a second row of the rows includes a portion of the display pads and a portion of the touch pads.

In some embodiments, the first row is located between the display area and the second row.

In some embodiments, the second row is located between the display area and the first row.

In some embodiments, the non-display area includes a signal transferring area and a fan-out area. The signal transferring area is located between the display area and the fan-out area. One of the touch sensing lines includes a first portion and a second portion, the first portion is formed by the first metal layer or the second metal layer, and the second portion is formed by the third metal layer. The in-cell touch display panel further includes: a connection structure, disposed in the signal transferring area and electrically connected to the first portion and the second portion. The connection structure includes: the first portion; the second portion; an insulation layer having contact holes exposing the first portion and the second portion; and a transparent conductive layer, electrically connected to the first portion and the second portion through the contact holes.

Compared with the prior art, the invention has at least one advantage: the sub-common electrodes in two adjacent pixel structures are electrically connected to each other through a metal connection structure.

BRIEF DESCRIPTION OF THE DRAWINGS

The invention can be more fully understood by reading the following detailed description of the embodiment, with reference made to the accompanying drawings as follows.

FIG. 5B_1 is a top view of pixel structure in accordance with another embodiment.

FIG. 5B_2 is a top view of multiple pixel structures in accordance with another embodiment.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
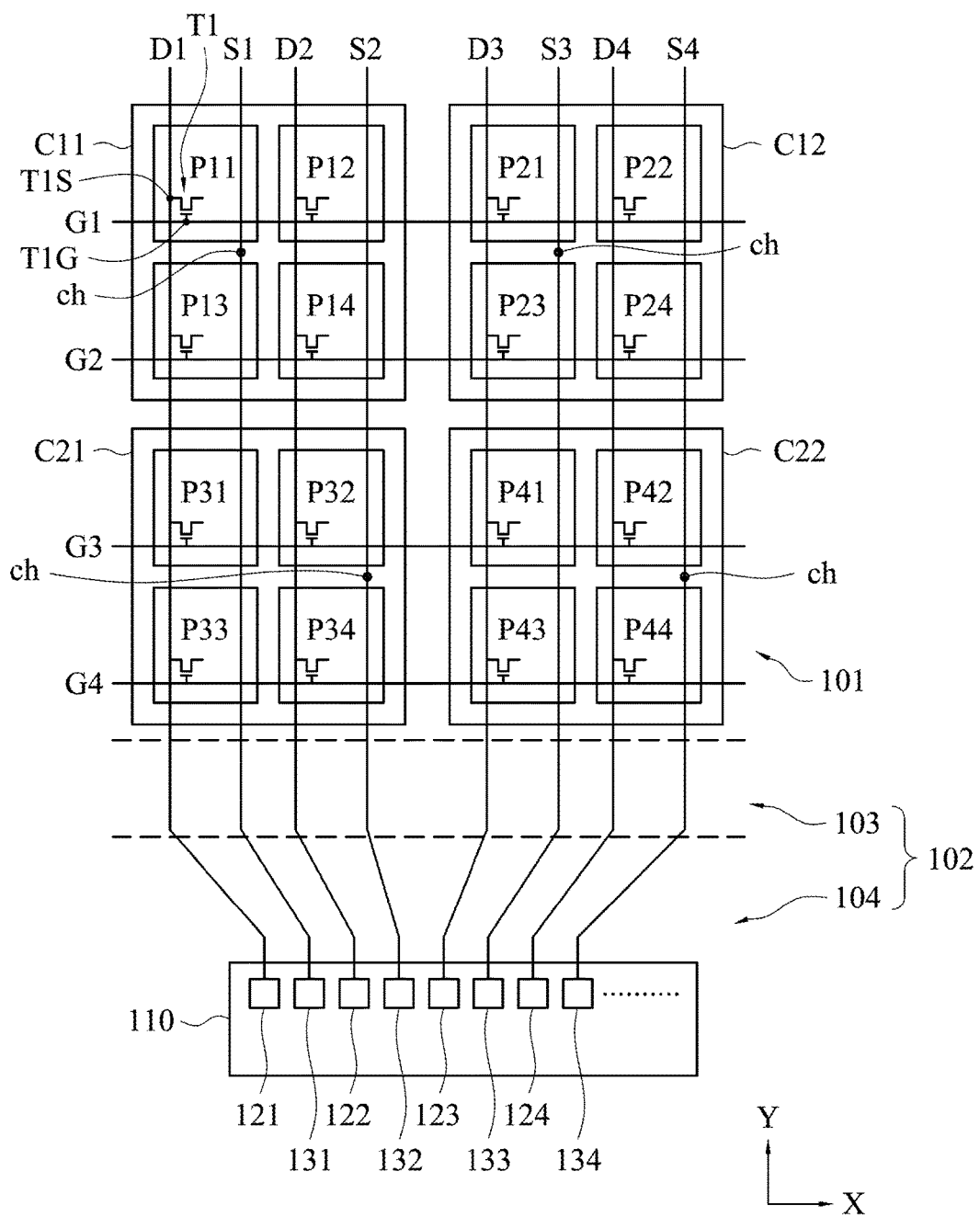
FIG. 1 is a schematic diagram illustrating a top view of the in-cell touch display panel in accordance of an embodiment.

FIG. 1 is a schematic diagram illustrating a top view of an in-cell touch display panel in accordance with an embodiment. Referring to FIG. 1, in an in-cell touch display panel 100, electrodes for detecting touch are disposed in pixel structures on a thin film transistor (TFT) substrate.

The in-cell touch display panel 100 has a display area 101 and a non-display area 102. The non-display area 102 includes a signal line transferring area 103 and a fan-out area 104. The display area 101 is described first. The display area 101 includes multiple pixel regions which are formed in areas where the gate lines are intersected with the data lines. Each pixel region has a pixel structure. To be specific, the display area 101 includes: pixel structures P11-P14, P21-P24, P31-P34 and P41-P44; gate lines G1-G4 extending along an X direction (also referred to a first direction); data lines D1-D4 extending along a Y direction (also referred to a second direction), in which the data lines D1-D4 are not connected to each other spatially; and touch sensing lines S1-S4 extending along the Y direction. An angle is included between the X direction and the Y direction. For example, the angle is in a range from 75 degrees to 105 degrees, and may be 90 degrees in some embodiments. The data lines D1-D4 are intersected with the gate lines G1-G4 on the first substrate, and a pixel structure is disposed in the intersection area. Each pixel structure includes a thin film transistor (TFT). Each of the data lines D1-D4 is electrically connected to the source of the TFT in the corresponding pixel structure, and each of the gate lines G1-G4 is electrically connected to the gate of the TFT in the corresponding pixel structure. For example, the pixel structure P11 includes a TFT T1 which has a gate T1G and a source T1S. The gate line G1 is electrically connected to the gate T1G, and the data line D1 is electrically connected to the source T1S. The display panel also includes a common electrode which is patterned to form touch electrodes C11, C12, C21 and C22 in the display area 101. Each touch electrode corresponds to multiple pixel electrodes and is electrically connected to at least one touch sensing line through a contact hole. For example, the pixel structures P11-P14 correspond to the touch electrode C11 which is electrically connected to the touch sensing line S1; the pixel structures P21-P24 correspond to the touch electrode C12 which is electrically connected to the touch sensing line S3; the pixel structures P31-P34 corresponds to the touch electrode C21 which is electrically connected to the touch sensing line S2; and the pixel structures P44-P44 corresponds to the touch electrode C22 which is electrically connected to the touch sensing line S4.

A period of a frame is at least divided into one or more display periods and one or more touch periods. During the display period, a common voltage is applied to the touch electrodes C11, C12, C21, and C22, and the voltage on the gate lines G1-G4 are configured to turn on the TFTs in the corresponding pixel structures sequentially, and the driving circuit 110 transmits pixel data to the pixel electrodes in the corresponding pixel structures through the data lines D1-D4 in order to set grey levels of pixels. During the touch period, the touch electrodes C11, C12, C21, and C22 are taken for detecting touch operations performed on the in-cell touch display panel 100, and the driving circuit 110 generates a touch sensing signal according to the voltage variation on the touch electrodes C11, C12, C21, and C22. In other words, the spatial resolution of the touch function depends on the number of the touch electrodes, the spatial resolution of the display function depends on the number of the pixels, and thus the resolution of the touch function is smaller than the resolution of the display function. The driving circuit 110 generates the touch sensing signal according to the voltage variation on the touch electrodes.

The signal line transferring area 103 is located between the display area 101 and the fan-out area 104. In the signal line transferring area 103, the data lines D1-D4 and the touch sensing lines S1-S4 may be transferred to other metal layers. For example, the touch sensing lines S1-S4 are formed by the third or second metal layer in the display area 101, but are transferred to a first metal layer in the fan-out area 104. Multiple connection structures are disposed in the signal line transferring area 103 for transferring the touch sensing lines S1-S4 from the third or second metal layer to the first metal layer. The embodiment of the connection structure would be described in detail below. In addition, a protection circuit and a transparent or opaque conductive layer may be disposed in the signal line transferring area 103 to prevent the in-cell touch display panel 100 from damage by static discharge. In some embodiments, the width of the signal line transferring area 103 is essentially equal to width of half pixel to one pixel, which is not limited in the invention.

A driving circuit 110 is disposed in the non-display area 102 on the in-cell touch display panel 100. The driving circuit 110 is electrically connected to display pads 121-124 and touch pads 131-134 which are disposed on the in-cell touch display panel 100. The display pads 121-124 are electrically connected to the data lines D1-D4 respectively and the touch pads 131-134 are electrically connected to the touch sensing lines S1-S4 respectively. In particular, along the X direction, one of the display pads is disposed between two of the touch pads, and one of the touch pads is disposed between two of the display pads. For example, the display pad 122 is disposed between the touch pad 131 and the touch pad 132, and the touch pad 131 is disposed between the display pad 121 and the display pad 122. In the embodiment of FIG. 1, the display pads 121-124 and the touch pads 131-134 are disposed in an interleaved way. In prior art (not shown), the display pads and the touch pads are arranged in a same row, and the display pads are continuously disposed, and then the touch pads are continuously disposed next to the display pad. Thus, the data lines D1-D4 would be overlapped with the touch sensing lines S1-S4 in the non-display area 102. However, as shown in FIG. 1, the data lines D1-D4 are parallel with the touch sensing lines S1-S4 in the display area 101, and they do not overlap with each other in the non-display area 102 because the display pads 121-124 and the touch pads 131-134 are disposed in the interleaved way.

In some embodiments, the driving circuit 110 is disposed on a flexible circuit board such as a Tape Carrier Package (TCP) or a Chip on Film (COF). Alternatively, the driving circuit 110 may be disposed on the thin film transistor substrate. In addition, the driving circuit 110 may be a Touch and Display Driver Integration (TDDI) single chip providing display and touch functions simultaneously. Or, the driving circuit 110 may include multiple chips which provide display function and touch function respectively. The driving circuit 110 may be a Gate-Driver In Plane (GIP) or an Integrated Gate Driver (IGD). Moreover, the number of the driving circuit 110 may be greater than one that are disposed at two sides (e.g. upper side and lower side, or left-hand side and right-hand side) of the panel or disposed just one side of the panel.

Figure 2:
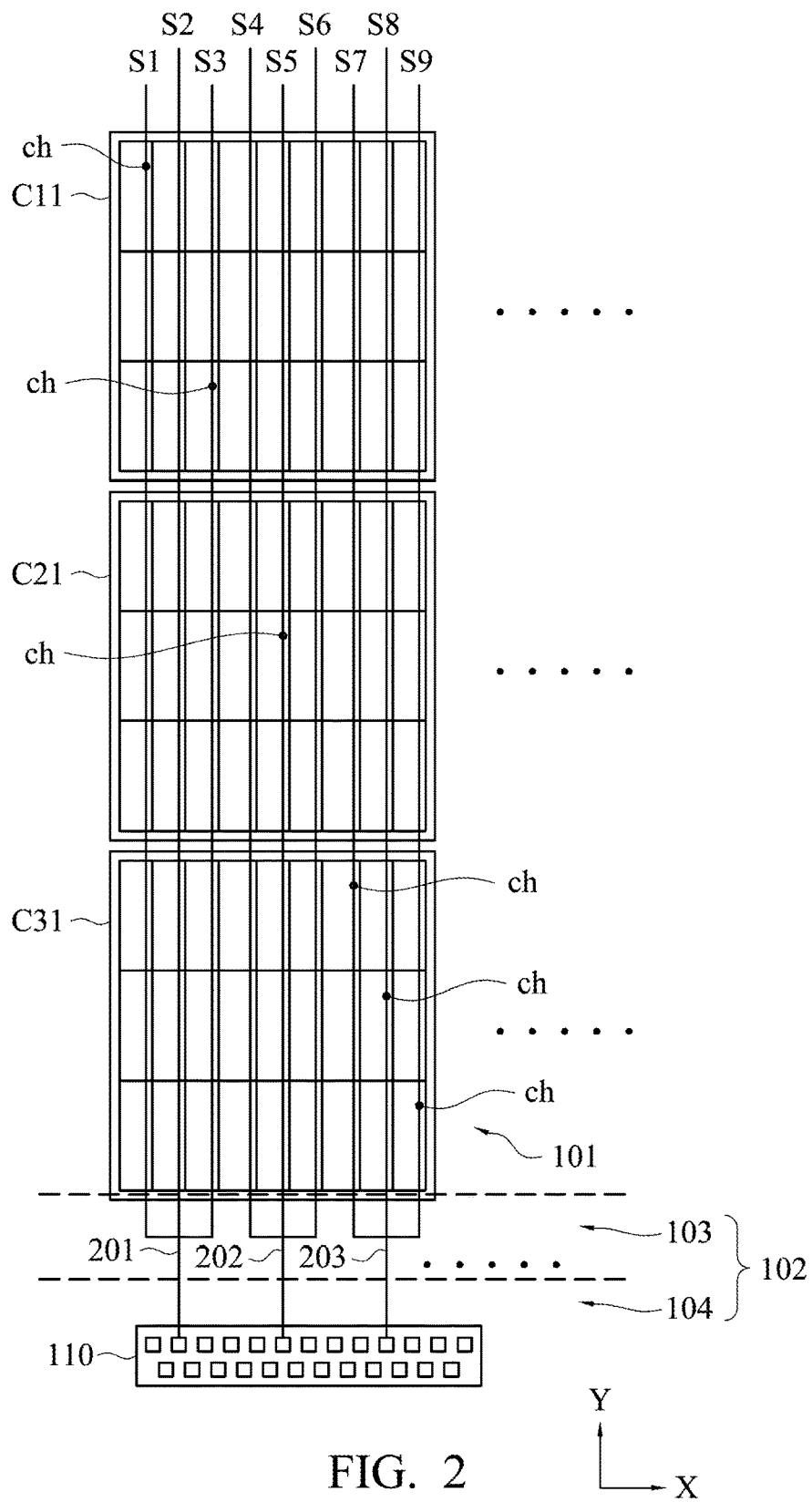
FIG. 2 is a schematic diagram illustrating connection between the touch sensing lines and a driving circuit in accordance with an embodiment.

Every four pixel structures share one touch electrode In FIG. 1, but more or less pixel structures may share one common electrode in other embodiments. In addition, the number of the data lines D1-D4 is equal to the number of the touch sensing lines S1-S4 in FIG. 1, but in practice, every pixel structure (also referred to sub-pixel) generally renders a single color, and a pixel is composed of three sub-pixels which are generally arranged along the X direction. Therefore, the resolution of the pixel structures along the X direction is greater than the resolution of that along the Y direction. In some embodiments, at least two of the touch sensing lines are connected to each other and then is electrically connected to one touch pad though a conductive line. For example, referring to FIG. 2, FIG. 2 is a schematic diagram illustrating connection between the touch sensing lines and the driving circuit in accordance with an embodiment. For simplification, conductive lines such as the data lines and the gate lines are not shown in FIG. 2. In the embodiment of FIG. 2, each of the touch electrodes C11, C21, and C31 includes 27 pixel structures arranged as 3 rows and 9 columns. At least one of the touch sensing lines S1-S3 is electrically connected to the touch electrode C11 through a contact hole ch, and the touch sensing lines S1-S3 are connected to each other in the signal line transferring area 103, and then is electrically connected to one touch pad through a conductive line 201. At least one of the touch sensing lines S4-S6 is electrically connected to the touch electrode C21 through the contact hole ch, and the touch sensing lines S4-S6 are connected to each other in the signal line transferring area 103, and then they are electrically connected to one touch pad through a conductive line 202. At least one of the touch sensing lines S7-S9 is electrically connected to the touch electrode C31 through the contact hole ch, and the touch sensing lines S7-S9 are connected to each other in the signal line transferring area 103, and then they are electrically connected to one touch pad through a conductive line 203. In the embodiment of FIG. 2, two of the touch sensing lines S1-S3 are electrically connected to the touch electrode C11 through two contact holes ch, one of the touch sensing lines S4-S6 is electrically connected to the touch electrode C21 through one contact hole ch, and three of the touch sensing lines S7-S9 are electrically connected to the touch electrode C31 through three contact holes ch. The number of touch sensing lines that each touch electrode is electrically connected to is not limited in the invention. For example, if there are five touch sensing lines passing through one touch electrode, then the touch electrode may be electrically connected to any number (ex. 1-5) of the five touch sensing lines.

In addition, each pixel structure has at least a data line, and each data line is connected to one display pad. In other words, the number of the display pads is more than the number of touch pads. In the embodiment of FIG. 2, one touch pad is disposed between every three display pads, and thus the touch sensing lines and the data lines are not overlapped with each other in the non-display area 102.

FIG. 3A to FIG. 3G is a schematic diagram illustrating disposition of display pads and touch pads in accordance with some embodiments. For simplification, the data lines and the touch sensing lines respectively connected to display pads DP and touch pads TP are not shown in FIG. 3A to FIG. 3G.

Figure 3A:
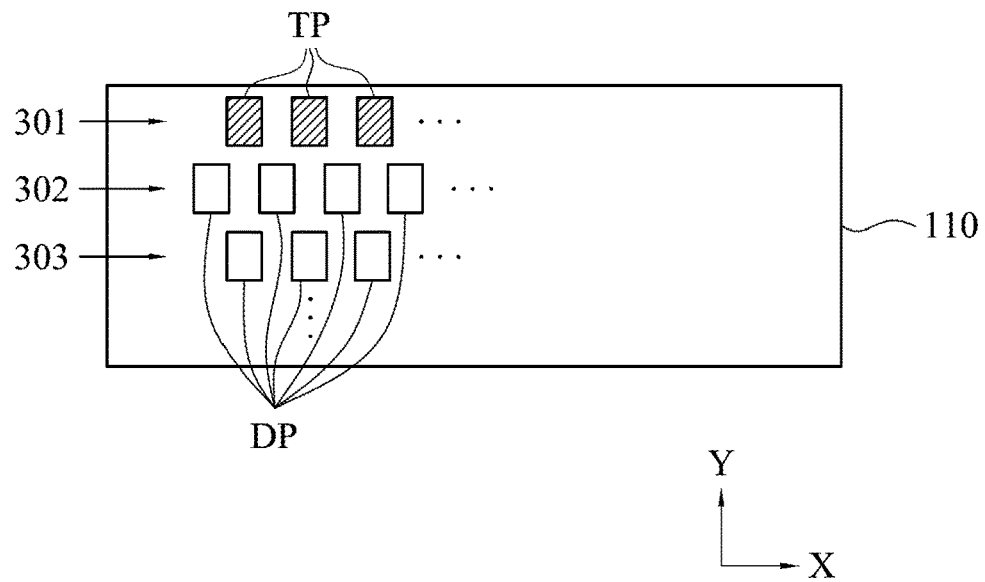
FIG. 3A to FIG. 3G is a schematic diagram illustrating disposition of display pads and touch pads in accordance with some embodiments.
Figure 3B:
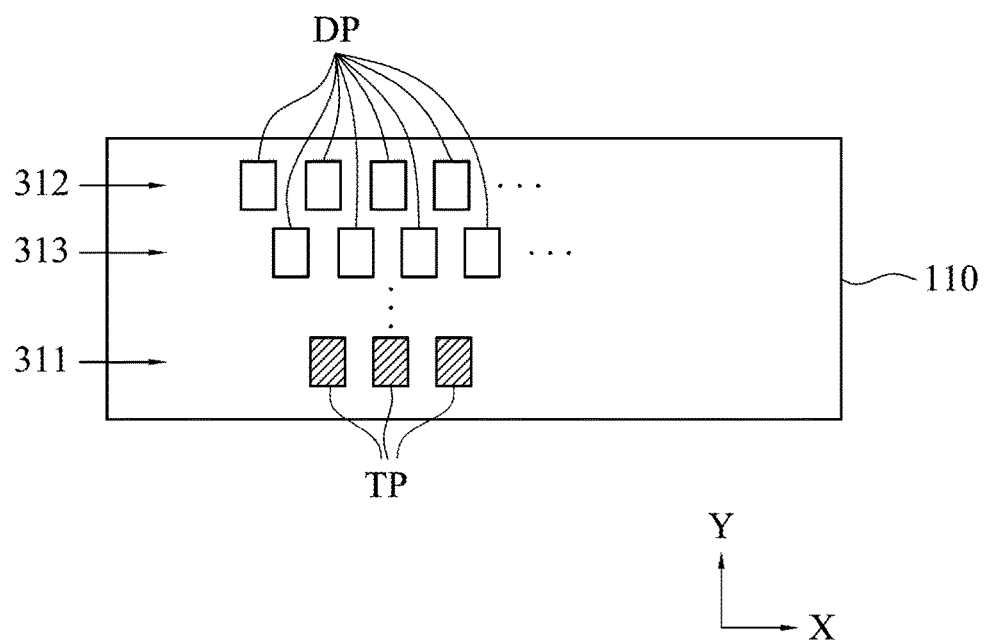

Referring to FIG. 3A, in some embodiments, the display pads and the touch pads are arranged, along the Y direction, as a first row 301, a second row 302, and a third row 303. The first row 301 only includes the touch pads TP, and the second row 302 and the third row 303 only include the display pads DP. In this embodiment, all touch pads are disposed in the first row 301, but all touch pads may be arranged as several rows in other embodiments. In addition, the touch pads TP are disposed on the top in FIG. 3A, that is, the touch pads TP are disposed between the display area and the display pads DP. FIG. 3B is similar to FIG. 3A, in which the display pads and the touch pads are arranged, along the Y direction, as a first row 311, a second row 312 and a third row 313. The second row 312 and the third row 313 only include the display pads DP, and the first row 311 only includes the touch pads TP. However, the touch pads TP are disposed on the bottom in FIG. 3B, that is, the display pads DP are disposed between the display area and the touch pads.

Figure 3C:
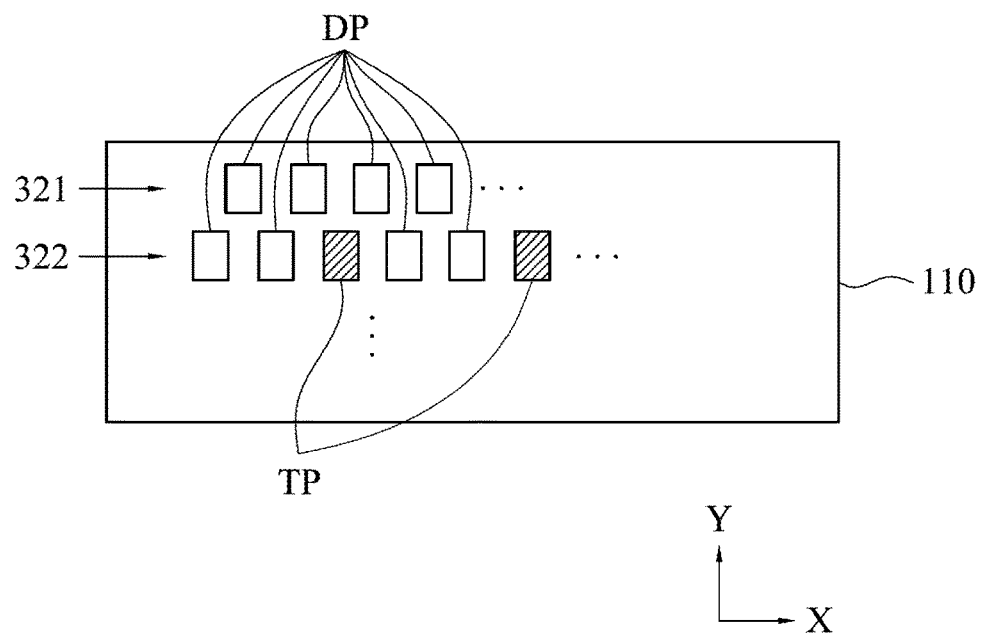
Figure 3D:
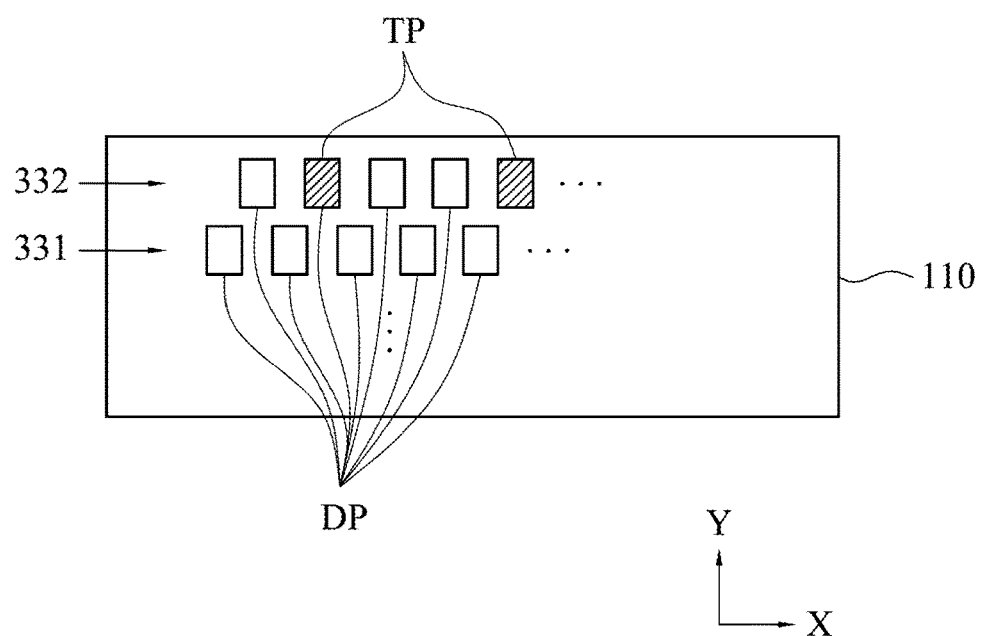

In FIG. 3C, the display pads and the touch pads are arranged, along the Y direction, as a first row 321 and a second row 322. The first row 321 only includes a portion of the display pads DP, and the second row 322 includes a portion of the display pad DP and the touch pads TP. The touch pads TP are inserted into the display pads DP of the second row 322 in FIG. 3C. The first row 321 is disposed on the top, that is, the first row 321 is disposed between the display area and the second row 322. FIG. 3D is similar to FIG. 3, but the difference between FIG. 3C and FIG. 3D is that the second row 332 having the touch pads TP and the display pads DP is disposed on the top, that is, the second row 332 is disposed between the display area and the first row 331. The touch pads TP are inserted into the display pads DP of the second row 332 as shown in FIG. 3D.

Figure 3E:
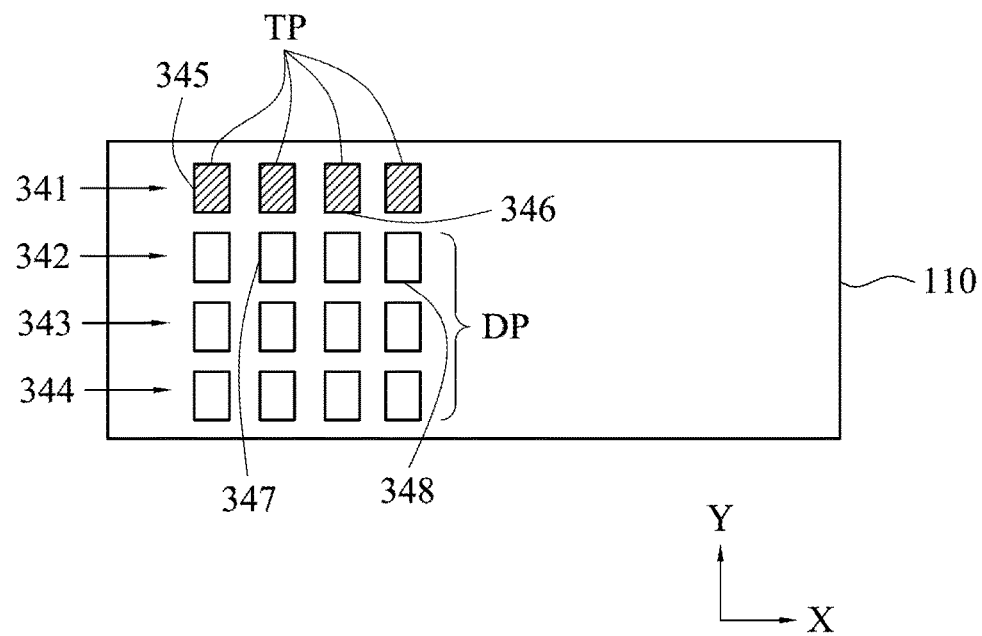

In FIG. 3E, the display pads and the touch pads are arranged, along Y direction, as a first row 341, a second row 342, a third row 343 and a fourth row 344. The first row 341 only includes touch pads TP; the second row 342, the third row 343 and the fourth row 344 only include display pads DP. Moreover, the touch pads TP are overlapped with the display pads DP along Y direction.

Figure 3F:
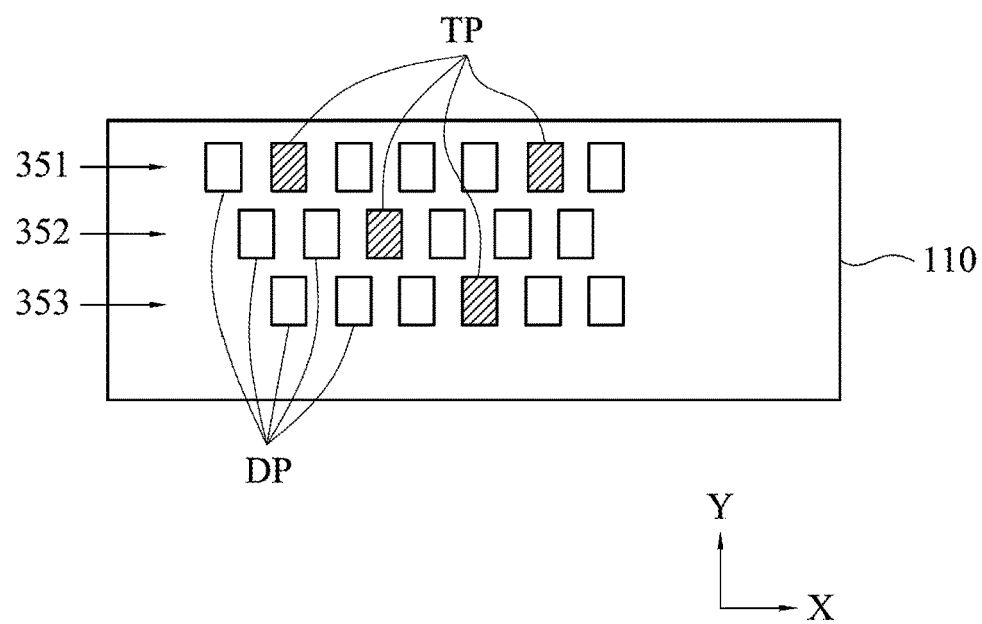

In FIG. 3F, the touch pads TP are evenly distributed in the first row 351, the second row 352 and the third row 353. In the same row, three display pads DP are disposed between two adjacent touch pads TP. In addition, the touch pads TP are overlapped with each other along Y direction.

Figure 3G:
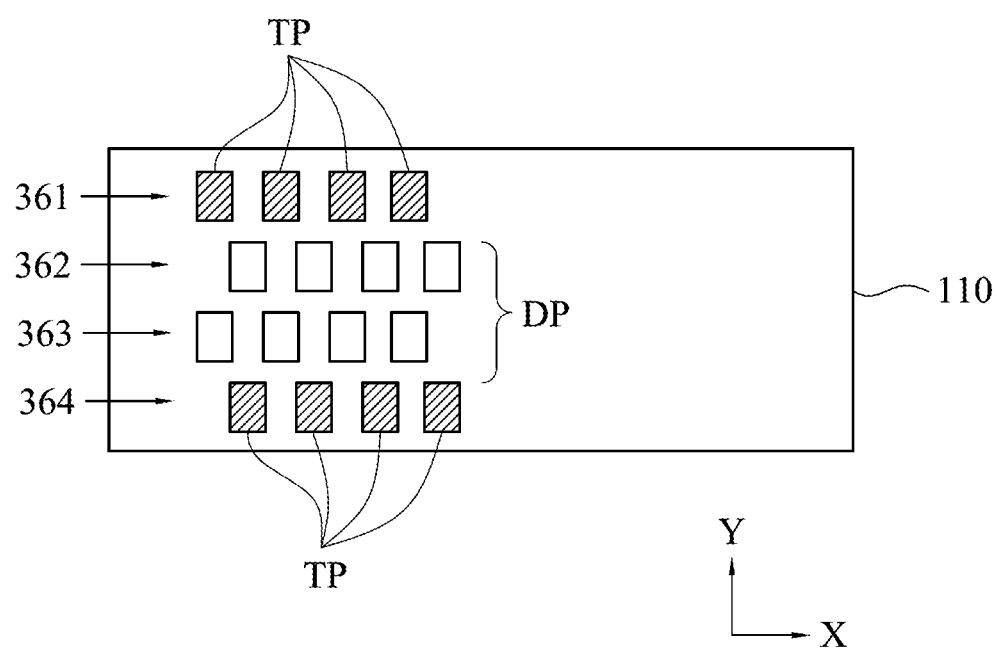

In FIG. 3G, a first row 361 only includes touch pads TP, a second row 362 and a third row 363 only include display pads DP, and a fourth row 364 only includes touch pads TP. Along Y direction, the touch pads TP in the first row 361 are overlapped with the touch pads TP in the fourth row 364, and the display pads DP in the second row 362 are overlapped with the display pads DP in the third row 363.

In the embodiments of FIG. 3A to FIG. 3G, the width of each touch pad TP along the X direction is equal to that of each display pad DP. However, in other embodiments, the width of each touch pad TP along the X direction may be wider than that of the display pad DP, which is not limited in the invention. Note that the description of "one display pad is disposed between two touch pads along X direction" may be interpreted as "the projection of one display pad onto X axis is disposed between the projections of two touch pads onto X axis", and thus it encompass the embodiments of FIG. 3A to FIG. 3G. For example, in FIG. 3E, the display pads 347 is disposed between the touch pads 345 and the touch pads 346 along X direction, and the touch pads 346 is disposed between the display pads 347 and the display pads 348. From another aspect, a projection of the display pads 347 onto X axis is located between two projections of the touch pads 345 and the touch pads 346 onto X axis. A projection of the touch pads 346 onto X axis is between two projections of the display pads 347 and the display pads 348 along X axis. The description may be applied to FIG. 3A to FIG. 3D, and FIG. 3F to FIG. 3G, and the description will not be repeated.

Figure 4A:
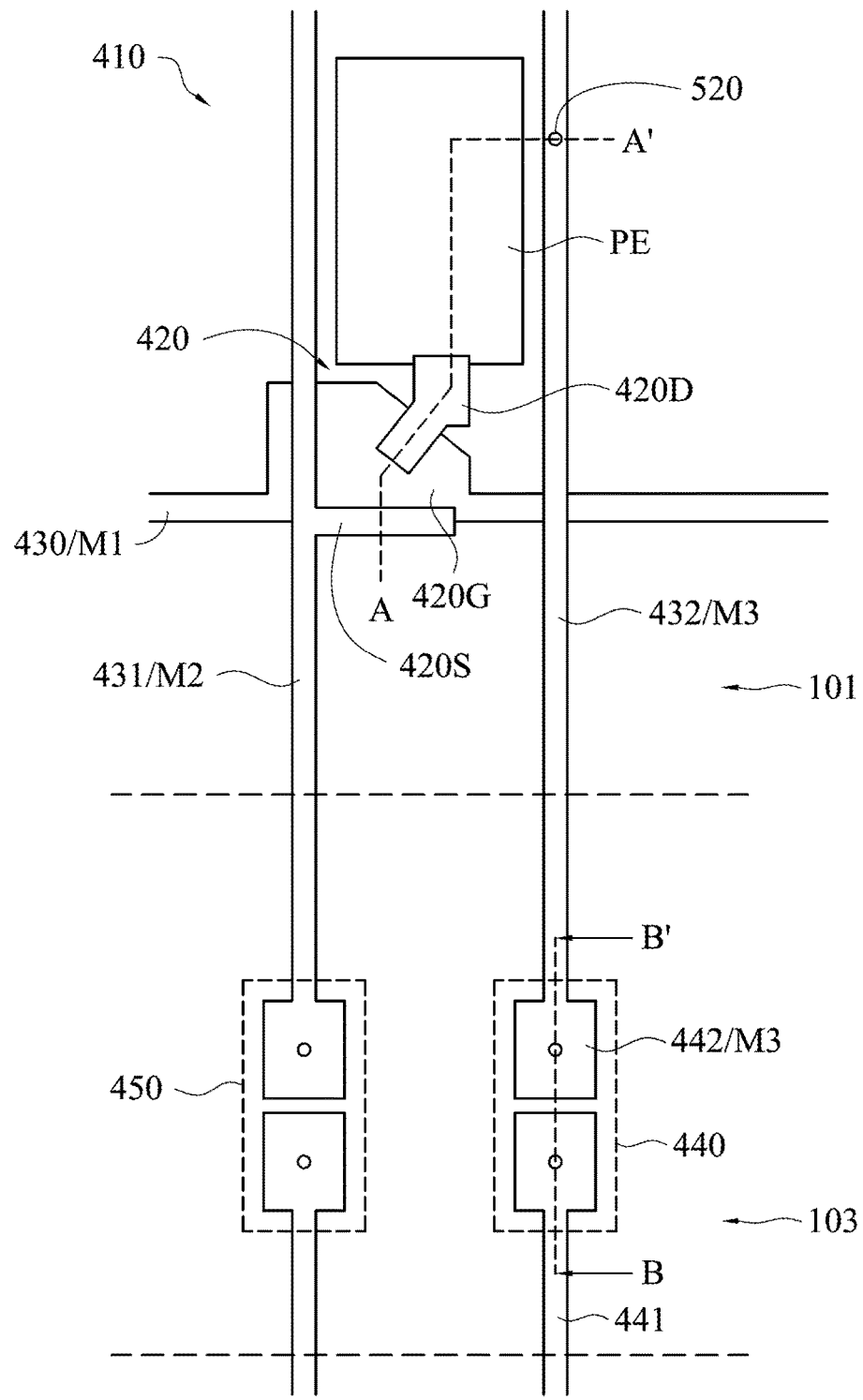
FIG. 4A is a top view of pixel structure in accordance with an embodiment.
Figure 5A:
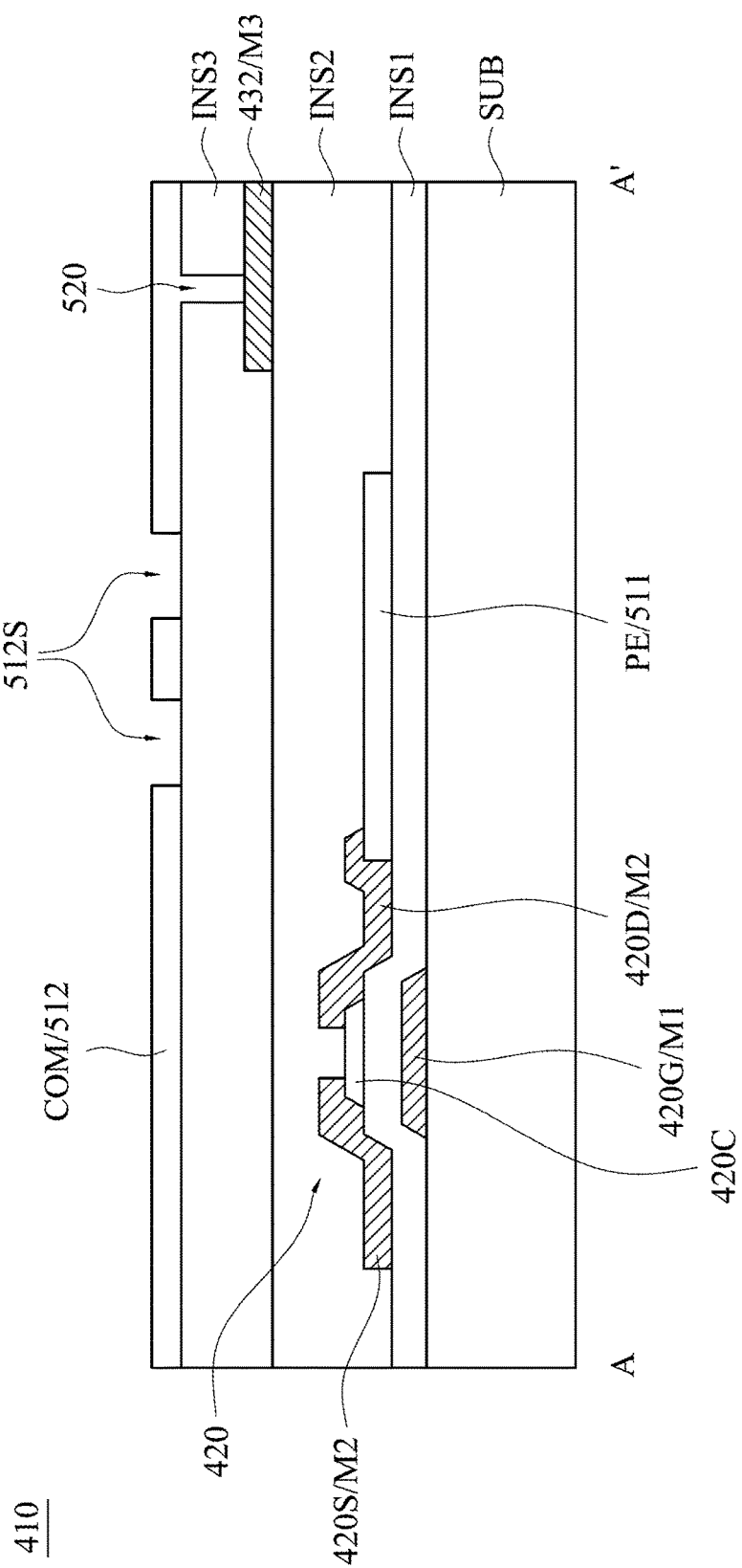
FIG. 5A is a cross-sectional view of pixel structure along a cross-sectional line AA' of FIG. 4A.

FIG. 4A is a top view of pixel structure in accordance with an embodiment. FIG. 5A is a cross-sectional view of pixel structure along a cross-sectional line AA' of FIG. 4A. Referring to FIG. 4A, a pixel structure 410 is taken as an example. The pixel structure 410 includes a TFT 420, a pixel electrode PE and a sub-common electrode COM (not shown in FIG. 4A). The TFT 420 includes a gate 420G, a source 420S and a drain 420D. A gate line 430 formed in a first metal layer M1 is connected to the gate 420G. A data line 431 formed in a second metal layer M2 is connected to the source 420S. A touch sensing line 432 formed in a third metal layer M3 is connected to the sub-common electrode COM. Referring to FIG. 4A and FIG. 5A, the first metal layer M1 is formed on a substrate SUB, and the first metal layer M1 includes the gate 420G. A first insulation layer INS1 (also referred to gate insulation layer) is formed on the first metal layer M1. A semiconductor layer 420C is formed on the first insulation layer INS1 as a channel region of the TFT 420. A first transparent conductive layer 511 is formed on the first insulation layer INS1, and includes the pixel electrode PE. The second metal layer M2 is formed on the semiconductor layer 420C, and includes the source 420S and the drain 420D which is connected to the pixel electrode PE. A second insulation layer INS2 is formed on the second metal layer M2 and the first transparent conductive layer 511. A third metal layer M3 is formed on the second insulation layer INS2, and the touch sensing line 432 is formed in the third metal layer M3 in the display area 101. A third insulation layer INS3 is formed on the third metal layer M3, and includes a contact hole 520. A second transparent conductive layer 512 is formed on the third insulation layer INS3, and includes the sub-common electrode COM which has at least one slits 512S. In other words, the pixel electrode PE is spatially insulated from the sub-common electrode COM. In the display area 101, the touch sensing line 432 is electrically connected to the sub-common electrode COM through the contact hole 520. Consequently, the common voltage is applied to the sub-common electrode COM in the display period, and an electric field between the sub-common electrode COM and the pixel electrode PE is configured to control the orientation of the liquid crystal. In the touch period, the sub-common electrode COM serves as a portion of the touch electrode, and the voltage on which is transmitted to the driving circuit through the touch sensing line 432 to generate the touch sensing signal.

Figure 5C:
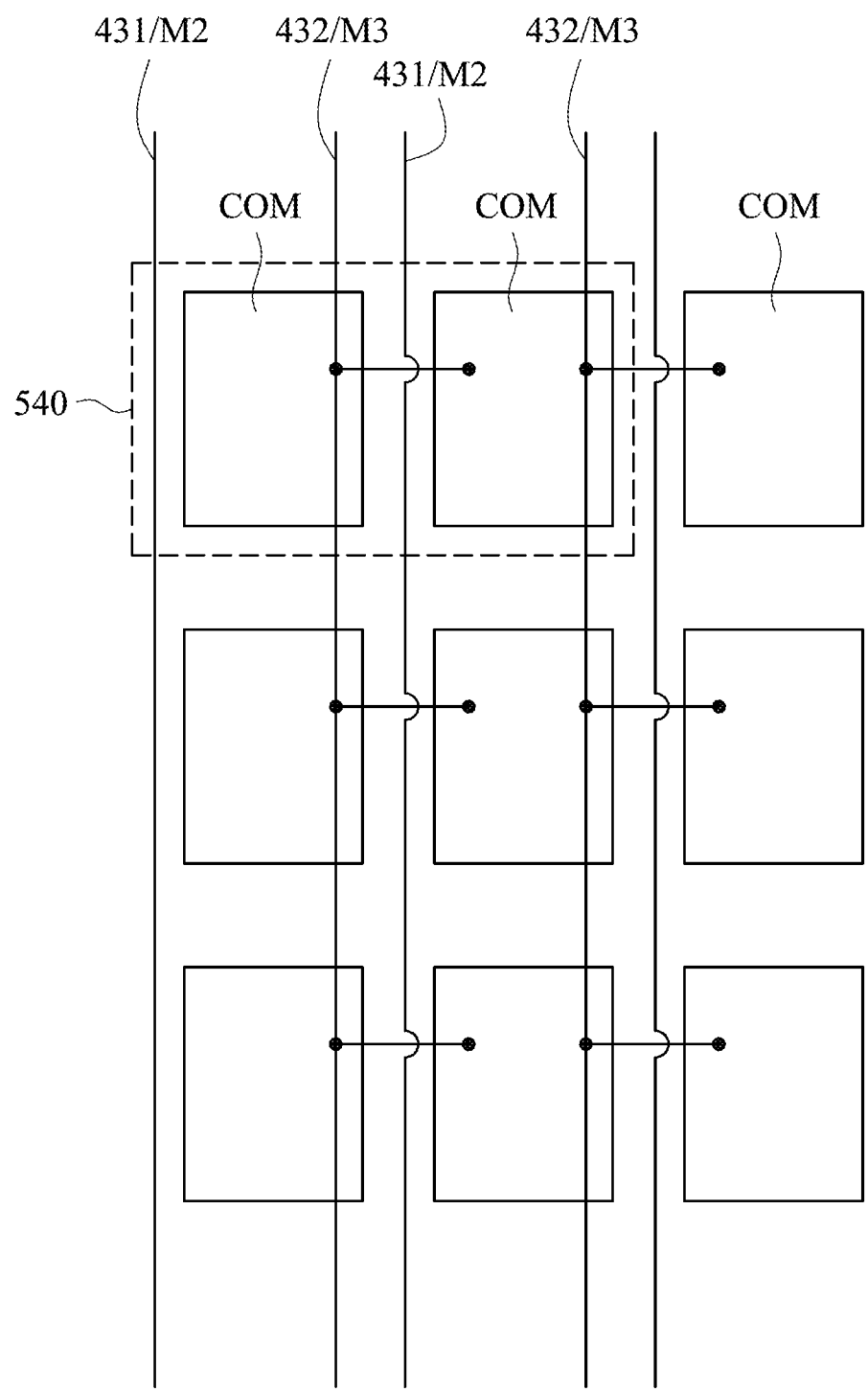
FIG. 5C is a circuit diagram of common electrodes of FIG. 5B_1.

The sub-common electrode COM is disposed above the pixel electrode PE in the embodiment of FIG. 5A. However, in other embodiments, the sub-common electrode COM may be disposed below the pixel electrode PE. For example, referring to FIG. 5B_1 and FIG. 5C, FIG. 5B_1 illustrates two pixel structure in an area 540 of FIG. 5C. In order to distinguish two sub-common electrodes COM of FIG. 5C, the sub-common electrodes in two adjacent pixel structures of FIG. 5B_1 are labeled as a first sub-common electrode COM1 and a second sub-common electrode COM2. When the sub-common electrodes COM1, COM2 are disposed below the pixel electrode PE, the sub-common electrodes COM1, COM2 and the second metal layer M2 are formed directly on the same layer (the first insulation layer INS1), that is, the sub-common electrodes COM1, COM2 and the second metal layer M2 are in direct contact with the first insulation layer INS1. Consequently, the sub-common electrode COM1 cannot across the data lines 431 to electrically connect the sub-common electrode COM2. Therefore, multiple metal connection structures (e.g. metal connection structure 535) are disposed for electrically connecting the sub-common electrodes in two adjacent pixel structures. In addition, the metal connection structures are not formed in the second metal layer. In the embodiment of FIG. 5B_1, the metal connection structures are formed in the third metal layer M3.

Referring to FIG. 5B_2, the sub-common electrodes COM1, COM2 are electrically connected to each other through the metal connection structure 535 along X direction. However, along Y direction, the sub-common electrode would not across the second metal layer, which is in the same layer, and therefore two sub-common electrodes are electrically connected to each other through an extending portion. In detail, the sub-common electrode COM1 and the sub-common electrode COM3, which are adjacent to each other along Y direction, are electrically connected to each other through an extending portion 591; the sub-common electrode COM2 and a sub-common electrode COM4, which are adjacent to each other along Y direction, are electrically connected to each other through an extending portion 592. The extending portions 591, 592 would across the gate lines 430, and the width of the extending portion along X direction is smaller than that of the sub-common electrodes COM1, COM2, COM3, and COM4.

Figure 5D:
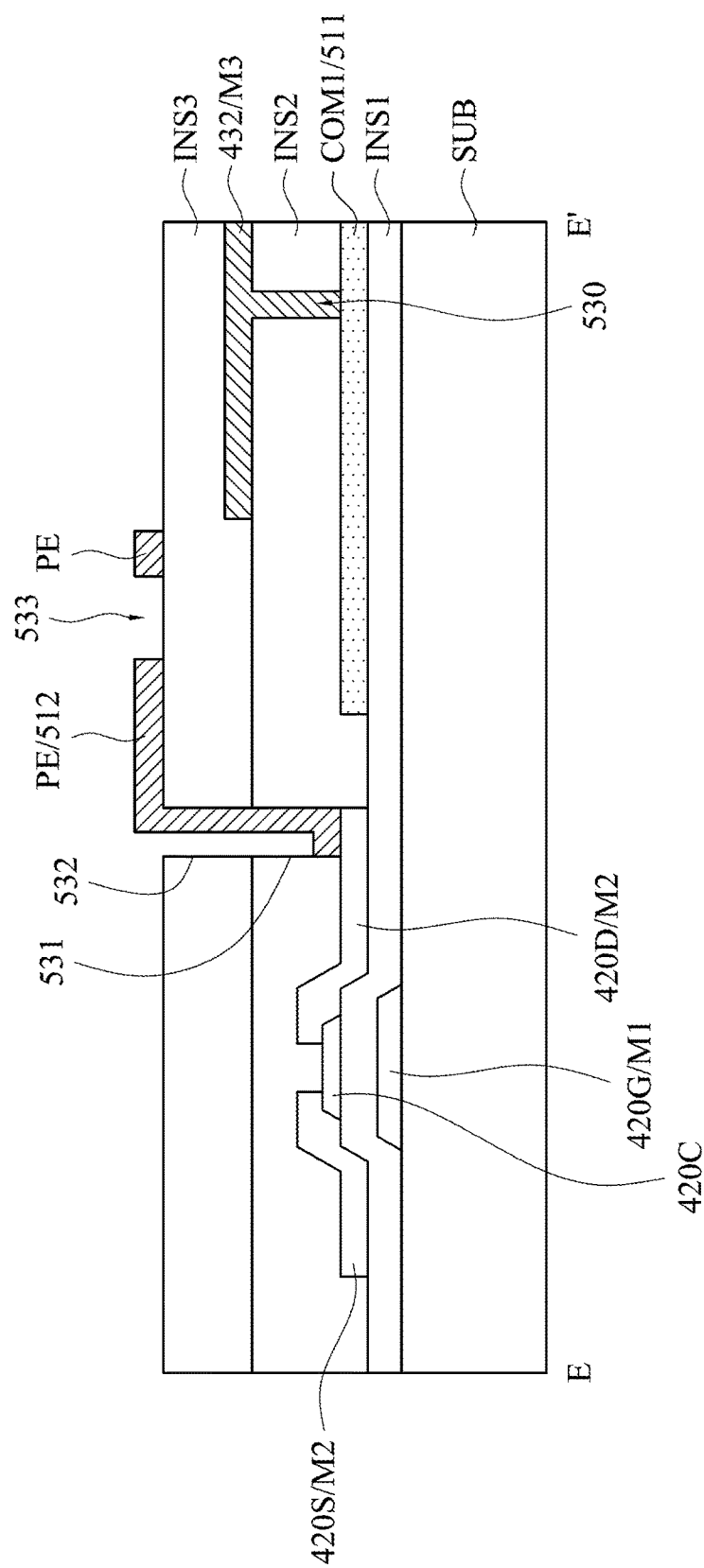
FIG. 5D is a cross-sectional view of pixel structure along a cross-sectional line EE' of FIG. 5B_1.
Figure 5E:
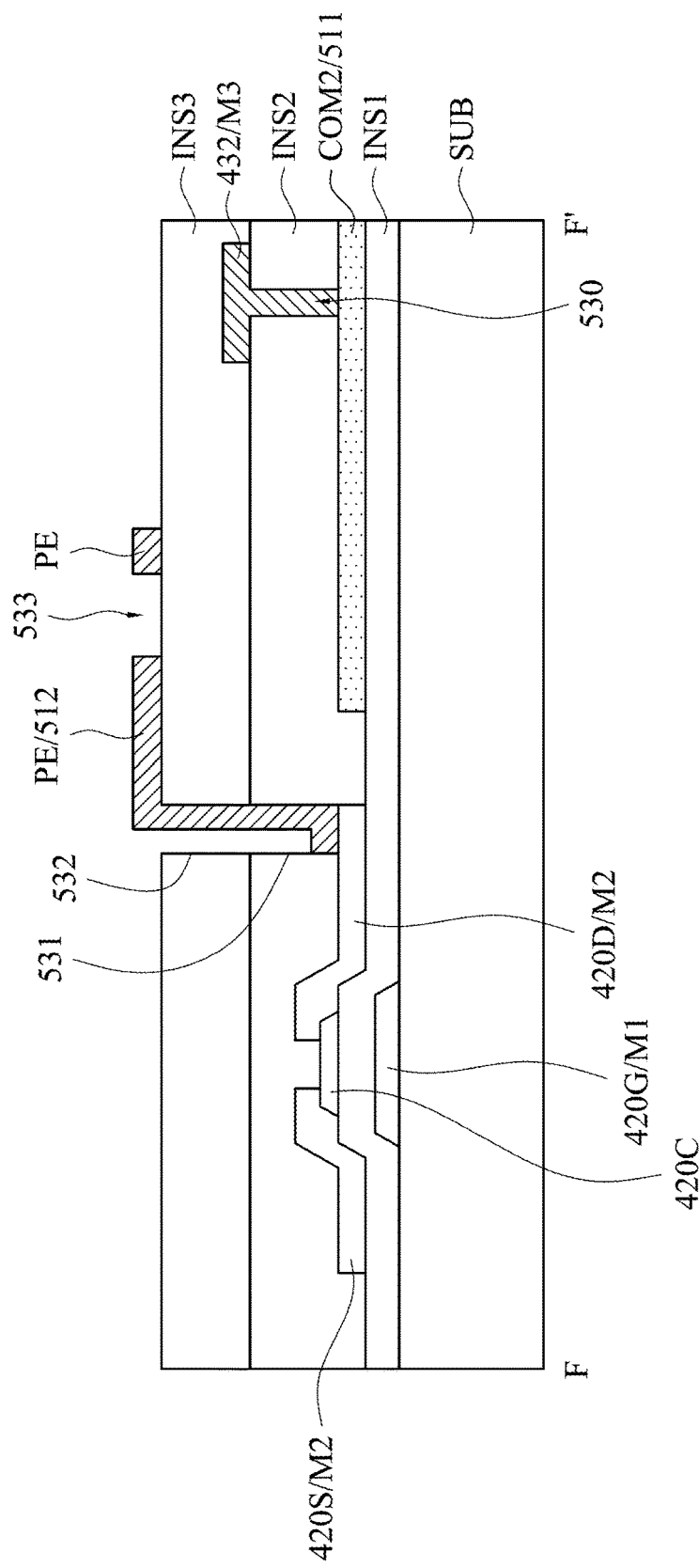
FIG. 5E is a cross-sectional view of pixel structure along a cross-sectional line FF' of FIG. 5B_1.
Figure 5F:
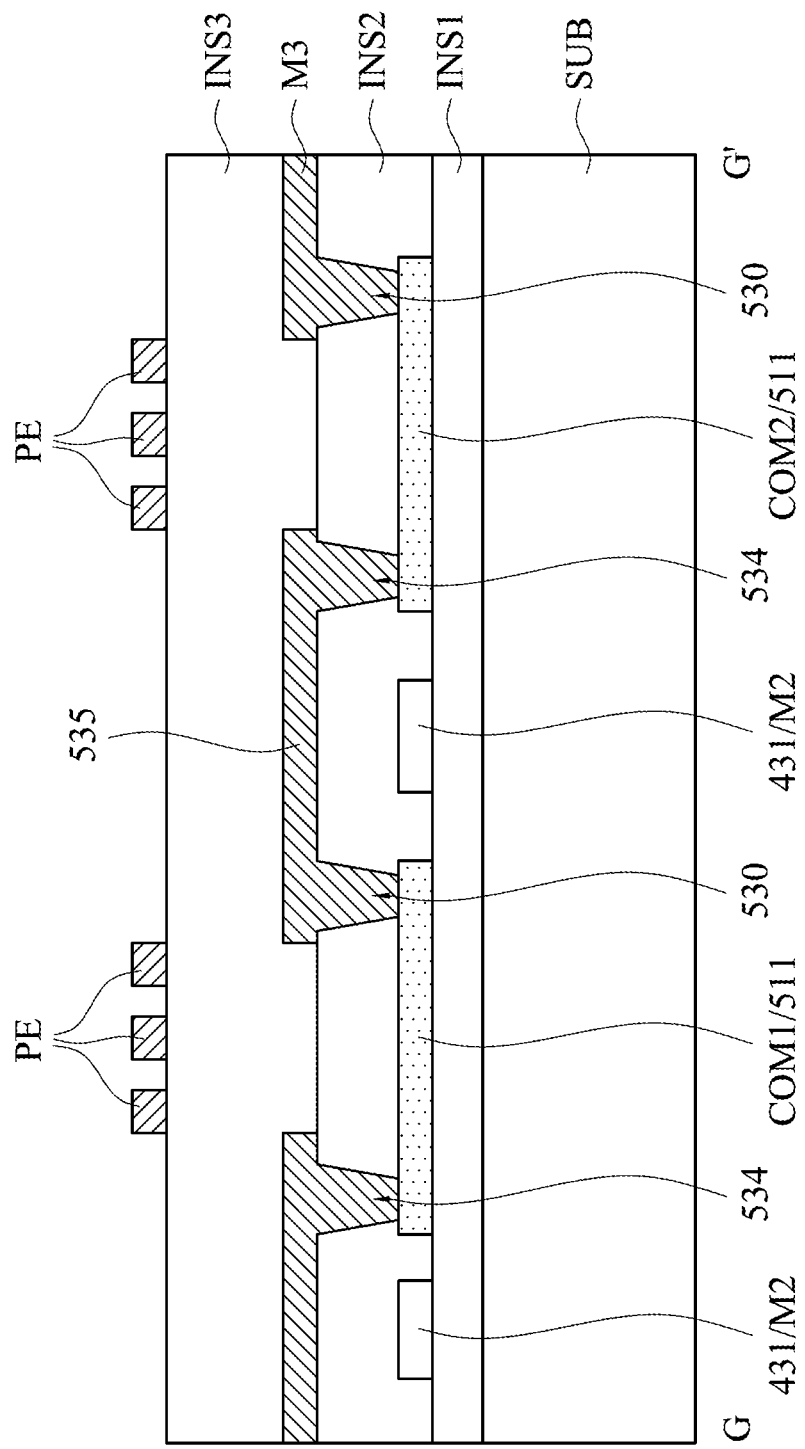
FIG. 5F is a cross-sectional view of pixel structure along across-sectional line GG' of FIG. 5B_1.

To be specific, referring to FIG. 5B_1, FIG. 5D, FIG. 5E and FIG. 5F, FIG. 5D is a cross-sectional view of pixel structure along a cross-sectional line EE' of FIG. 5B_1, FIG. 5E is a cross-sectional view of pixel structure along a cross-sectional line FF' of FIG. 5B_1, and FIG. 5F is a cross-sectional view of pixel structure along across-sectional line GG' of FIG. 5B_1. The units of FIG. 5D to FIG. 5F that are similar to that of FIG. 5A will not be described again. In FIG. 5D to FIG. 5F, the second metal layer M2 and the first transparent conductive layer 511 are both disposed on the first insulation layer INS1 and are in direct contact with the first insulation layer INS1. The first transparent conductive layer 511 includes the sub-common electrodes COM1, COM2. The second insulation layer INS2 is formed on the second metal layer M2 and the first transparent conductive layer 511. The second insulation layer INS2 includes a contact hole 530, a contact hole 531 and a contact hole 534. The contact hole 531 exposes the drain 420D. The contact holes 530, 534 in a single pixel structure are disposed at two sides of the sub-common electrode to expose the sub-common electrode of the pixel structure. For example, the contact holes 530, 534 are disposed at two sides of the sub-common electrode COM1, COM2. The third metal layer M3 is formed on the second insulation layer INS2. In the display area 101, the touch sensing lines 432 is formed in the third metal layer M3. The touch sensing lines 432 is electrically connected to the sub-common electrode COM1, COM2 through the contact hole 530. In addition, the third metal layer M3 also includes the metal connection structure 535 which is electrically connected to the touch sensing lines 432 (also electrically connected to the sub-common electrode COM1), and extend to the contact hole 534 in the adjacent pixel structures from the contact hole 530, and is electrically connected to the sub-common electrode COM2 through the contact hole 534. As a result, two adjacent sub-common electrodes COM1, COM2 are electrically connected to each other through the metal connection structure 535. Moreover, the third insulation layer INS3 is formed on the second insulation layer INS2 and the third metal layer M3, and the third insulation layer INS3 has a contact hole 532 corresponding to the contact hole 531. The second transparent conductive layer 512 is formed on the third insulation layer INS3, and has the pixel electrode PE. In some embodiments, the pixel electrode PE has as least one slits 533. In addition, the pixel electrode PE is electrically connected to the drain 420D through the contact holes 532, 531.

Figure 5G:
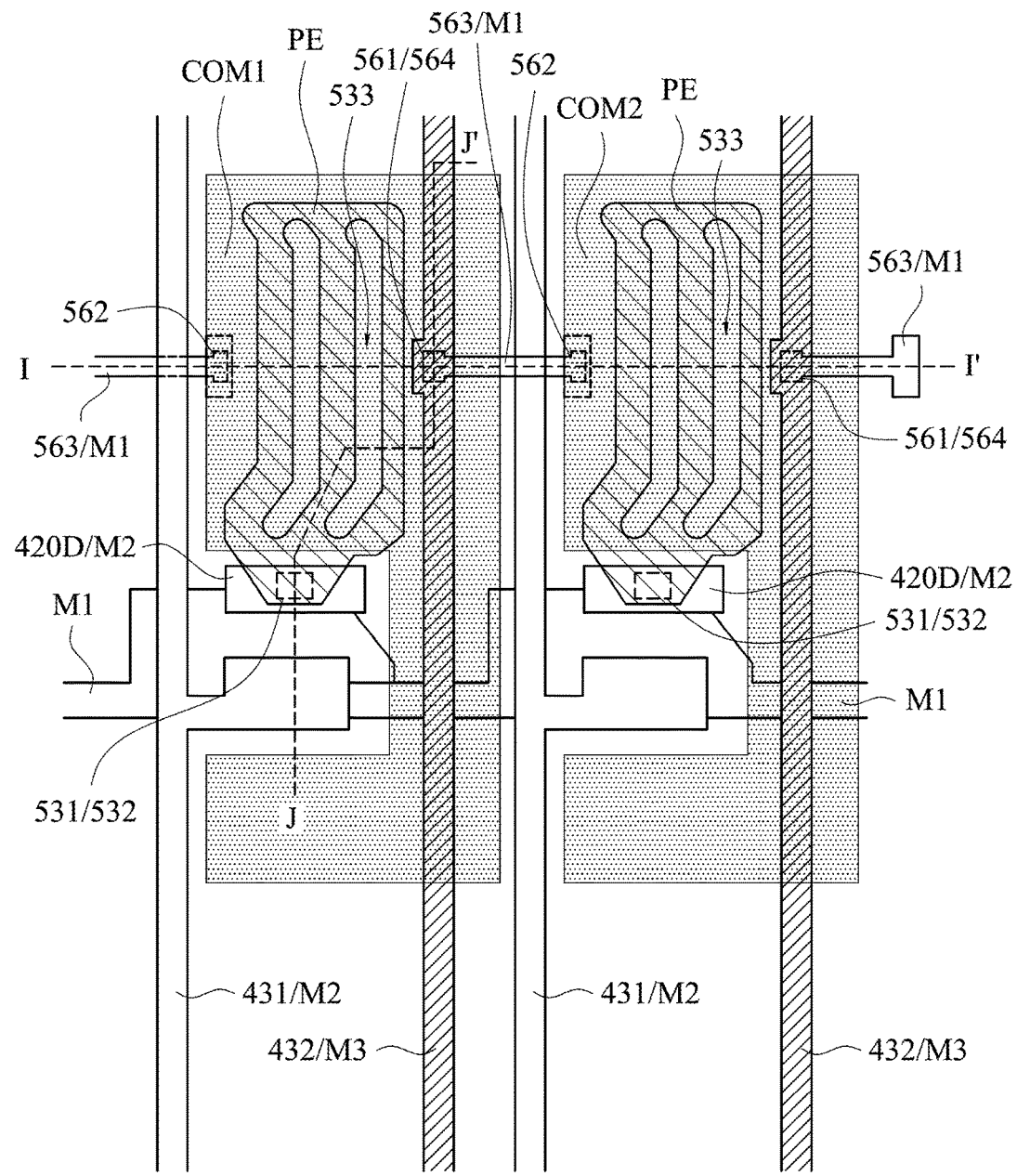
FIG. 5G is a top view of pixel structure in accordance with another embodiment.
Figure 5H:
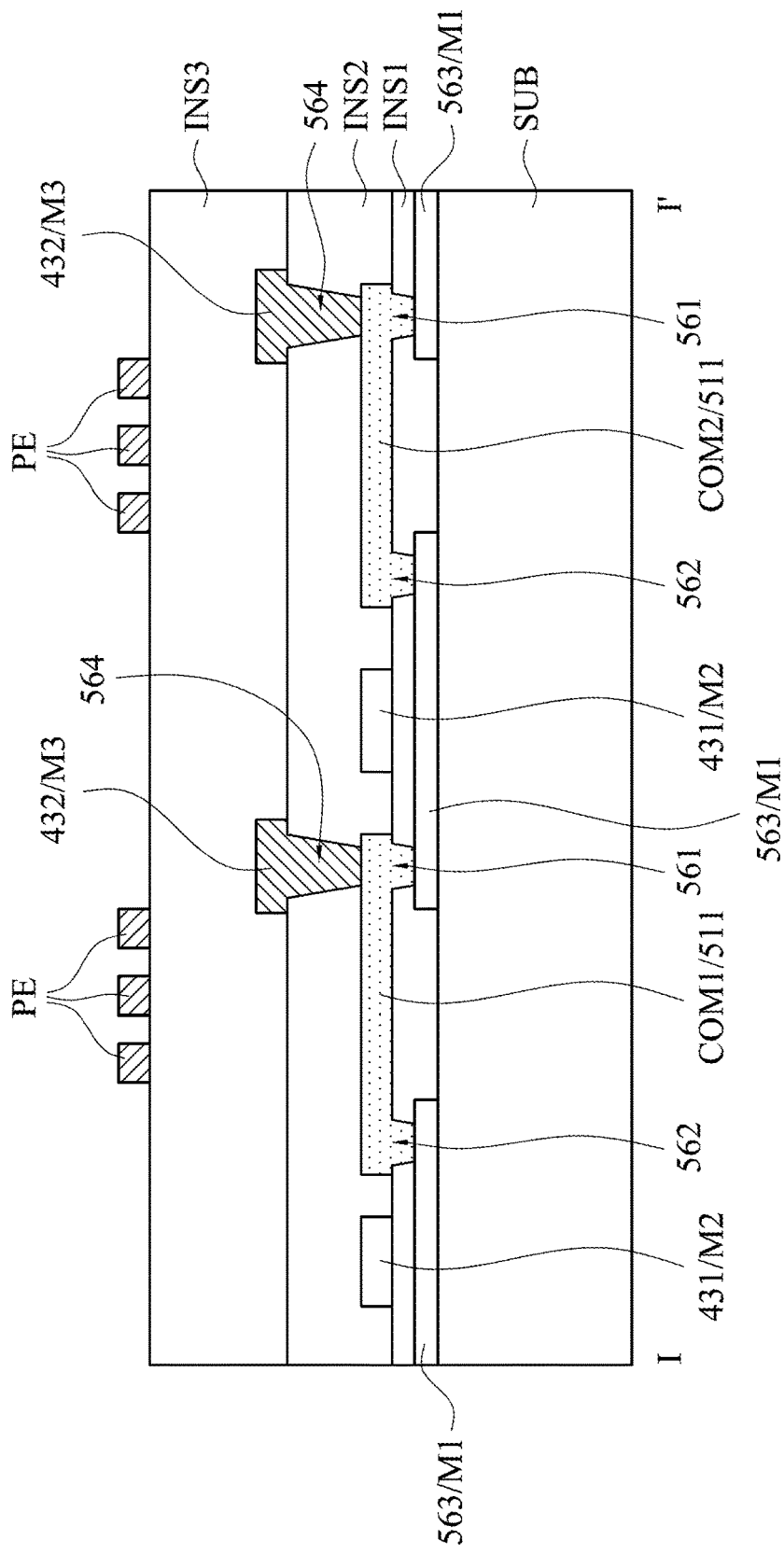
FIG. 5H is a cross-sectional view of pixel structure along a cross-sectional line II' of FIG. 5G.
Figure 5I:
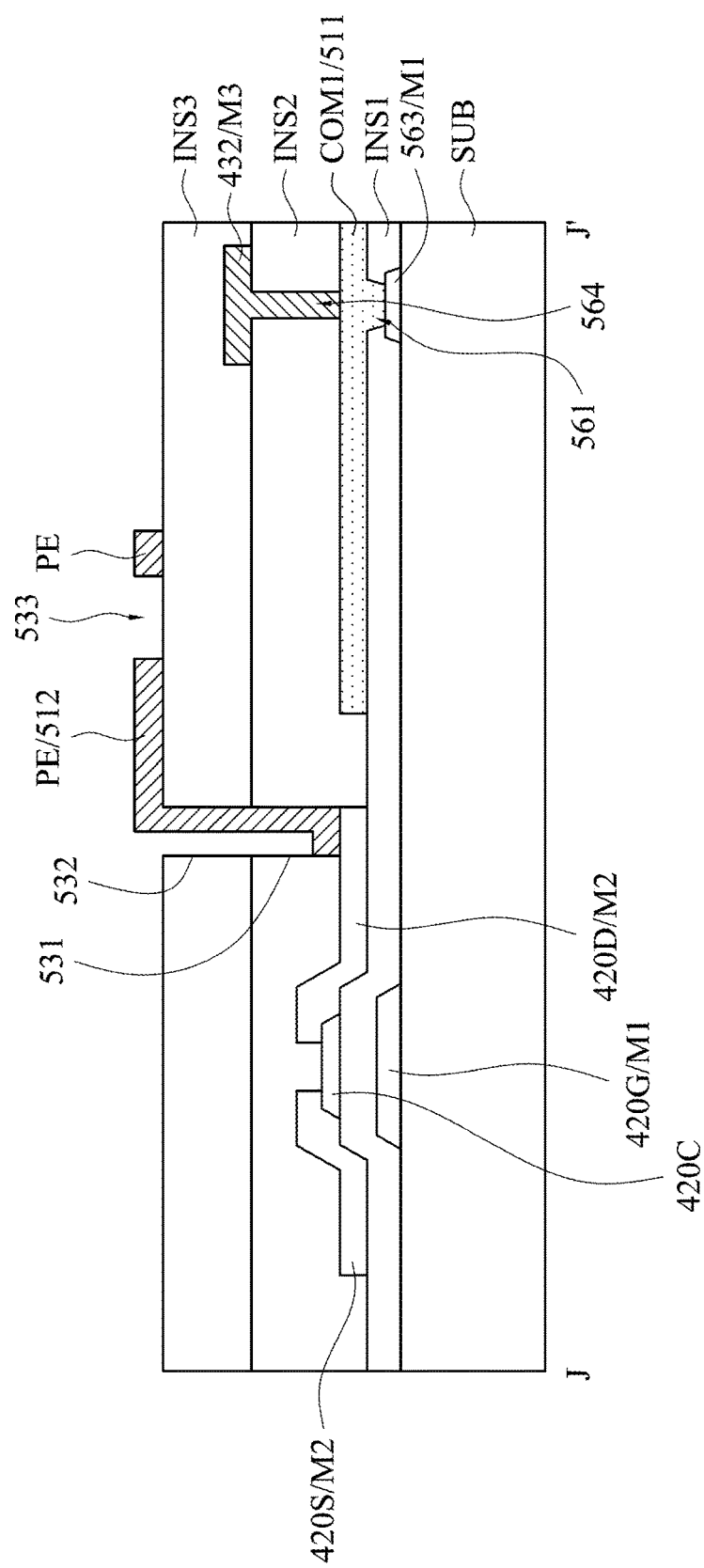
FIG. 5I is a cross-sectional view of pixel structure along a cross-sectional line JJ' of FIG. 5G.

In the embodiment of FIG. 5B_1, the metal connection structure 535 is formed in the third metal layer M3, but it may be formed in the first metal layer M1 in other embodiments. For example, referring to FIG. 5G, FIG. 5H and FIG. 5I. FIG. 5G is a top view of pixel structures in accordance with another embodiment. FIG. 5H is a cross-sectional view of pixel structure along a cross-sectional line II' of FIG. 5G. FIG. 5I is a cross-sectional view of pixel structure along a cross-sectional line JJ' of FIG. 5G. In the embodiment, the first metal layer M1 includes the gate 420G and a metal connection structure 563. The first insulation layer INS1 has contact holes 561, 562 exposing the metal connection structure 563. The first transparent conductive layer 511 includes the sub-common electrodes COM1, COM2. The sub-common electrode COM1 is electrically connected to the metal connection structure 563 through the contact hole 561. The metal connection structure 563 is electrically connected to the sub-common electrode COM2 through the contact hole 562. As a result, the sub-common electrodes COM1, COM2 are electrically connected to each other. The second insulation layer INS2 is formed on the second metal layer M2 and the first transparent conductive layer 511, and has contact holes 564 exposing the sub-common electrodes COM1, COM2. The third metal layer M3 is formed on the second insulation layer INS2, and the touch sensing lines 432 formed in the third metal layer M3 is electrically connected to the sub-common electrodes COM1, COM2 through the contact holes 564.

In the embodiments of FIG. 4A, the touch sensing line 432 is formed in the third metal layer M3, but the touch sensing line connected to the sub-common electrode COM may be formed in the second metal layer M2 in another embodiment. For example, referring to FIG. 4B, for clearly showing the relative locations of the touch sensing line and the data line, two data lines 431 and one touch sensing line 550 are shown in FIG. 5B. The two data lines 431 are respectively belong to two adjacent pixel structures. Both of the data lines 431 and the touch sensing line 550 are formed of the patterned second metal layer M2, and the touch sensing line 550 is disposed between the two data lines 431. In more detail, referring to FIG. 4B and FIG. 5J, and the description of the components in FIG. 5J that are similar to FIG. 5A will not be repeated. The data lines 431 and the touch sensing line 550 are formed on the first insulation layer INS1, and are formed in the second metal layer M2 in the display area. The second insulation layer INS2 is formed on the second metal layer M2 and the first transparent conductive layer 511, and includes a contact hole 551. The third insulation layer INS3 is formed on the second metal layer INS2, and includes a contact hole 552 corresponding to the contact hole 551. The transparent conductive layer 512 is formed on the third insulation layer INS3, and is electrically connected to the touch sensing line 550 through the contact hole 552 and the contact hole 551.

Figure 4B:
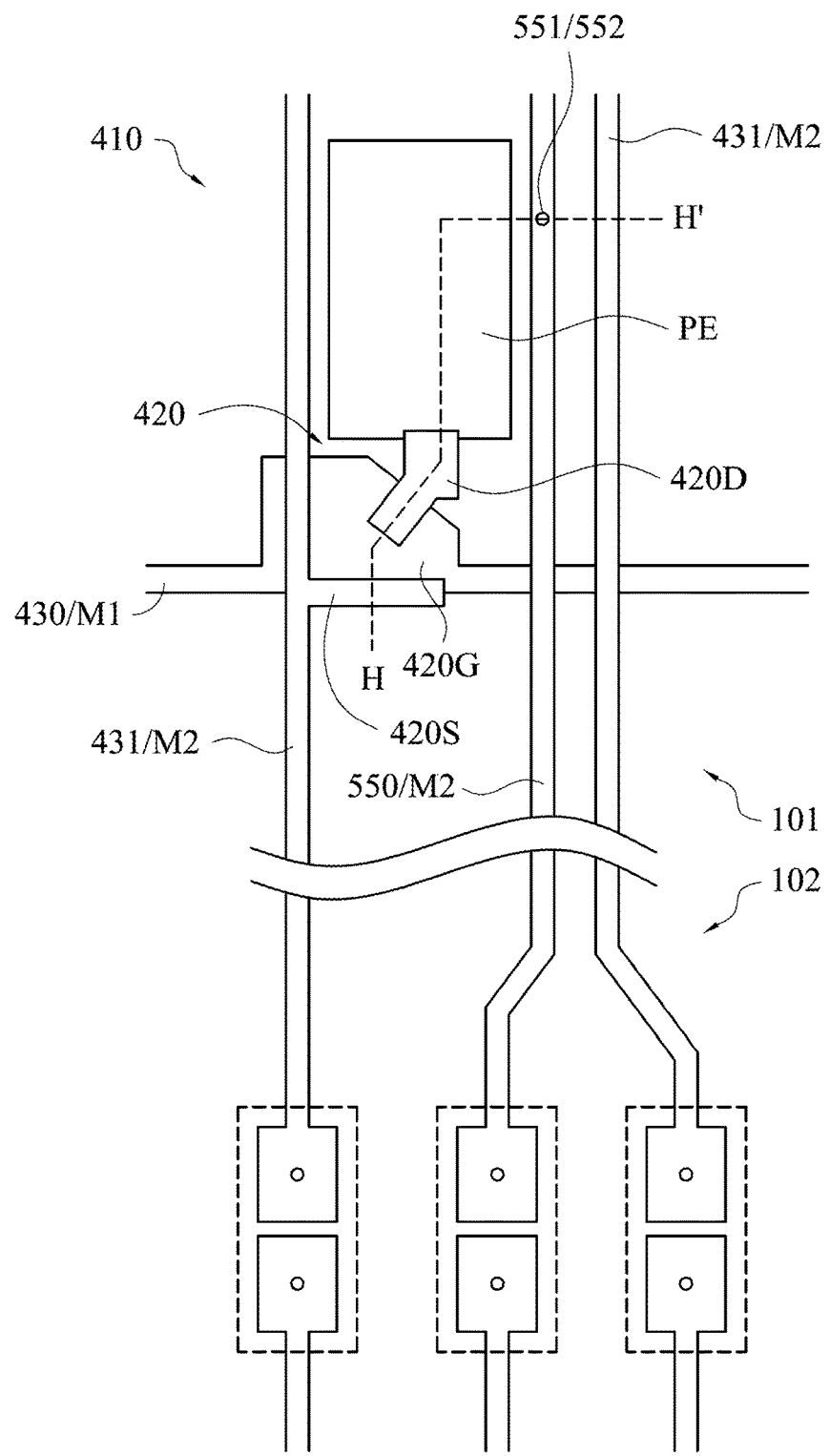
FIG. 4B is a top view of pixel structure in accordance with another embodiment.
Figure 5J:
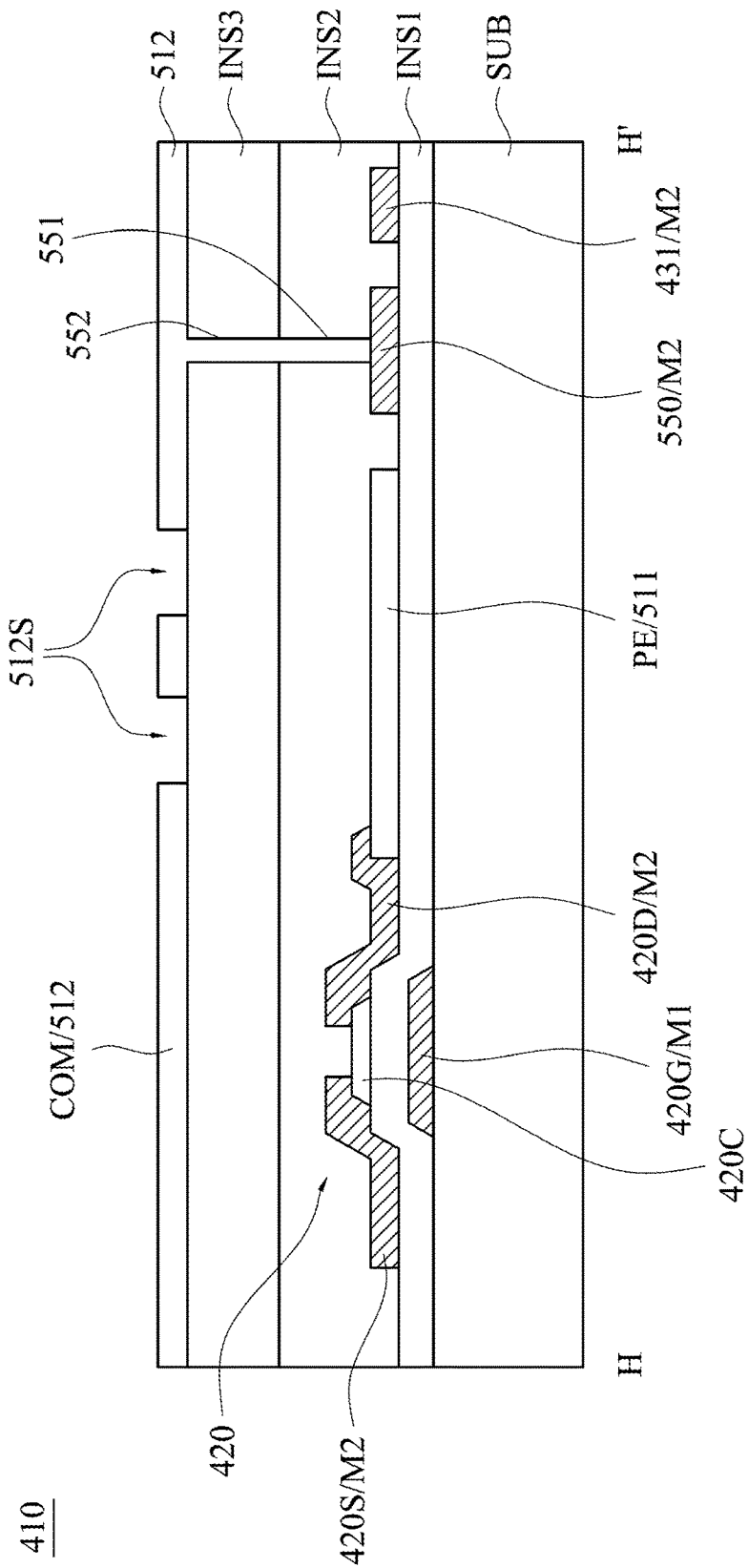
FIG. 5J is a cross-sectional view of pixel structure along a cross-sectional line HH' of FIG. 4B.

When comparing FIG. 4A with FIG. 4B, because the touch sensing line 550 and the data line 431 are both formed in the second metal layer M2 in FIG. 4B, they are parallel to each other and cannot overlap with each part, and thus an aperture ratio of the pixel structure is decreased in order to dispose the lines, however, the process cost is reduced. In FIG. 4A, because the touch sensing line 432 and the data line 431 are formed in different metal layers, the lines can overlap with each other, and consequently increase the aperture ratio of the pixel structure. However, whether the touch sensing line is formed in the second metal layer or the third metal layer is not limited in the invention.

The channel region of the thin film transistor is amorphous silicon in the aforementioned embodiments, but the channel region may be polysilicon in other embodiments. For example, referring to FIG. 5K, a semiconductor layer 571 is formed on the first substrate SUB. The semiconductor layer 571 includes a source 571S, a first lightly doped drain (LDD) region 571_L1, a second LDD region 571_L2, a channel region 571C and a drain 571D. The channel region 571C is poly silicon which is formed by a low-temperature (generally lower than 600° C.) process. The source 571S and the drain 571D are heavily doped. The channel region 571C is formed between the first LDD region 571_L1 and second LDD region 571_L2. The first LDD region 571_L1 is formed between the source 571S and the channel region 571C. The second LDD region 571_L2 is formed between the channel region 571C and the drain 571D. The first insulation layer INS1 is formed on the semiconductor layer 571, and the first insulation layer INS1 has a first contact hole 5K_1h and a second contact hole 5K_2h configured to expose the source 571S and the drain 571D respectively. A first metal layer M1 is formed on the first insulation layer INS1. The first metal layer M1 includes a gate 571G which is at least partially overlapped with the channel region 571C along the normal vector 720 of the first substrate SUB. A second insulation layer INS2 is formed on first insulation layer INS1, and includes a third contact hole 5K_3h corresponding to the first contact hole 5K_1h, and has a fourth contact hole 5K_4h corresponding to the second contact hole 5K_2h. The gate 571G is located between the third contact hole 5K_3h and the fourth contact hole 5K_4h. The first transparent conductive layer 511 is formed on the second insulation layer INS2. The first transparent conductive layer 511 includes the first sub-common electrode COM1 and the second sub-common electrode COM2 that belong to two adjacent pixel structures respectively. A second metal layer M2 is formed on the second insulation layer INS2. The data line 431 are formed by the second metal layer M2, and the data line 431 is electrically connected to the source 571S through the third contact hole 5K_3h and the first contact hole 5K_1h. Note that the data line 431 is disposed between two adjacent pixel structures, and therefore the first sub-common electrode COM1 cannot extend to the second sub-common electrode COM2. The second metal layer M2 also includes a filling structure 572 which is electrically connected to the drain 571D through the fourth contact hole 5K_4h and the second contact hole 5K_2h. A third insulation layer INS3 is formed on the second metal layer M2 and on the first transparent conductive layer 511. The third insulation layer INS3 includes a fifth contact hole 5K_5h, a sixth contact hole 5K_6h, and a seventh contact hole 5K_7h. The fifth contact hole 5K_5h exposes the first sub-common electrode COM1. The sixth contact hole 5K_6h exposes the second sub-common electrode COM2. The seventh contact hole 5K_7h exposes the filling structure 572. A third metal layer M3 is formed on the third insulation layer INS3. The touch sensing line 432 is formed by the third metal layer M3 in the display area. The touch sensing line 432 is electrically connected to the first sub-common electrode COM1 through the fifth contact hole 5K_5h. On the other hand, the third metal layer M3 also includes a metal connection structure 573 which is electrically connected to the touch sensing line 432 and extends from the fifth contact hole 5K_5h to the sixth contact hole 5K_6h, and is electrically connected to the second sub-common electrode COM2 through the sixth contact hole 5K_6h. As a result, the first sub-common electrode COM1 and the second sub-common electrode COM2 are electrically connected to each other. A fourth insulation layer INS4 is formed on the third metal layer M3. The fourth insulation layer INS4 has an eighth contact hole 5K_8h corresponding to the seventh contact hole 5K_7h. A second transparent conductive layer 512 is formed on the fourth insulation layer INS4. The second transparent conductive layer 512 includes a pixel electrode PE which is electrically connected to the filling structure 572 through the eighth contact hole 5K_8h and the seventh contact hole 5K_7h.

Figure 5K:
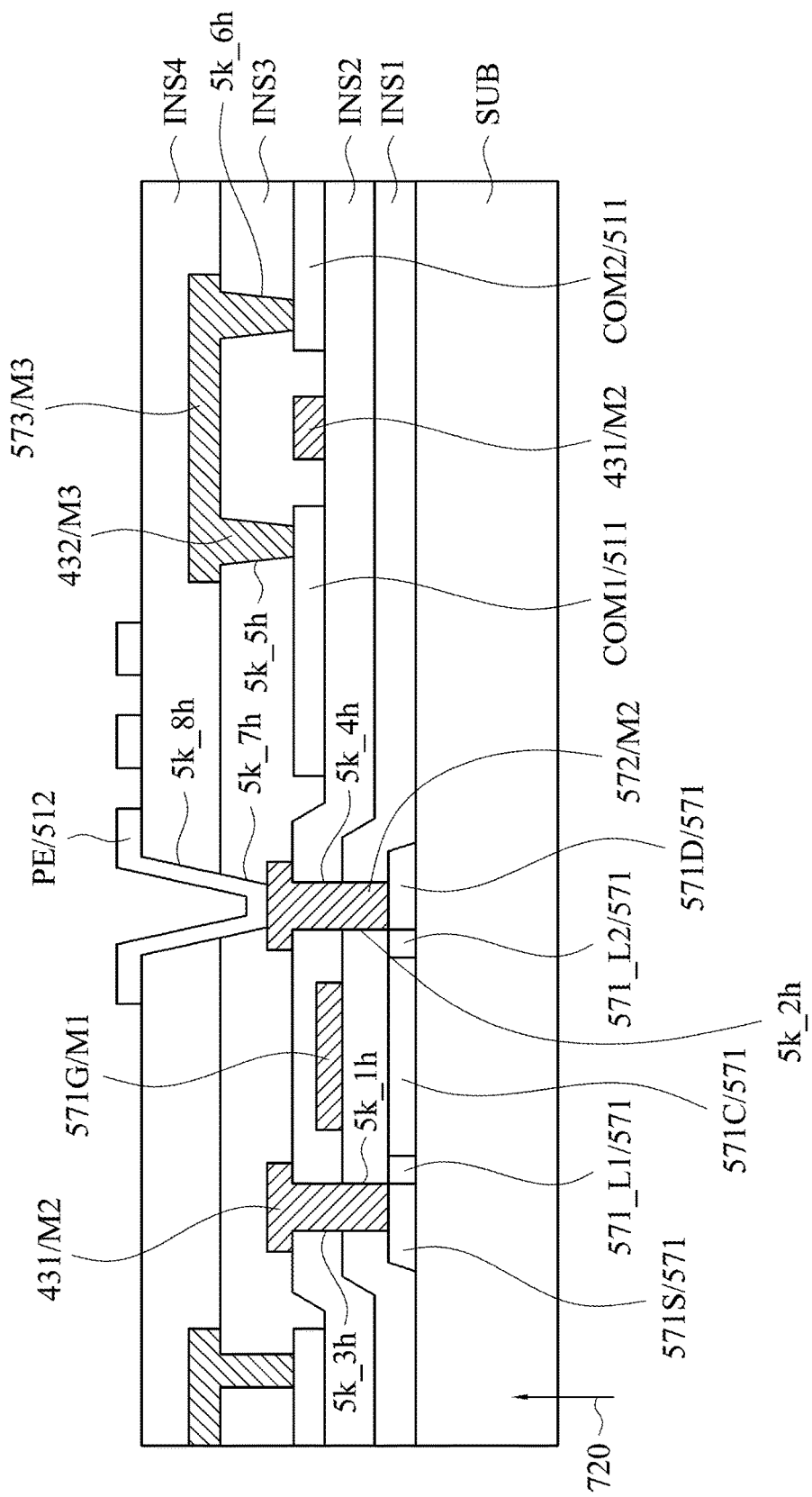
FIG. 5K to FIG. 5N are cross-sectional views of pixel structure in accordance with some embodiments.
Figure 5L:
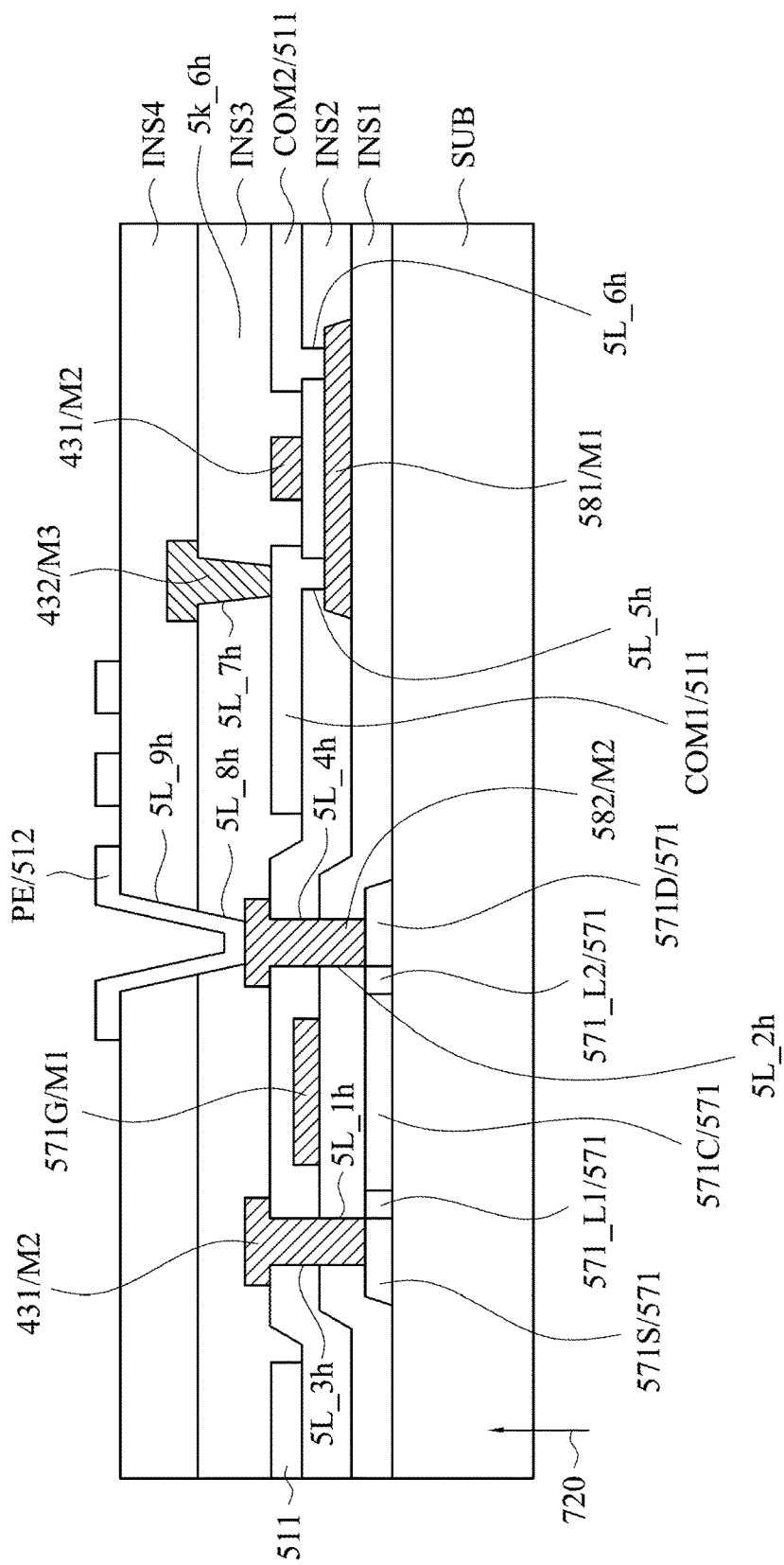

In the embodiment of FIG. 5K, the metal connection structure 573 is formed in the third metal layer M3, but the metal connection structure may be formed in the first metal layer M1 in other embodiments. For example, referring to FIG. 5L, the units of FIG. 5L that are similar to the FIG. 5K will not be described again. The first insulation layer INS1 is formed on the semiconductor layer 571. The first insulation layer INS1 has a first contact hole 5L_1h and a second contact hole 5L_2h configured to expose the source 571S and the drain 571D respectively. The first metal layer M1 is formed on the first insulation layer INS1. The first metal layer M1 includes the gate 571G which is at least partially overlapped with the channel region 571C along the normal vector 720 of the first substrate SUB. The first metal layer M1 also includes a metal connection structure 581. The second insulation layer INS2 is formed on the first insulation layer INS1. The second insulation layer INS2 has a third contact hole 5L_3h corresponding to the first contact hole 5L_1h, and a fourth contact hole 5L_4h corresponding to the second contact hole 5L_2h. The gate 571G is located between the third contact hole 5L_3h and the fourth contact hole 5L_4h. The second insulation layer INS2 also has a fifth contact hole 5L_5h and a sixth contact hole 5L_6h configured to expose the metal connection structure 581. The first transparent conductive layer 511 is formed on the second insulation layer INS2. The first transparent conductive layer 511 includes the first sub-common electrode COM1 and the second sub-common electrode COM2 that belong to two adjacent pixel structures respectively. The first sub-common electrode COM1 is electrically connected to the metal connection structure 581 through the fifth contact hole 5L_5h. The metal connection structure 581 is electrically connected to the second sub-common electrode COM2 through the sixth contact hole 5L_6h. As a result, the first sub-common electrode COM1 and the second sub-common electrode COM2 are electrically connected to each other. The second metal layer M2 is formed on the second insulation layer INS2. The data line 431 is formed by the second metal layer M2, and the data line 431 is electrically connected to the source 571S through the third contact hole 5L_3h and the first contact hole 5L_1h. Note that the data line 431 is disposed between two adjacent pixel structures, and therefore the first sub-common electrode COM1 cannot extend to the second sub-common electrode COM2. The second metal layer M2 also includes a filling structure 582 which is electrically connected to the drain 571D through the fourth contact hole 5L_4h and the second contact hole 5L_2h. The third insulation layer INS3 is formed on the second metal layer M2 and the first transparent conductive layer 511. The third insulation layer INS3 has a seventh contact hole 5L_7h and an eighth contact hole 5L_8h. The seventh contact hole 5L_7h exposes the first sub-common electrode COM1. The eighth contact hole 5L_8h exposes the filling structure 582. The third metal layer M3 is formed on the third insulation layer INS3. The touch sensing line 432 is formed by the third metal layer M3 in the display area. The touch sensing line 432 is electrically connected to the first sub-common electrode COM1 through the seventh contact hole 5L_7h. The fourth insulation layer INS4 is formed on the third metal layer M3. The fourth insulation layer INS4 includes a ninth contact hole 5L_9h corresponding to the eighth contact hole 5L_8h. The second transparent conductive layer 512 is formed on the fourth insulation layer INS4. The second transparent conductive layer 512 includes a pixel electrode PE which is electrically connected to the filling structure 582 through the ninth contact hole 5L_9h and the eighth contact hole 5L_8h.

In other embodiments, the channel region of the thin film transistor may include indium, gallium, zinc, and oxide (IGZO). For example, referring to FIG. 5M, the first metal layer M1 is formed on the first substrate SUB. The first metal layer M1 includes the gate 420G of the thin film transistor. The first insulation layer INS1 is formed on the first metal layer M1. The semiconductor layer 420C is formed on the first insulation layer INS1. The semiconductor layer 420C is a metal oxide including indium, gallium, and zinc. The second insulation layer INS2 is formed on the semiconductor layer 420C, and has a first contact hole 5M_1h and a second contact hole 5M_2h o expose the semiconductor layer 420C. The second metal layer M2 is also formed on the second insulation layer INS2. The second metal layer M2 includes the data line 431, the source 420S, and the drain 420D. The source 420S (and the data line 431) is electrically connected to the semiconductor layer 420C through the first contact hole 5M_1h. The drain 420D is electrically connected to the semiconductor layer 420C through the second contact hole 5M_2h. The first transparent conductive layer 511 is formed on the second insulation layer INS2. The first transparent conductive layer 511 includes the first sub-common electrode COM1 and the second sub-common electrode COM2. The third insulation layer INS3 is formed on the first transparent conductive layer 511 and the second metal layer M2. The third insulation layer INS3 has a third contact hole 5M_3h exposing the first sub-common electrode COM1, a fourth contact hole 5M_4h exposing the second sub-common electrode COM2, and a fifth contact hole 5M_5h exposing drain 420D. The third metal layer M3 is formed on the third insulation layer INS3. The third metal layer M3 includes the touch sensing line 432 and a metal connection structure 583. The touch sensing line 432 is electrically connected to the first sub-common electrode COM1 through the third contact hole 5M_3h. The metal connection structure 583 extends from the third contact hole 5M_3h to the fourth contact hole 5M_4h, and is electrically connected to the second sub-common electrode COM2. The fourth insulation layer INS4 is formed on the third insulation layer INS3 and the third metal layer M3. The fourth insulation layer INS4 has a sixth contact hole 5M_6h corresponding to the fifth contact hole 5M_5h and exposing the drain 420D. The second transparent conductive layer 512 is formed on the fourth insulation layer INS4. The second transparent conductive layer 512 includes the pixel electrode PE which is electrically connected to the drain 420D through the fifth contact hole 5M_5h and the sixth contact hole 5M_6h.

Figure 5M:
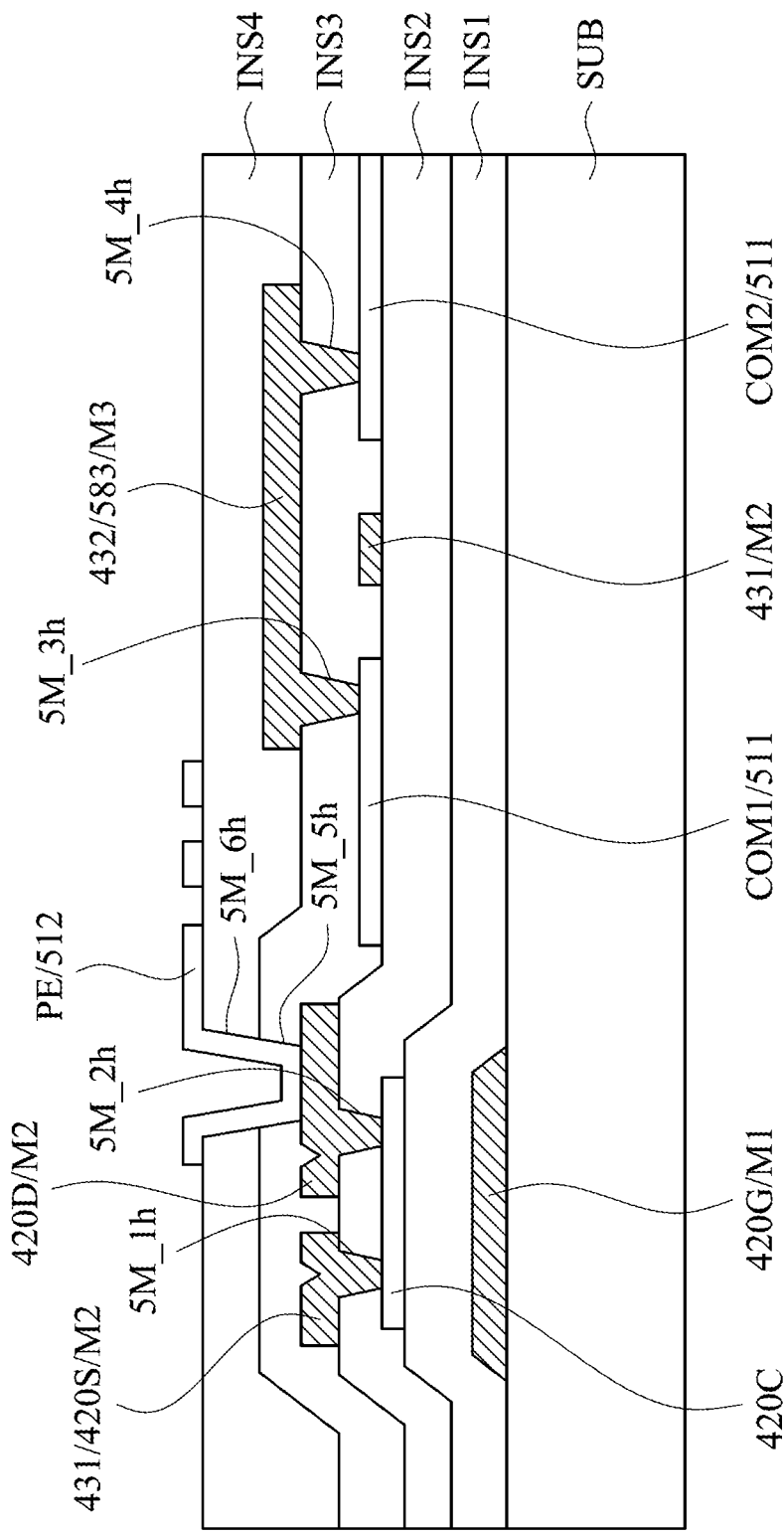
Figure 5N:
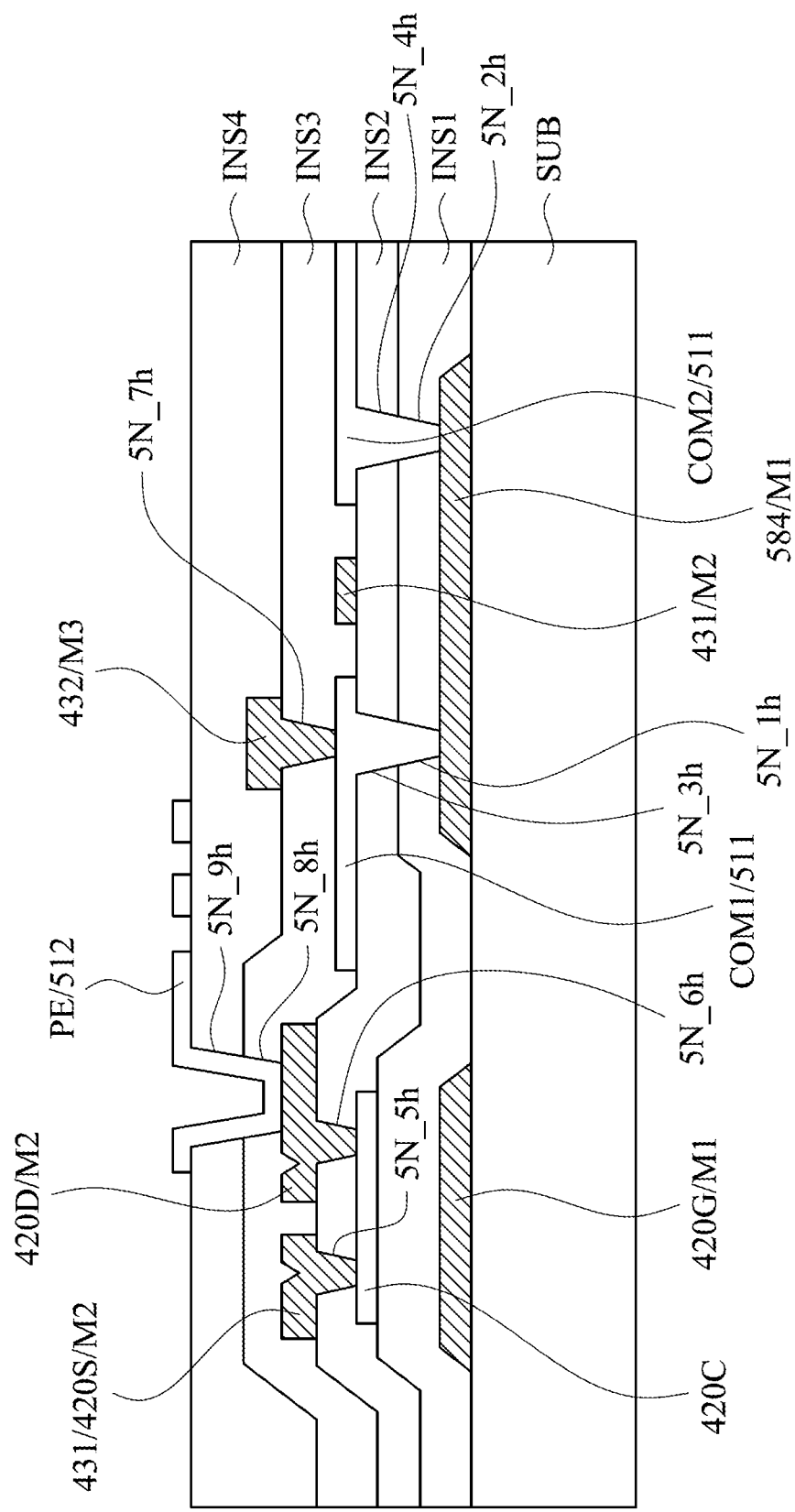

In the embodiment of FIG. 5M, the metal connection structure is formed in the third metal layer M3, but it may be formed in the first metal layer in other embodiments. For example, referring to FIG. 5N, the first metal layer M1 is formed on the first substrate SUB. The first metal layer M1 includes the gate 420G and a first metal connection structure 584. The first insulation layer INS1 is formed on the first metal layer M1. The first insulation layer INS1 has a first contact hole 5N_1h and a second contact hole 5N_2h configured to expose the first metal connection structure 584. The semiconductor layer 420C is formed on the first insulation layer INS1. The semiconductor layer 420C is a metal oxide including indium, gallium, and zinc. The second insulation layer INS2 is formed on the semiconductor layer 420C. The second insulation layer INS2 has a third contact hole 5N_3h and a fourth contact hole 5N_4h that correspond to the first contact hole 5N_1h and the second contact hole 5N_2h respectively so as to expose the first metal connection structure 584. The second insulation layer INS2 also has a fifth contact hole 5N_5h and a sixth contact hole 5N_6h configured to expose the semiconductor layer 420C. The second metal layer M2 is formed on the second insulation layer INS2, and is electrically connected to the drain 420D and the source 420S through the fifth contact hole 5N_5h and the sixth contact hole 5N_6h respectively. The first transparent conductive layer 511 is formed on the second insulation layer INS2. The first transparent conductive layer 511 includes the first sub-common electrode COM1 and the second sub-common electrode COM2. The first sub-common electrode COM1 is electrically connected to the first metal connection structure 584 through the first contact hole 5N_1h and the third contact hole 5N_3h. The second sub-common electrode COM2 is electrically connected to the first metal connection structure 584 through the second contact hole 5N_2h and the fourth contact hole 5N_4h. The third insulation layer INS3 is formed on the first transparent conductive layer 511 and the second metal layer M2. The third insulation layer INS3 has a seventh contact hole 5N_7h exposing the first sub-common electrode COM1, and an eighth contact hole 5N_8h exposing drain 420D. The third metal layer M3 is formed on the third insulation layer INS3 and includes the touch sensing line 432 which is electrically connected to the first sub-common electrode COM1 through the seventh contact hole 5N_7h. The fourth insulation layer INS4 is formed on the third insulation layer INS3 and the third metal layer M3. The fourth insulation layer INS4 has a ninth contact hole 5N_9h corresponding to the eighth contact hole 5N_8h and exposing the drain 420D. The second transparent conductive layer 512 is formed on the fourth insulation layer INS4. The second transparent conductive layer 512 includes the pixel electrode PE which is electrically connected to the drain 420D through the eighth contact hole 5N_8h and the ninth contact hole 5N_9h.

Figure 6:
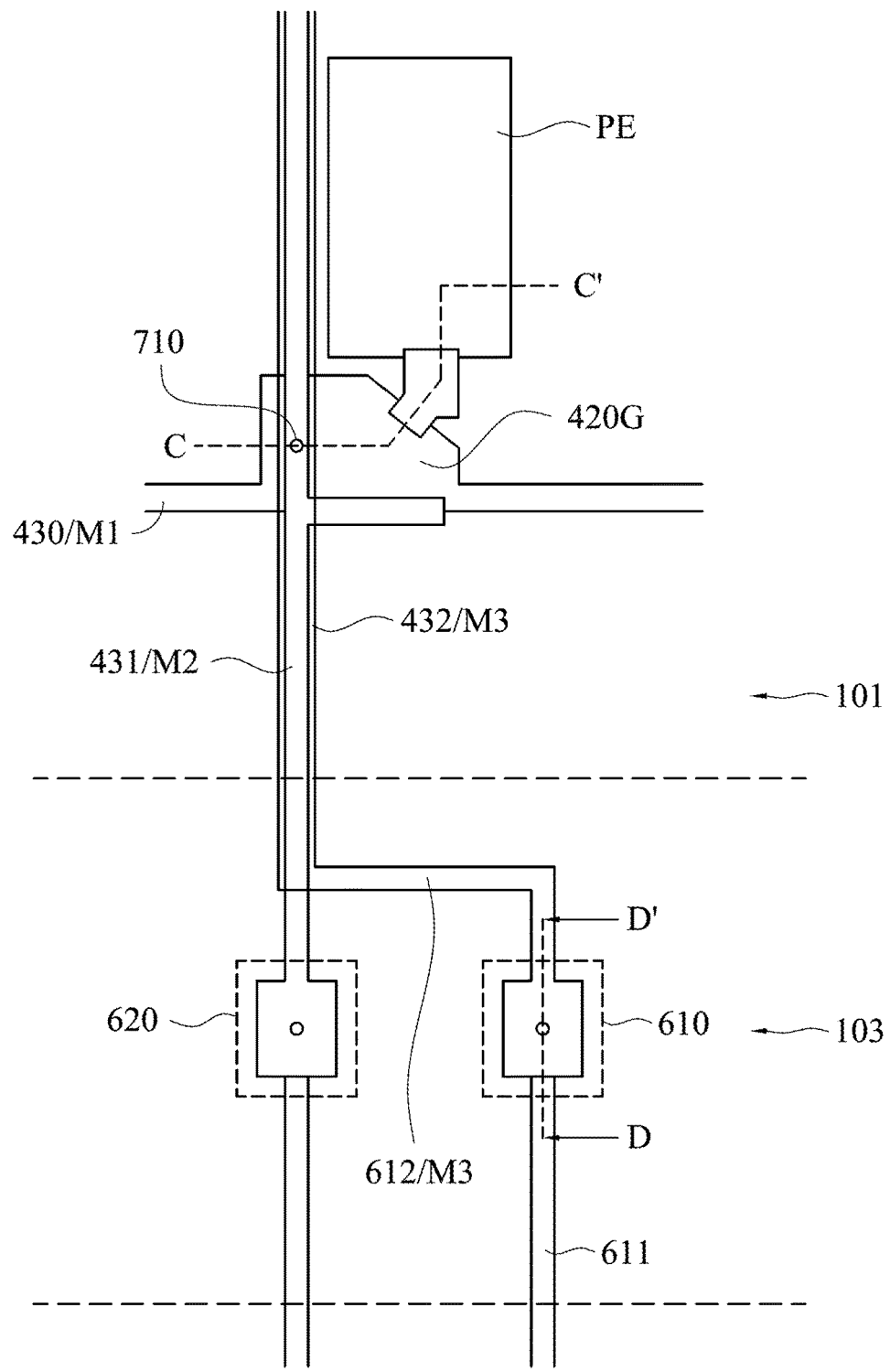
FIG. 6 is a top view of pixel structure in accordance with another embodiment.
Figure 7A:
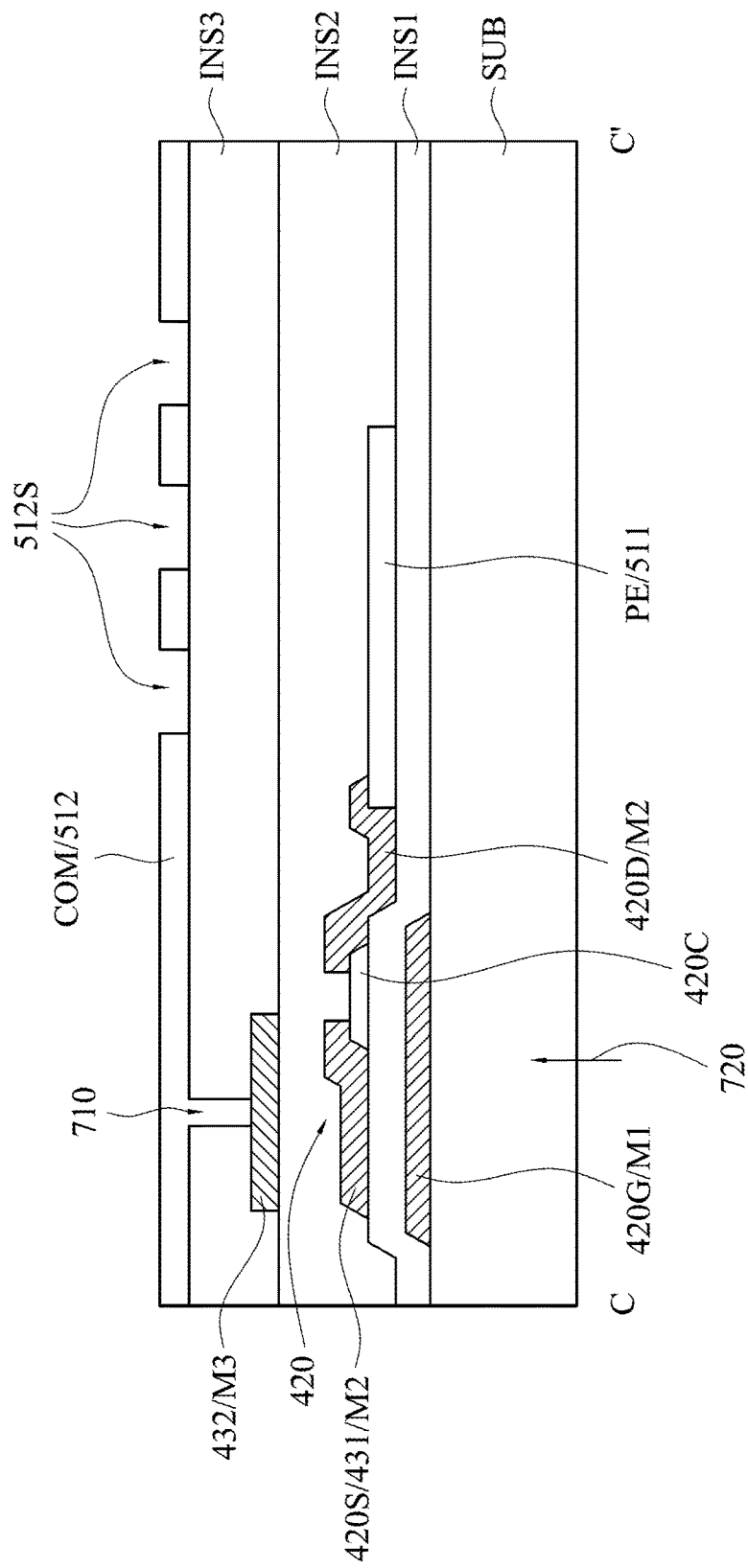
FIG. 7A is a cross-sectional view of pixel structure along a cross-sectional line CC' of FIG. 6.

In the embodiment of FIG. 4A, the data line 431 and the touch sensing line 432 are not overlapped with each other along a normal vector of the in-cell touch display panel, but the touch sensing line 432 is made of metal that would decrease the aperture ratio of the pixel structure. In some embodiments, the data line 431 and the touch sensing line 432 are partially overlapped with each other along the normal vector of the in-cell touch display panel, and the data line 431 and the touch sensing line 432 are formed in different metal layers in the display area. For example, referring to FIG. 6 and FIG. 7A, FIG. 6 is a diagram illustrating a top view of pixel structure according to another embodiment, and FIG. 7A is a diagram illustrating a cross-sectional view of the pixel structure along a cross-sectional line CC' of FIG. 6. The first metal layer M1 is formed on the substrate SUB, and the first metal layer M1 includes the gate 420G. The first insulation layer INS1 is formed on the first metal layer M1. The semiconductor layer 420C is formed on the first insulation layer INS1 as the channel of the TFT 420. The first transparent conductive layer 511 is formed on the first insulation layer INS1, and includes the pixel electrode PE. The second metal layer M2 is formed on the semiconductor layer 420C, and includes the source 420S and the drain 420D which is electrically connected to the pixel electrode PE. The second insulation layer INS2 is formed on the second metal layer M2 and the first transparent conductive layer 511. The third metal layer M3 is formed on the second insulation layer INS2, and the touch sensing line 432 are formed in the third metal layer M3 in the display area 101. The third insulation layer INS3 is formed on the third metal layer M3, and includes a contact hole 710. The second transparent conductive layer 512 is formed on the third insulation layer INS3, and includes the sub-common electrode COM. The sub-common electrode COM has at least one slits 512S. In the display area 101, the touch sensing line 432 is electrically connected to the sub-common electrode COM through the contact hole 710. In particular, the touch sensing line 432 and the data line 431 are at least partially overlapped with each other along a normal vector 720 of the display panel.

Figure 7B:
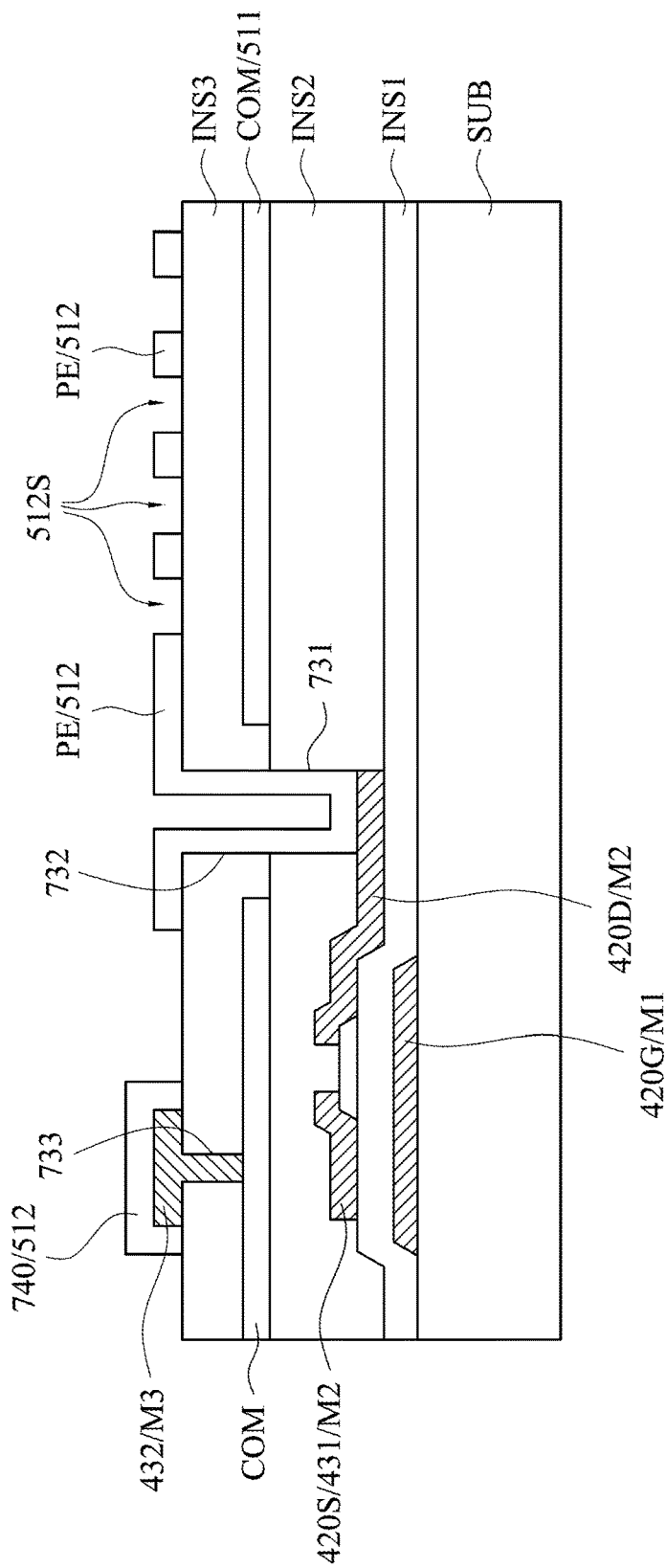
FIG. 7B is a cross-sectional view of pixel structure in accordance with an embodiment.

In the embodiment of FIG. 7A, the sub-common electrode COM is formed above the pixel electrode PE, but in other embodiments, the sub-common electrode COM may be formed below the pixel electrode PE. For example, referring to FIG. 7B which is similar to FIG. 7A, and therefore the description of the similar components will not be repeated. In the embodiment of FIG. 7B, the second insulation layer INS2 has a contact hole 731 exposing the drain 420D. The first transparent conductive layer 511 is formed on the second insulation layer INS2, and the first transparent conductive layer 511 includes the sub-common electrode COM. The third insulation layer INS3 is formed on the first transparent conductive layer 511, and includes a contact hole 732 and a contact hole 733. The contact hole 732 is corresponding to the contact hole 731. The third metal layer M3 is formed on the third insulation layer INS3, and includes the touch sensing line 432 which is electrically connected to the sub-common electrode COM through the contact hole 733. The second transparent conductive layer 512 is formed on the third insulation layer INS3 and the third metal layer M3, and includes the pixel electrode PE and a touch sensing line protection layer 740. The pixel electrode PE includes at least one slits 512S, and is electrically connected to the drain 420D through the contact hole 732 and the contact hole 731. The touch sensing line protection layer 740 covers the touch sensing line 432. Note that the touch sensing line protection layer 740 is electrically insulated from the pixel electrode PE, and the touch sensing line protection layer 740 is used for protecting the touch sensing line 432 from the erosion of subsequent processes.

Referring to FIG. 4A, the touch sensing line 432 includes a first portion 441 and a second portion 442. The second portion 442 is formed in the third metal layer M3, but the first portion 441 may be formed in the first metal layer, the second metal layer or the third metal layer. A connection structure 440 is disposed in the non-display area 102 for coupling the first portion 441 to the second portion 442. Multiple embodiments are provided below.

Figure 8A:
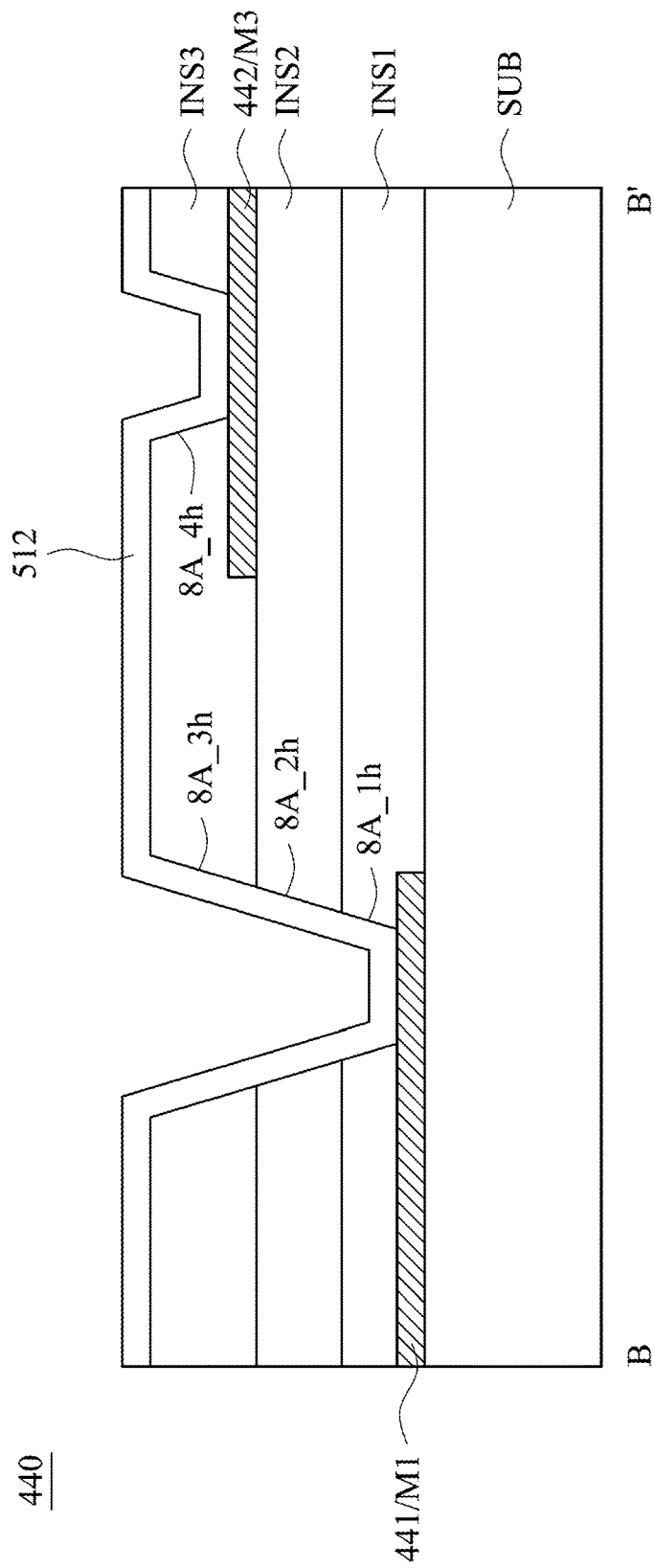
FIG. 8A to FIG. 8C are cross-sectional view of connection structure 440 along a cross-sectional line BB' of FIG. 4A.

FIG. 8A is a diagram illustrating a cross-sectional view of the connection structure 440 along a cross-sectional line BB' of FIG. 4A. The first portion 441 is formed in the first metal layer M1 in the embodiment of FIG. 8A. To be specific, the first portion 441 is formed on the substrate SUB. The first insulation layer INS1 is formed on the first metal layer M1, and has a first opening 8A_1h exposing the first portion 441. The second insulation layer INS2 is formed on the first insulation layer INS1, and includes a second opening 8A_2h which is corresponding to the first opening 8A_1h. The second portion 442 is formed on the second insulation layer INS2. The third insulation layer INS3 is formed on the third metal layer M3 and the second insulation layer INS2, and includes a third opening 8A_3h and a fourth opening 8A_4h. The third opening 8A_3h is corresponding to the second opening 8A_2h, and the fourth opening 8A_4h exposes the second portion 442. The second transparent conductive layer 512 is formed on the third insulation layer INS3, and is electrically connected to the second portion 442 through the fourth opening 8A_4h, and is electrically connected to the first portion 441 through the first opening 8A_1h, the second opening 8A_1h and the third opening 8A_3h. As a result, the first portion 441 is electrically connected to the second portion 442.

Figure 8B:
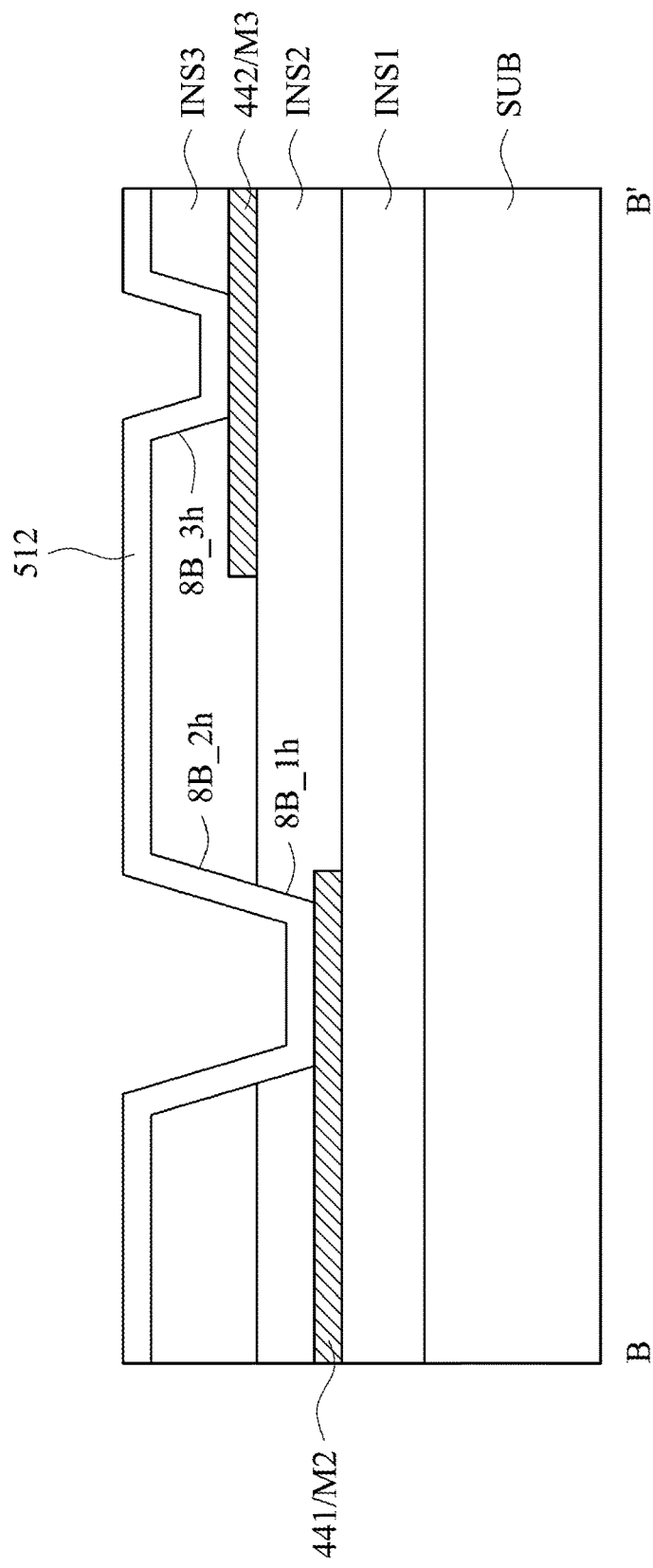

FIG. 8B is a diagram illustrating a cross-sectional view of the connection structure 440 along a cross-sectional line BB' of FIG. 4A. In the embodiment of FIG. 8B, the first portion 441 is formed in the second metal layer M2. To be specific, the first insulation layer INS1 is formed on the substrate SUB. The first portion 441 is formed on the first insulation layer INS1. The second insulation layer INS2 has a first opening 8B_1h exposing the first portion 441. The second portion 442 is formed on the second insulation layer INS2. The third insulation layer INS3 includes a second opening 8B_2h and a third opening 8B_3h. The second opening 8B_2h is corresponding to the first opening 8B_1h. The third opening 8B_3h exposes the second portion 442. The second transparent conductive layer 512 is electrically connected to the second portion 442 through the third opening 8B_3h, and is electrically connected to the first portion 441 through the first opening 8B_1h and the second opening 8B_2h.

Figure 8C:
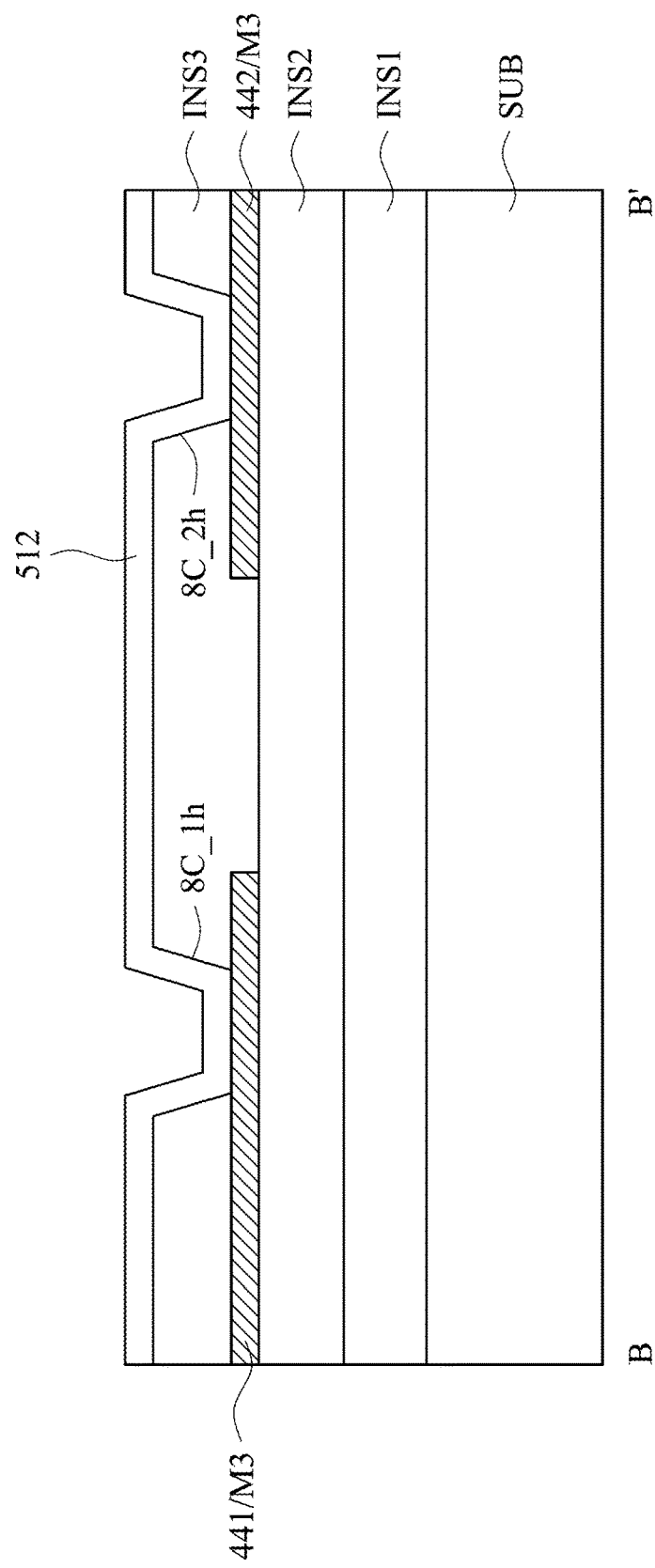

FIG. 8C is a diagram illustrating a cross-sectional view of the connection structure 440 along a cross-sectional line BB' of FIG. 4A. In the embodiment of FIG. 8C, the first portion 441 is formed in the third metal layer M3. To be specific, the first portion 441 and the second portion 442 are formed on the second insulation layer INS2. The third insulation layer INS3 has a first opening 8C_1h exposing the first portion 441, and a second opening 8C_2h exposing the second portion 442. The second transparent conductive layer 512 is electrically connected to the first portion 441 through the first opening 8C_1h, and is electrically connected to the second portion 442 through the second opening 8C_2h.

Referring to FIG. 4A, in some embodiments, the data line 431 is transferred to the first metal layer or the third metal layer, or remains in the second metal layer by a connection structure 450. The connection structure 450 is similar to the connection structure 440, and both of them electrically connect different metal layers through a transparent conductive layer. However, people in the art should be able to implement the connection structure 450 according to the disclosure in FIG. 8A to FIG. 8C. On the other hand, in the embodiment of FIG. 8C, although both of the first portion 441 and the second portion 442 are formed in the third metal layer M3, the disposition of the connection structure 440 can achieve the impedance matching between the touch sensing line 432 and the data line 431.

From another aspect, in the embodiments of FIG. 8A to FIG. 8C, the connection structure includes a first portion, a second portion, multiple insulation layers and a transparent conductive layer. The insulation layers have contact holes exposing the first portion and the second portion. The transparent conductive layer is electrically connected to the first portion and the second portion through the contact hole.

Referring to FIG. 6, in the embodiment of FIG. 6, the touch sensing line 432 includes a first portion 611 and a second portion 612. The second portion 612 is formed in the third metal layer, but the first portion 611 may be formed in the first metal layer, the second metal layer or the third metal layer. A connection structure 610 is disposed in the signal transferring area 103 for coupling the first portion 611 to the second portion 612. Multiple embodiments are provided below to describe the connection structure 610.

Figure 9A:
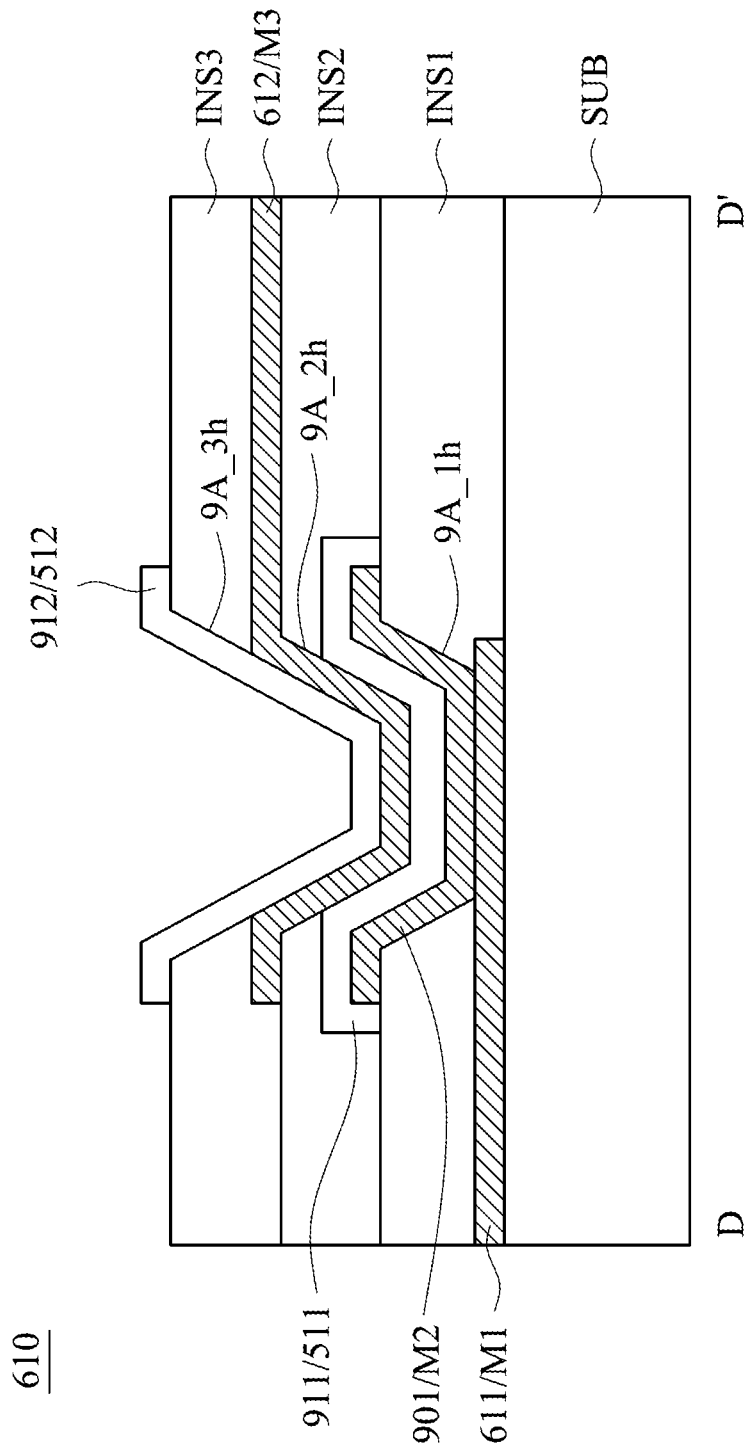
FIG. 9A to FIG. 9C are cross-sectional views of connection structure 610 along a cross-sectional line DD' of FIG. 6.

Referring to FIG. 6 and FIG. 9A, FIG. 9A is a diagram illustrating a cross-sectional view of the connection structure 610 along a cross-sectional line DD' of FIG. 6. In the embodiment of FIG. 9A, the first portion 611 is formed in the first metal layer M1. To be specific, the first portion 611 of the first metal layer M1 is formed on the substrate SUB. The first insulation layer INS1 is formed on the first metal layer M1 and has a first opening 9A_1h exposing the first portion 611. A metal electrode 901 formed in the second metal layer M2 is electrically connected to the first portion 611 through the first opening 9A_1h. The metal electrode 901 is not electrically connected to the data lines, the sources or the drains in the second metal layer M2. A first electrical connection part 911 formed in the first transparent conductive layer 511 is electrically connected to the metal electrode 901. The first electrical connection part 911 is not electrically connected to the pixel electrode or the common electrode in the first transparent conductive layer 511. The second insulation layer INS2 has a second opening 9A_2h exposing the first electrical connection part 911. The second portion 612 of the third metal layer M3 is formed on the second insulation layer INS2, and is electrically connected to the first electrical connection part 911 through the second opening 9A_2h. The third insulation layer INS3 has a third opening 9A_3h exposing the second portion 612. A second electrical connection part 912 formed in the second transparent conductive layer 512 is electrically connected to the second portion 612 through the third opening 9A_3h. The second electrical connection part 912 is not electrically connected to the pixel electrode or the common electrode in the second transparent conductive layer 512. As a result, the second portion 612 is electrically connected to the first portion 611 through the first electrical connection part 911 and the metal electrode 901. The metal electrode 901 and the first electrical connection part 911 are used to avoid deep opening in the connection structure 610, and the second electrical connection part 912 is used to prevent the second portion 612 from the erosion of subsequent processes.

Figure 9B:
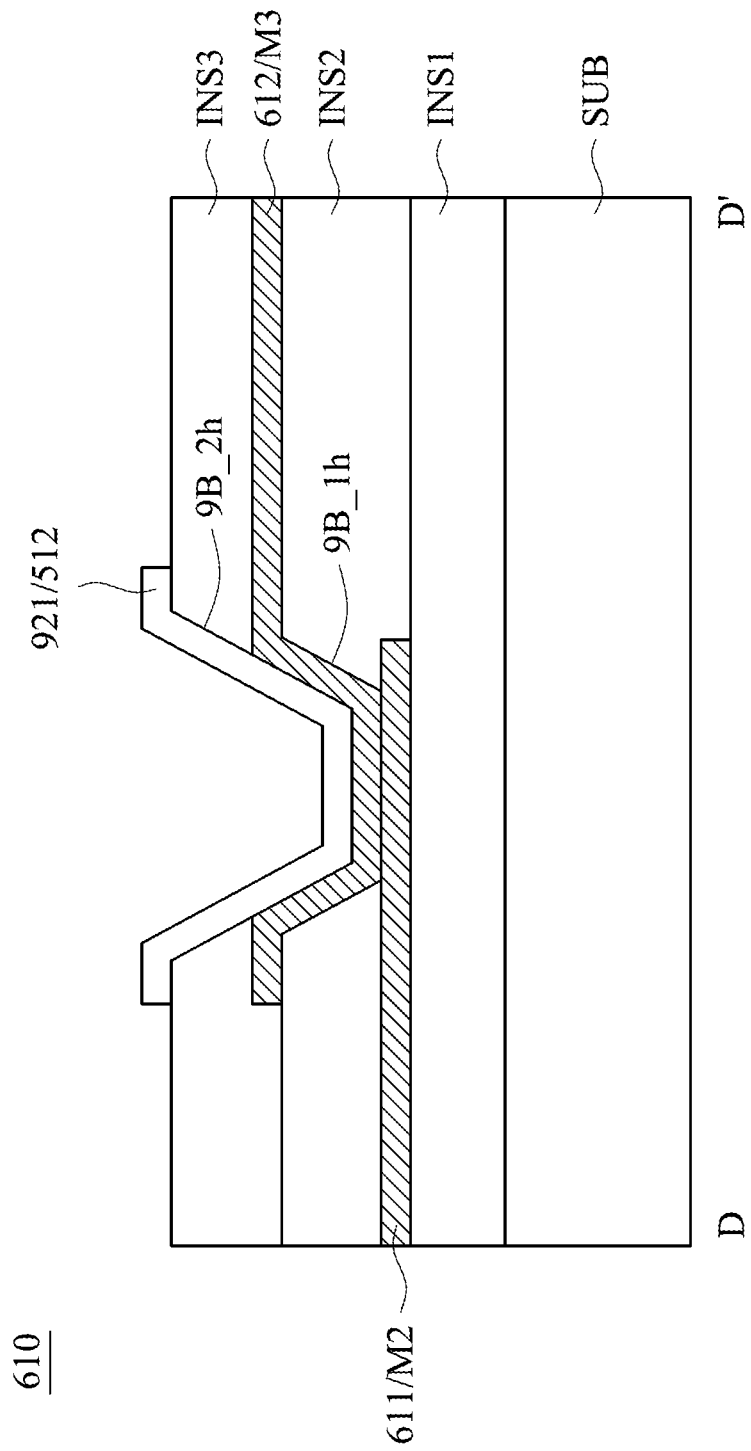

Referring to FIG. 6 and FIG. 9B, in the embodiment of FIG. 9B, the first portion 611 is formed in the second metal layer M2. To be specific, the first insulation layer INS1 is formed on the substrate SUB. The first portion 611 is formed on the first insulation layer INS1. The second insulation layer INS2 has a first opening 9B_1h exposing the first portion 611. The second portion 612 is formed on the second insulation layer INS2, and is electrically connected to the first portion 611 through the first opening 9B_1h. The third insulation layer INS3 has a second opening 9B_2h exposing the second portion 612. An electrical connection part 921 formed in the second transparent conductive layer 512 is electrically connected to the second portion 612 through the second opening 9B_2h. The electrical connection part 921 is not electrically connected to the pixel electrode or the common electrode in the second transparent conductive layer 512. The electrical connection part 921 is used to prevent the second portion 612 from the erosion of subsequent processes.

Figure 9C:
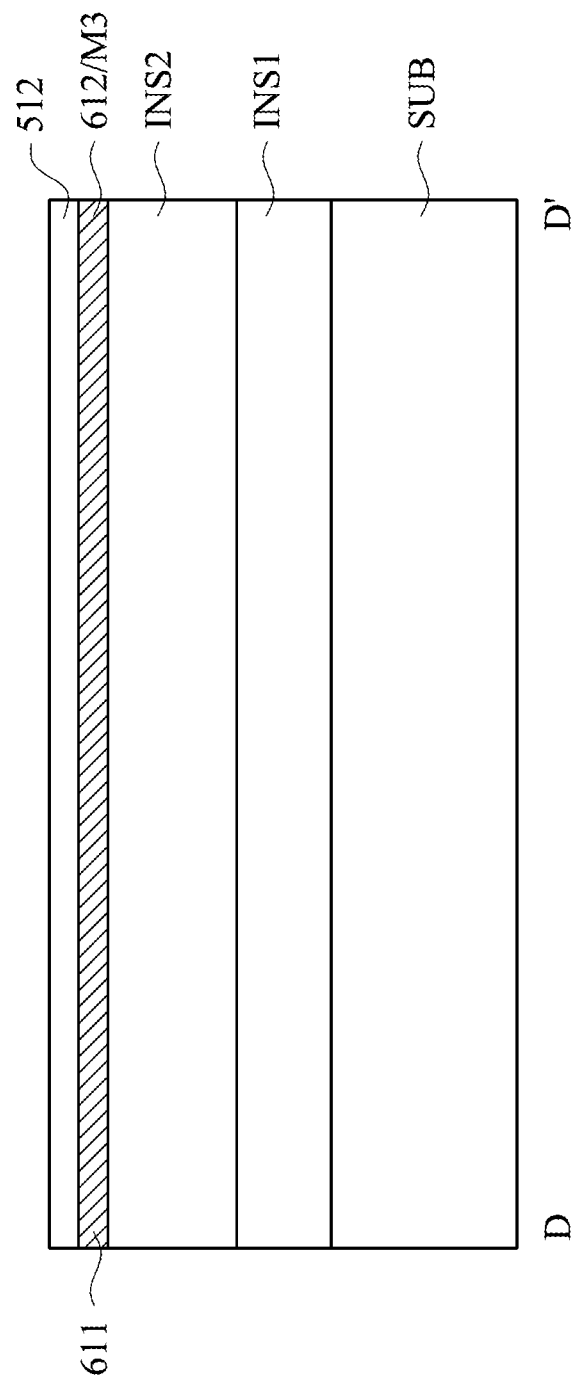

Referring to FIG. 6 and FIG. 9C, in the embodiment of FIG. 9C, the first portion 611 and the second portion 612 are formed in the third metal layer M3. As shown in FIG. 9C, the first insulation layer INS1, the second insulation layer INS2, the third metal layer M3 and the second transparent conductive layer 512 are sequentially formed on the substrate SUB. The second transparent conductive layer 512 is used to prevent the third metal layer M3 from the erosion of subsequent processes.

In the embodiment of FIG. 6, a connection structure 620 is disposed on the data line 431. The connection structure 620 is used to transfer the data line 431 to the first metal layer M1 or the third metal layer M3, or keeps the data line 431 in second metal layer M2. People in the art should be able to implement the connection structure 620 according to the disclosure of the connection structure 610. The data line 431 and the touch sensing line 432 may belong to different metal layers due to the connection structures 610 and 620.

Referring to FIG. 4A and FIG. 6, the connection structure 440 is used in FIG. 4A, and the connection structure 610 is used in FIG. 6 in the embodiments described above, but the invention is not limited thereto. The connection structure 440 may also be applied to the embodiment of FIG. 6, and the connection structure 610 may be applied to the embodiment of FIG. 4A. On the other hand, the pixel electrode may be disposed above the common electrode, and vice versa. The touch sensing lines may be formed in the third metal layer or the second metal layer. In other words, there are some options in these embodiments: whether the touch sensing line 432 covers the data line 431; whether the pixel electrode is above the common electrode; and whether the connection structure 440 or the connection structure 610 is used. These options can be arbitrarily chosen. In addition, whether the data line 431 and the touch sensing line 432 are transferred to the first metal layer M1, the second metal layer M2 or the third metal layer M3 is not limited in the invention. In a preferred embodiment, the data line 431 and the touch sensing line 432 are formed in different metal layers in the non-display area 102, and thus the pitch between them could be reduced.

The signal line transferring area 103 exists in the embodiments above, and the connection structure therein is used to transfer the data lines/touch sensing lines to different metal layers. However, in some embodiments, if the resolution requirement of the panel is relatively lower, then the function of the connection structure may be implemented in the touch pads and/or display pads.

The self-conductive capacitance is used for sensing in the in-cell touch display panel in the specification. That is, a transmitter (TX) sensing signal and a receiver (RC) sensing signal is transmitted to the touch electrodes and the touch pads through the touch sensing lines. The metal layer in the specification may be a single layer of metal including aluminum, copper, titanium, tungsten, etc. or a composite metal layer including molybdenum/aluminum/molybdenum, titanium/aluminum/titanium, titanium/copper/titanium or other suitable composite metal layer, which is not limited in the invention. On the other hand, the insulation layer in the specification may be silicon nitride, silicon oxide, silicon oxynitride or other suitable insulation layer. In addition, a single insulation layer in the figures may include more than one stacked insulation layers with different material. Moreover, some of the contact holes or openings have vertical sidewalls, and some of the contact holes or openings have tapered sidewalls, but it should be appreciated that all contact holes of openings have tapered sidewalls in practice. The figures are just for schematic illustration. When "contact hole configured to expose" or "contact hole exposing" is used in the disclosure, it means to partially or completely expose the component beneath, which is not limited in the invention.

Figure 10A:
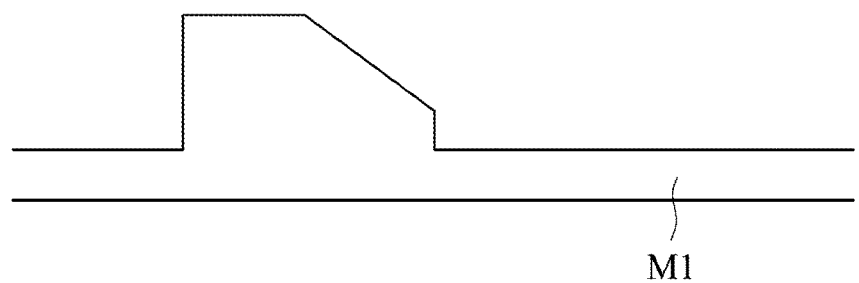
FIG. 10A to FIG. 10G is top views of intermediary stages for manufacturing pixel stricture in accordance with an embodiment.
Figure 10B:
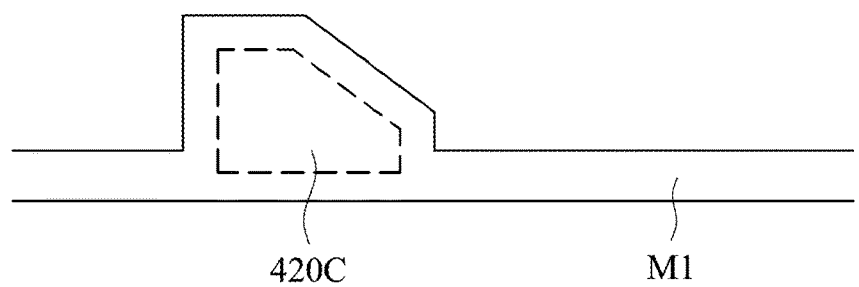

Herein, examples are provided to describe the method for manufacturing the in-cell touch display panel. FIG. 10A to FIG. 10G is top views of intermediary stages for manufacturing pixel stricture in accordance with an embodiment. Referring to FIG. 4A, FIG. 5A and FIG. 10A, the first metal layer M1 is first formed. Referring to FIG. 4A, FIG. 5A and FIG. 10B, the first insulation layer INS1 (not shown in FIG. 4A and FIG. 10B) is formed on the first metal layer M1, and then the semiconductor layer 420C and ohmic contacts (not shown) on the semiconductor layer 420C are formed. The first insulation layer INS1 may be silicon nitride, silicon oxide, silicon oxynitride or other suitable insulation layer. The semiconductor layer 420C may be a-si, polysilicon, or metal oxide, which is not limited in the invention. The ohmic contacts may be N-type doped polysilicon or metal oxide with high conductivity for electrically connecting the semiconductor layer 420C and the subsequent second metal layer M2.

Figure 10C:
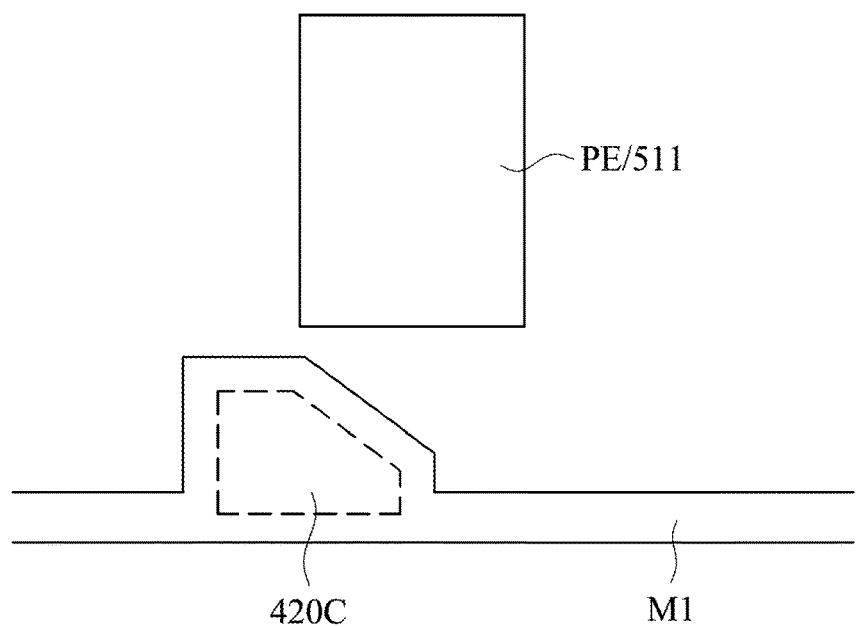

Referring to FIG. 4A, FIG. 5A and FIG. 10C, the first transparent conductive layer 511 is formed. The first transparent conductive layer 511 includes the pixel electrode PE. The first transparent conductive layer 511 may be indium tin oxide (ITO), indium zinc oxide (IZO), antimony tin oxide (ATO), fluorine tin oxide (FTO) or other conductive and transparent material.

Figure 10D:
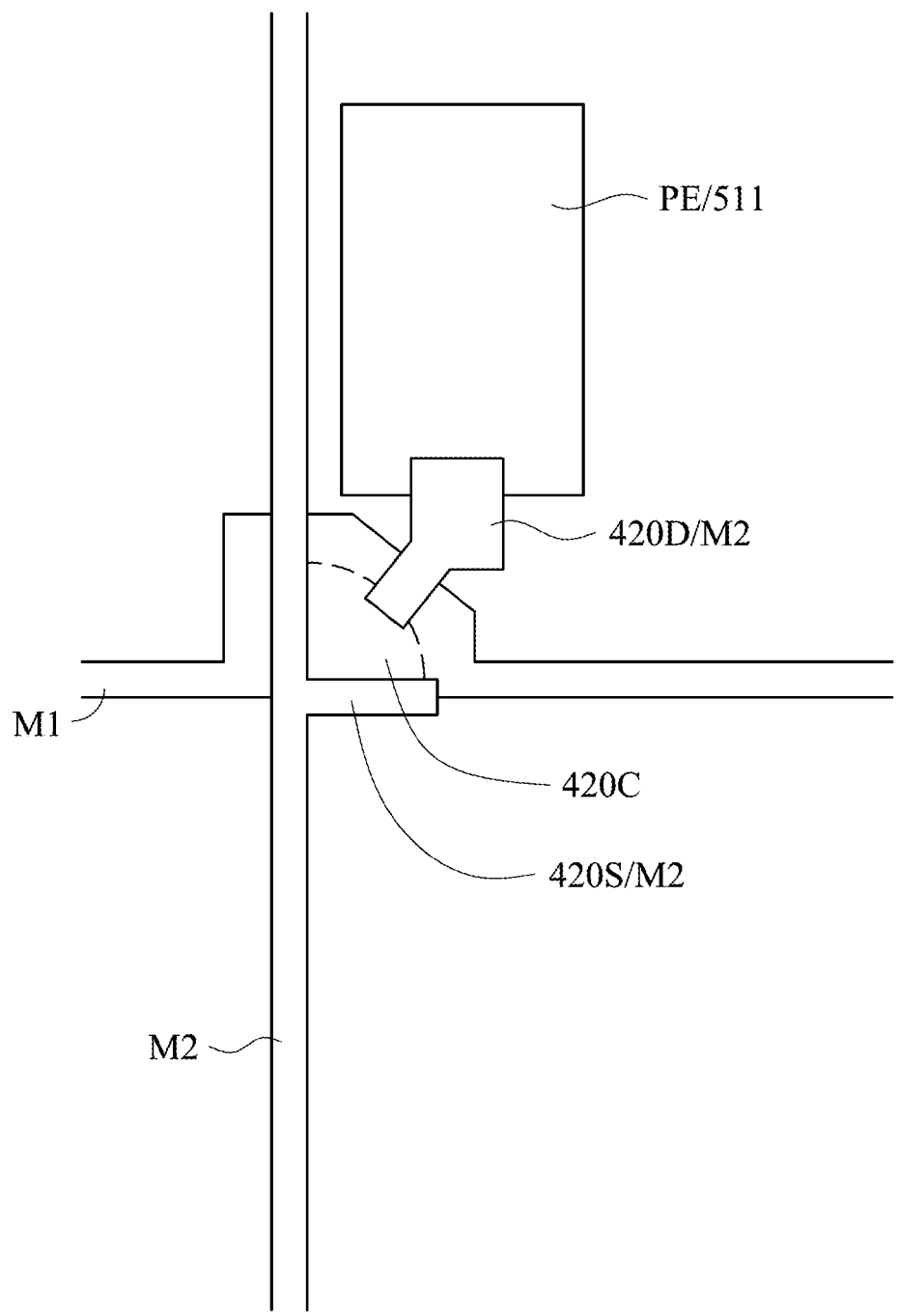

Referring to FIG. 4A, FIG. 5A and FIG. 10D, the second metal layer M2 is formed. The second metal layer M2 includes the drain 420D and the source 420S. Next, the second insulation layer INS2 is formed on the second metal layer M2 and the first transparent conductive layer 511. Because the second insulation layer INS2 covers the whole pixel structure, for simplification, it is not shown in FIG. 10D.

Figure 10E:
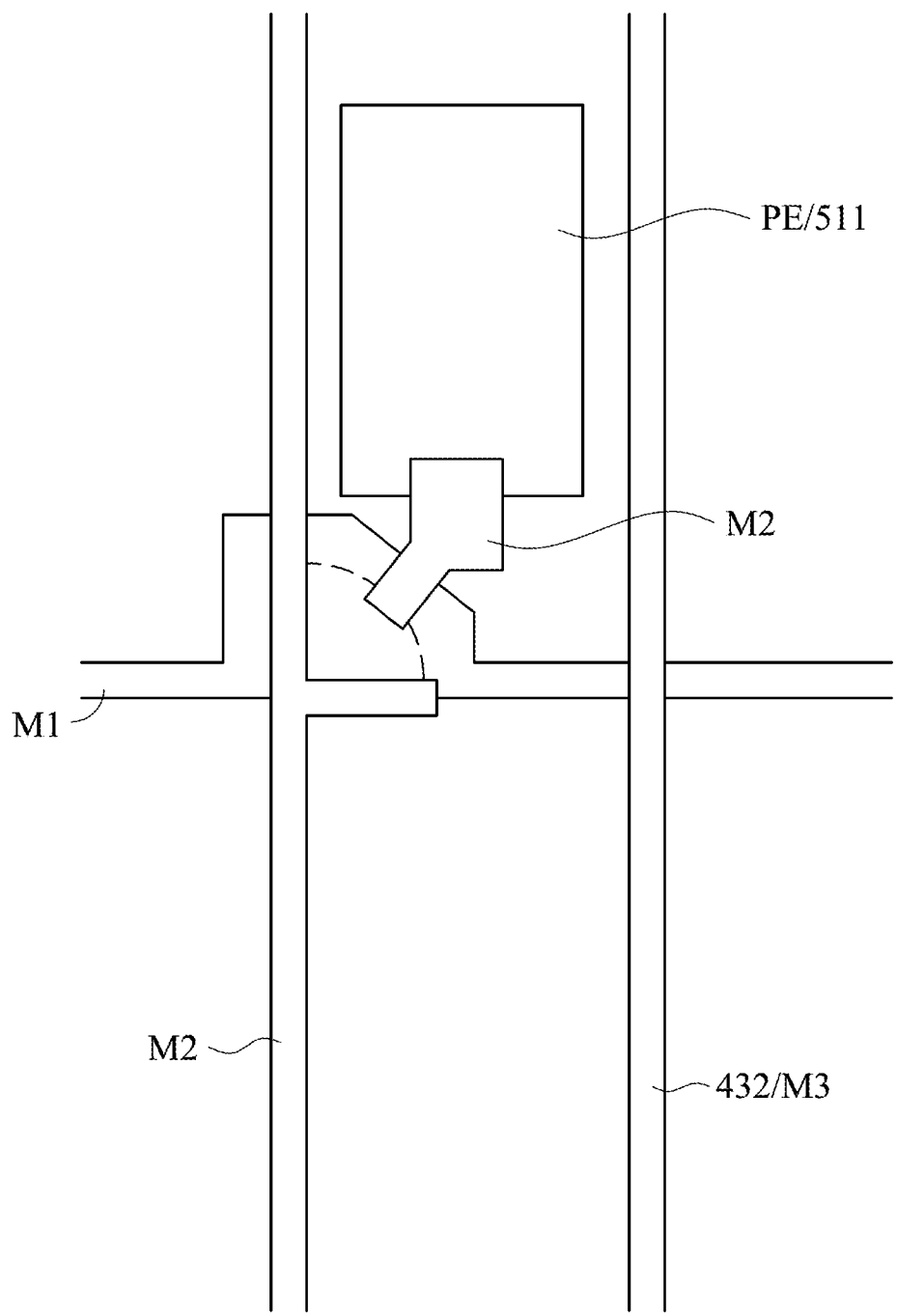
Figure 10F:
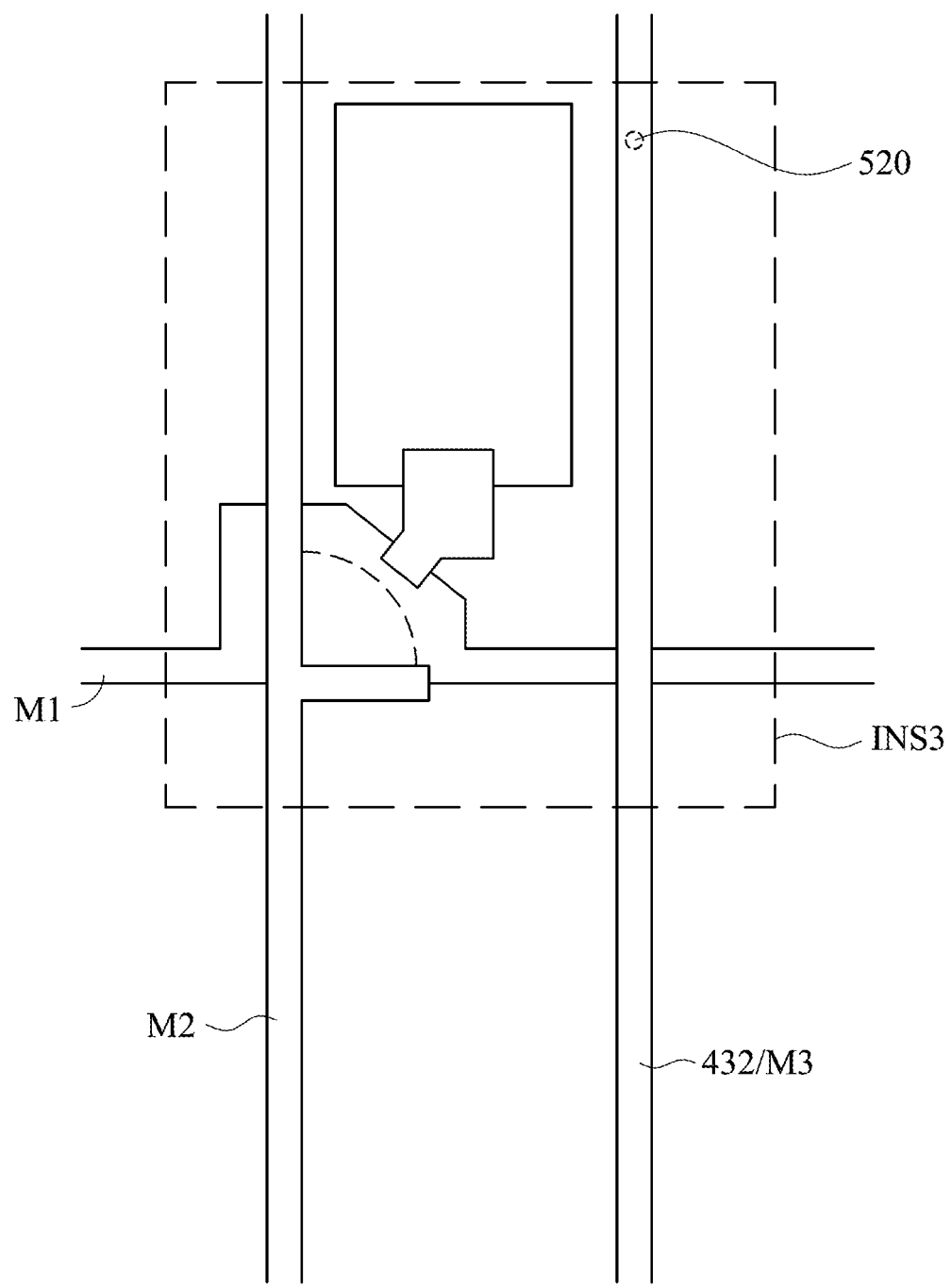

Referring to FIG. 4A, FIG. 5A and FIG. 10E, the third metal layer M3 is formed. The third metal layer M3 includes the touch sensing line 432. Next, referring to FIG. 4A, FIG. 5A and FIG. 10F, the third insulation layer INS3 is formed on the third metal layer M3. The third insulation layer INS3 includes a contact hole 520 for exposing a portion of the touch sensing line 432. The third insulation layer INS3 may be silicon nitride, silicon oxide, silicon oxynitride or other suitable insulation layer.

Figure 10G:
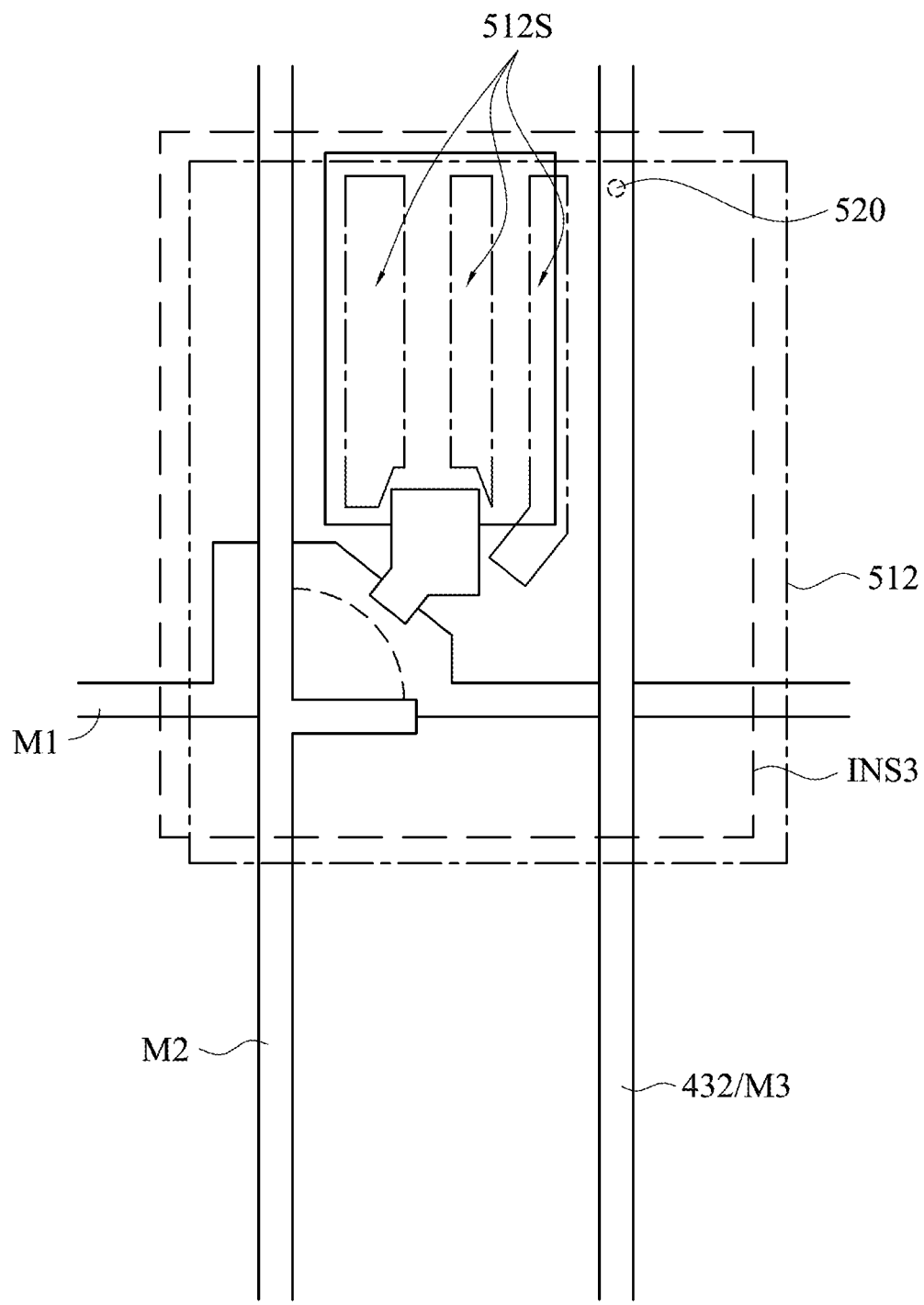

Referring to FIG. 4A, FIG. 5A and FIG. 10G, the second transparent conductive layer 512 is formed on the third insulation layer INS3. The second transparent conductive layer 512 is electrically connected to the touch sensing line 432 through the contact hole 520. The second transparent conductive layer 512 is taken as the sub-common electrode COM in the pixel structure and it includes at least one slits 512S. The second transparent conductive layer 512 may be indium tin oxide (ITO), indium zinc oxide (IZO), antimony tin oxide (ATO), fluorine tin oxide (FTO) or other conductive and transparent material.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An in-cell touch display panel having a display area and a non-display area, wherein the in-cell touch display panel comprises:
   a first substrate;
   a plurality of data lines disposed on the first substrate along a first direction;
   a plurality of gate lines disposed along a second direction, wherein an angle is included between the first direction and the second direction;
   a plurality of touch sensing lines disposed on the first substrate, wherein an insulation layer is disposed between the data lines and the gate lines;
   a plurality of pixel regions disposed in areas of the display area enclosed by the gate lines that are intersected with the data lines, wherein each of the pixel regions comprises a pixel structure, and each of the pixel structures comprises a pixel electrode;
   a common electrode that is disposed in the display area and comprises a plurality of touch electrodes, wherein each of the touch electrodes corresponds to more than one of the pixel electrodes, and each of the pixel electrodes corresponds to a sub-common electrode which is a portion of the touch electrode;
   a thin film transistor disposed in one of the pixel structures, wherein the thin film transistor comprises a gate, a source, a drain, and a semiconductor layer;
   a second substrate, wherein a liquid crystal layer is disposed between the first substrate and the second substrate;
   a plurality of display pads and a plurality of touch pads, wherein the display pads and the touch pads are disposed in the non-display area,
   wherein the data lines and the sub-common electrodes are disposed on the insulation layer, and the pixel electrodes are disposed above the sub-common electrodes and are spatially insulated from the sub-common electrodes; and
   a plurality of metal connection structures, wherein each of the metal connection structures is electrically connected to two adjacent ones of the sub-common electrodes along the second direction, and the metal connection structures and the data lines are formed by different metal layers.

2. The in-cell touch display panel of claim 1, wherein in each of the touch electrodes, two adjacent ones of the sub-common electrodes along the first direction are directly connected to each other through an extending portion of the touch electrode, the extending portion crosses over one of the gate lines, and a width of the extending portion along the second direction is smaller than a width of the sub-common electrode along the second direction.

3. The in-cell touch display panel of claim 1, wherein the two adjacent ones of the sub-common electrodes comprise a first sub-common electrode and a second sub-common electrode, the insulation layer is a first insulation layer, and the in-cell touch display panel comprises:
   a first metal layer that is disposed on the first substrate and comprises the gate;

the first insulation layer disposed on the first metal layer;
the semiconductor layer disposed on the first insulation layer;
a second metal layer disposed on the first insulation layer, wherein the second metal layer comprises the source and the drain, and the data lines are formed by the second metal layer in the display area;
a first transparent conductive layer disposed on the first insulation layer, wherein the first transparent conductive layer comprises the first sub-common electrode and the second sub-common electrode;
a second insulation layer disposed on the second metal layer and on the first transparent conductive layer, the second insulation layer having a first contact hole, a second contact hole and a third contact hole, wherein the first contact hole exposes the drain, the second contact hole exposes the first sub-common electrode, and the third contact hole exposes the second sub-common electrode;
a third metal layer disposed on the second insulation layer, the third metal layer comprising the touch sensing lines and the metal connection structures, wherein one of the touch sensing lines is electrically connected to the first sub-common electrode through the second contact hole, and one of the metal connection structures extends from the second contact hole to the third contact hole and is electrically connected to the second sub-common electrode through the third contact hole;
a third insulation layer disposed on the third metal layer, wherein the third insulation layer has a fourth contact hole corresponding to the first contact hole; and
a second transparent conductive layer disposed on the third insulation layer, wherein the second transparent conductive layer comprises the pixel electrodes, and one of the pixel electrodes is electrically connected to the drain through the first contact hole and the fourth contact hole.

4. The in-cell touch display panel of claim 1, wherein the two adjacent ones of the sub-common electrodes comprise a first sub-common electrode and a second sub-common electrode, the insulation layer is a first insulation layer, and the in-cell touch display panel comprises:
a first metal layer disposed on the first substrate, wherein the first metal layer comprises the metal connection structures and the gate;
the first insulation layer disposed on the first metal layer, the first insulation layer having a first contact hole and a second contact hole, wherein the first contact hole and the second contact hole expose one of the metal connection structures;
the semiconductor layer disposed on the first insulation layer;
a second metal layer disposed on the first insulation layer, wherein the second metal layer comprises the source and the drain, and the data lines are formed by the second metal layer in the display area;
a first transparent conductive layer disposed on the second metal layer, wherein the first transparent conductive layer comprises the first sub-common electrode and the second sub-common electrode, and the first sub-common electrode and the second sub-common electrode are electrically connected to the one of the metal connection structures through the first contact hole and the second contact hole respectively;
a second insulation layer disposed on the second metal layer and the first transparent conductive layer, the second insulation layer having a third contact hole and a fourth contact hole, wherein the third contact hole exposes the drain, and the fourth contact hole exposes the first sub-common electrode;
a third metal layer disposed on the second insulation layer, wherein the third metal layer comprises the touch sensing lines and the metal connection structure, and one of the touch sensing lines is electrically connected to the first sub-common electrode through the fourth contact hole;
a third insulation layer disposed on the third metal layer, wherein the third insulation layer has a fifth contact hole corresponding to the third contact hole; and
a second transparent conductive layer disposed on the third insulation layer, wherein the second transparent conductive layer comprises the pixel electrodes, and one of the pixel electrodes is electrically connected to the drain through the third contact hole and the fifth contact hole.

5. The in-cell touch display panel of claim 1, wherein the two adjacent ones of the sub-common electrodes comprise a first sub-common electrode and a second sub-common electrode, the insulation layer is a second insulation layer, and the in-cell touch display panel comprises:
the semiconductor layer disposed on the first substrate, wherein the semiconductor layer comprises the source, a first lightly doped region, a channel region of the thin film transistor, a second lightly doped region, and the drain, wherein the channel region is disposed between the first lightly doped region and the second lightly doped region;
a first insulation layer disposed on the semiconductor layer, wherein the first insulation layer has a first contact hole exposing the source and has a second contact hole exposing the drain;
a first metal layer that is disposed on the first insulation layer and comprises the gate;
the second insulation layer disposed on the first metal layer, wherein the second insulation layer has a third contact hole corresponding to the first contact hole and a fourth contact hole corresponding to the second contact hole;
a first transparent conductive layer disposed on the second insulation layer, wherein the first transparent conductive layer comprises the first sub-common electrode and the second sub-common electrode;
a second metal layer disposed on the second insulation layer, wherein the data lines are formed by the second metal layer in the display area, one of the data lines is electrically connected to the source through the first contact hole and the third contact hole, and the second metal layer comprises a filling structure which is electrically connected to the drain through the second contact hole and the fourth contact hole;
a third insulation layer disposed on the second metal layer, wherein the third insulation layer comprises a fifth contact hole exposing the first sub-common electrode, a sixth contact hole exposing the second sub-common electrode, and a seventh contact hole exposing the filling structure;
a third metal layer disposed on the third insulation layer, wherein the third metal layer comprises the touch sensing lines and the metal connection structures, one of the touch sensing lines is electrically connected to the first sub-common electrode through the fifth contact hole, and one of the metal connection structures extends from the fifth contact hole to the sixth contact hole and is electrically connected to the second sub-common electrode through the sixth contact hole;
a fourth insulation layer disposed on the second metal layer, wherein the fourth insulation layer has an eighth contact hole corresponding to the seventh contact hole; and
a second transparent conductive layer disposed on the fourth insulation layer, wherein the second transparent conductive layer comprises the pixel electrodes, and one of the pixel electrodes is electrically connected to the filling structure through the seventh contact hole and the eighth contact hole.

6. The in-cell touch display panel of claim 1, wherein the two adjacent ones of the sub-common electrodes comprise a first sub-common electrode and a second sub-common electrode, the insulation layer is a second insulation layer, and the in-cell touch display panel comprises:
the semiconductor layer disposed on the first substrate, wherein the semiconductor layer comprises the source, a first lightly doped region, a channel region of the thin film transistor, a second lightly doped region, and the drain, wherein the channel region is disposed between the first lightly doped region and the second lightly doped region;
a first insulation layer disposed on the semiconductor layer, wherein the first insulation layer has a first contact hole exposing the source, and a second contact hole exposing the drain;
a first metal layer disposed on the first insulation layer, wherein the first metal layer comprises the gate and the metal connection structures;
the second insulation layer disposed on the first metal layer, wherein the second insulation layer has a third contact hole corresponding to first contact hole, a fourth contact hole corresponding to the second contact hole, a fifth contact hole, and a sixth contact hole, wherein the fifth contact hole and the sixth contact hole expose one of the metal connection structures;
a first transparent conductive layer disposed on the second insulation layer, wherein the first transparent conductive layer comprises the first sub-common electrode and the second sub-common electrode, the first sub-common electrode and the second sub-common electrode are electrically connected to the one of the metal connection structures through the fifth contact hole and the sixth contact hole respectively;
a second metal layer disposed on the second insulation layer, wherein the data lines are formed by the second metal layer in the display area, and one of the data lines is electrically connected to the source through the first contact hole and the third contact hole, wherein the second metal layer comprises a filling structure which is electrically connected to the drain through the second contact hole and the fourth contact hole;
a third insulation layer disposed on the second metal layer, wherein the third insulation layer has a seventh contact hole exposing the first sub-common electrode, and an eighth contact hole exposing the filling structure;
a third metal layer disposed on the third insulation layer, wherein the third metal layer comprises the touch sensing lines, one of the touch sensing lines is electrically connected to the first sub-common electrode through the seventh contact hole;
a fourth insulation layer disposed on the third metal layer, wherein the fourth insulation layer has a ninth contact hole corresponding to the eighth contact hole; and a second transparent conductive layer disposed on the fourth insulation layer, wherein the second transparent conductive layer comprises the pixel electrodes, and one of the pixel electrodes is electrically connected to the filling structure through the eighth contact hole and the ninth contact hole.

7. The in-cell touch display panel of claim 1, wherein the two adjacent ones of the sub-common electrodes comprise a first sub-common electrode and a second sub-common electrode, the insulation layer is a second insulation layer, and the in-cell touch display panel comprises:
a first metal layer disposed on the first substrate, wherein the first metal layer comprises the gate;
a first insulation layer disposed on the first metal layer;
the semiconductor layer disposed on the first insulation layer, wherein the semiconductor layer is a metal oxide comprising indium, gallium, and zinc;
a second insulation layer disposed on the semiconductor layer, wherein the second insulation layer has a first contact hole and a second contact hole exposing the semiconductor layer;
a second metal layer disposed on the second insulation layer, and being electrically connected to the source and the drain through the first contact hole and second contact hole respectively;
a first transparent conductive layer disposed on the second insulation layer, wherein the first transparent conductive layer comprises the first sub-common electrode and the second sub-common electrode;
a third insulation layer disposed on the first transparent conductive layer and on the second metal layer, wherein the third insulation layer has a third contact hole exposing the first sub-common electrode, a fourth contact hole exposing the second sub-common electrode, and a fifth contact hole exposing the drain;
a third metal layer disposed on the third insulation layer, wherein the third metal layer comprises the touch sensing lines and the metal connection structures, one of the touch sensing lines is electrically connected to the first sub-common electrode through the third contact hole, and one of the metal connection structures extends from the third contact hole to the fourth contact hole and is electrically connected to the second sub-common electrode;
a fourth insulation layer disposed on the third insulation layer and on the third metal layer, wherein the fourth insulation layer has a sixth contact hole corresponding to the fifth contact hole and exposing the drain; and
a second transparent conductive layer disposed on the fourth insulation layer, wherein the second transparent conductive layer comprises the pixel electrodes, and one of the pixel electrodes is electrically connected to the drain through the fifth contact hole and the sixth contact hole.

8. The in-cell touch display panel of claim 1, wherein the two adjacent ones of the sub-common electrodes comprise a first sub-common electrode and a second sub-common electrode, the insulation layer is a second insulation layer, and the in-cell touch display panel comprises:
a first metal layer disposed on the first substrate, wherein the first metal layer comprises the gate and a first metal connection structure;
a first insulation layer, disposed on the first metal layer, wherein the first insulation layer has a first contact hole and a second contact hole exposing the first metal connection structure;

the semiconductor layer disposed on the first insulation layer, wherein the semiconductor layer is a metal oxide comprising indium, gallium, and zinc;
a second insulation layer disposed on the semiconductor layer, the second insulation layer has a third contact hole corresponding to the first contact hole and has a fourth contact hole corresponding to the second contact hole exposing the first metal layer, and the second insulation layer has a fifth contact hole and a sixth contact hole exposing the semiconductor layer;
a second metal layer disposed on the second insulation layer, and being electrically connected to the drain and the source through the fifth contact hole and the sixth contact hole respectively;
a first transparent conductive layer disposed on the second insulation layer, wherein the first transparent conductive layer comprises the first sub-common electrode and the second sub-common electrode, the first sub-common electrode is electrically connected to the first metal connection structure through the first contact hole and the third contact hole, and the second sub-common electrode is electrically connected to the first metal connection structure through the second contact hole and the fourth contact hole;
a third insulation layer disposed on the first transparent conductive layer and on the second metal layer, wherein the third insulation layer has a seventh contact hole exposing the first sub-common electrode and an eighth contact hole exposing the drain;
a third metal layer disposed on the third insulation layer, wherein the touch sensing lines are formed by the third metal layer in the display area, and one of the touch sensing lines is electrically connected to the first sub-common electrode through the seventh contact hole;
a fourth insulation layer disposed on the third insulation layer and on the third metal layer, wherein the fourth insulation layer has a ninth contact hole corresponding to the eighth contact hole and exposing the drain; and
a second transparent conductive layer disposed on the fourth insulation layer, wherein the second transparent conductive layer comprises the pixel electrodes, and one of the pixel electrodes is electrically connected to the drain through the eighth contact hole and the ninth contact hole.

9. The in-cell touch display panel of claim 1, wherein the data lines are parallel with the touch sensing lines in the display area, and the data lines are not overlapped with the touch sensing lines in the non-display area.

10. The in-cell touch display panel of claim 1, wherein the data lines are parallel with the touch sensing lines in the display area, and the data lines and the touch sensing lines are formed by a same metal layer in the display area.

11. The in-cell touch display panel of claim 1, wherein the data lines are partially overlapped with the touch sensing lines in the display area along a normal vector of the in-cell touch display panel, and the data lines and the touch sensing lines are formed by different metal layers in the display area.

12. The in-cell touch display panel of claim 1, wherein each of the touch sensing lines is electrically connected to one of the touch pads, and each of the data lines is electrically connected to one of the display pads,
wherein the in-cell touch display panel further comprises a driving circuit disposed in the non-display area and electrically connected to the display pads and the touch pads,
wherein the non-display area comprises a signal transferring area and a fan-out area, the signal transferring area is located between the display area and the fan-out area, and the touch pads and the display pads are disposed in the fan-out area,
wherein one of the display pads is disposed between two of the touch pads, and one of the touch pads is disposed between two of the display pads.

13. The in-cell touch display panel of claim 1, wherein at least two of the sensing lines are electrically connected to each other and are electrically connected to one of the touch pads through a conducting line in the fan-out area.

14. The in-cell touch display panel of claim 1, wherein the display pads are disposed between the touch pads and the display area.

15. The in-cell touch display panel of claim 1, wherein the touch pads are disposed between the display pads and the display area.

16. The in-cell touch display panel of claim 1, wherein the number of the touch pads is less than the number of the display pads, and the display pads and the touch pads are arranged as a plurality of rows, and one of the rows consists of a portion of the touch pads.

17. The in-cell touch display panel of claim 1, wherein the number of the touch pads is less than the number of the display pads, and the display pads and the touch pads are arranged as a plurality of rows, and a first row of the rows consists of a portion of the display pads, and a second row of the rows comprises a portion of the display pads and a portion of the touch pads.

18. The in-cell touch display panel of claim 17, wherein the first row is located between the display area and the second row.

19. The in-cell touch display panel of claim 17, wherein the second row is located between the display area and the first row.

20. The in-cell touch display panel of claim 3, wherein the non-display area comprises a signal transferring area and a fan-out area, the signal transferring area is located between the display area and the fan-out area, one of the touch sensing lines comprises a first portion and a second portion, the first portion is formed by the first metal layer or the second metal layer, the second portion is formed by the third metal layer, and the in-cell touch display panel further comprises:
a connection structure disposed in the signal transferring area and electrically connected to the first portion and the second portion, wherein the connection structure comprises:
the first portion;
the second portion;
at least one insulation layer having contact holes exposing the first portion and the second portion; and
a transparent conductive layer electrically connected to the first portion and the second portion through the contact holes.

* * * * *